US012249344B1

(12) United States Patent
Evans et al.

(10) Patent No.: US 12,249,344 B1
(45) Date of Patent: Mar. 11, 2025

(54) EXTENDED AUDIO WATERMARKS

(71) Applicant: Amazon Technologies, Inc., Seattle, WA (US)

(72) Inventors: Christopher Evans, Somerville, MA (US); Sumit Garg, Acton, MA (US); Ameya Agaskar, Bedford, MA (US); Mohammad Edris Qarghah, Boxborough, MA (US); Zhengping Jin, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 17/853,773

(22) Filed: Jun. 29, 2022

(51) Int. Cl.
*G10L 25/51* (2013.01)
*G10L 15/08* (2006.01)
*G10L 15/22* (2006.01)
*G10L 19/018* (2013.01)

(52) U.S. Cl.
CPC ............ *G10L 25/51* (2013.01); *G10L 15/08* (2013.01); *G10L 15/22* (2013.01); *G10L 19/018* (2013.01); *G10L 2015/088* (2013.01); *G10L 2015/223* (2013.01); *G10L 2015/228* (2013.01)

(58) Field of Classification Search
CPC ......... G10L 25/51; G10L 15/08; G10L 15/22; G10L 19/018; G10L 2015/088; G10L 2015/223; G10L 2015/228
See application file for complete search history.

(56) References Cited

U.S. PATENT DOCUMENTS

| | | | | |
|---|---|---|---|---|
| 6,571,144 | B1* | 5/2003 | Moses .............. | G11B 20/00086 704/E19.009 |
| 10,453,460 | B1* | 10/2019 | Wightman .............. | G10L 15/10 |
| 10,978,081 | B2* | 4/2021 | Tai .......................... | G10L 15/05 |
| 2005/0013462 | A1* | 1/2005 | Rhoads ................... | G07F 17/16 707/E17.112 |
| 2005/0185819 | A1* | 8/2005 | Delp .................... | H04N 19/467 348/E5.009 |
| 2005/0246179 | A1* | 11/2005 | Kraemer .................. | H04S 3/00 704/500 |

(Continued)

OTHER PUBLICATIONS

U.S. Appl. No. 17/853,638, Titled "Extended Audio Watermarks," filed Jun. 29, 2022.

(Continued)

*Primary Examiner* — Daniel C Washburn
*Assistant Examiner* — Athar N Pasha
(74) *Attorney, Agent, or Firm* — Pierce Atwood LLP

(57) ABSTRACT

Described herein is a system for encoding audio watermarks with frequency extensions to enable enhanced watermark detection. An extended audio watermark may include an existing audio watermark and a duplicate audio watermark, enabling backwards compatibility with existing watermark detection while also enabling enhanced watermark detection with increased accuracy. For example, embedding the extended audio watermark enables (i) limited devices to perform watermark detection to detect the existing audio watermark, and (ii) improved devices to perform enhanced watermark detection to detect the extended audio watermark. As the extended audio watermark includes redundancy in the form of duplicate audio watermark(s), an accuracy of performing enhanced watermark detection is increased relative to detecting the existing audio watermark alone.

20 Claims, 43 Drawing Sheets

(56) References Cited

U.S. PATENT DOCUMENTS

| | | | |
|---|---|---|---|
| 2007/0052560 A1* | 3/2007 | Van Der Veen | G10L 19/002 341/51 |
| 2013/0080178 A1* | 3/2013 | Kang | G06F 3/167 704/E21.001 |
| 2013/0171926 A1* | 7/2013 | Perret | G10L 19/018 455/3.06 |
| 2019/0214030 A1* | 7/2019 | Garcia | G10L 21/00 |
| 2020/0202874 A1* | 6/2020 | Kuznetsov | G10L 19/018 |
| 2021/0083786 A1* | 3/2021 | Nehls | H04H 20/31 |

OTHER PUBLICATIONS

U.S. Appl. No. 17/853,658, Titled "Decoding Audio Watermarks Using Time Shifts," filed Jun. 29, 2022.

U.S. Office Action issued Aug. 29, 2024 for U.S. Appl. No. 17/853,638.

\* cited by examiner

FIG. 2A
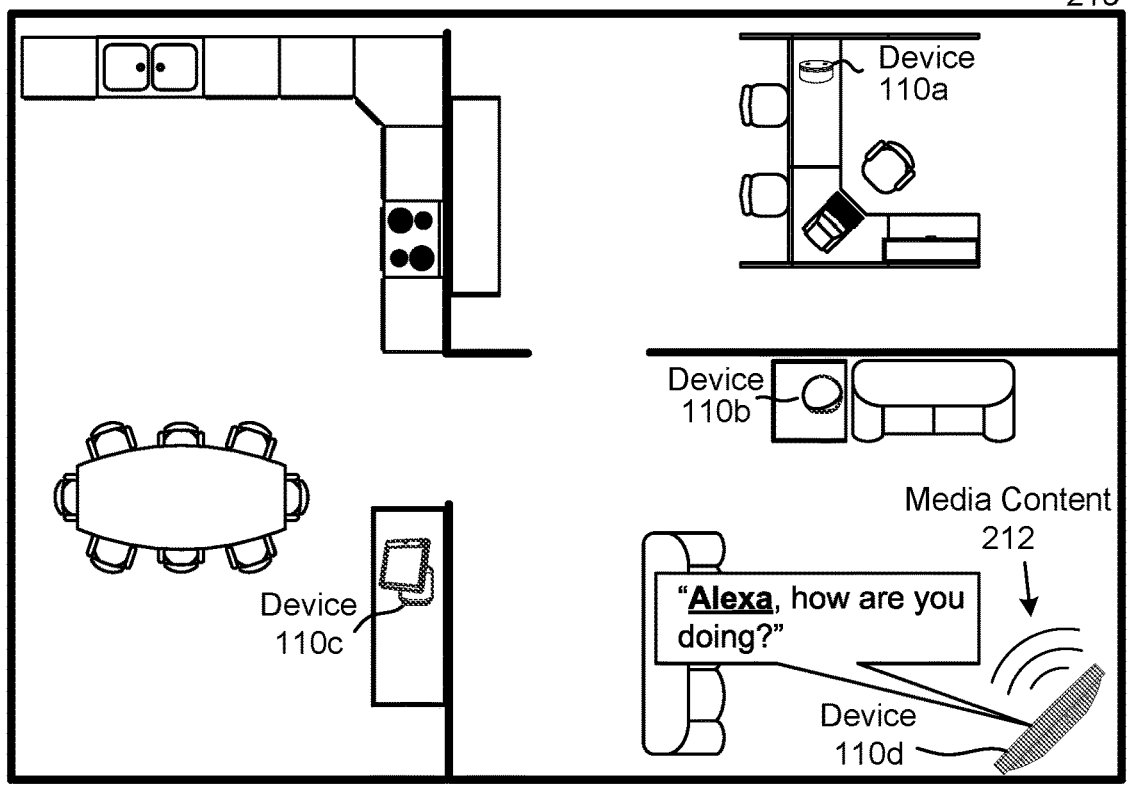
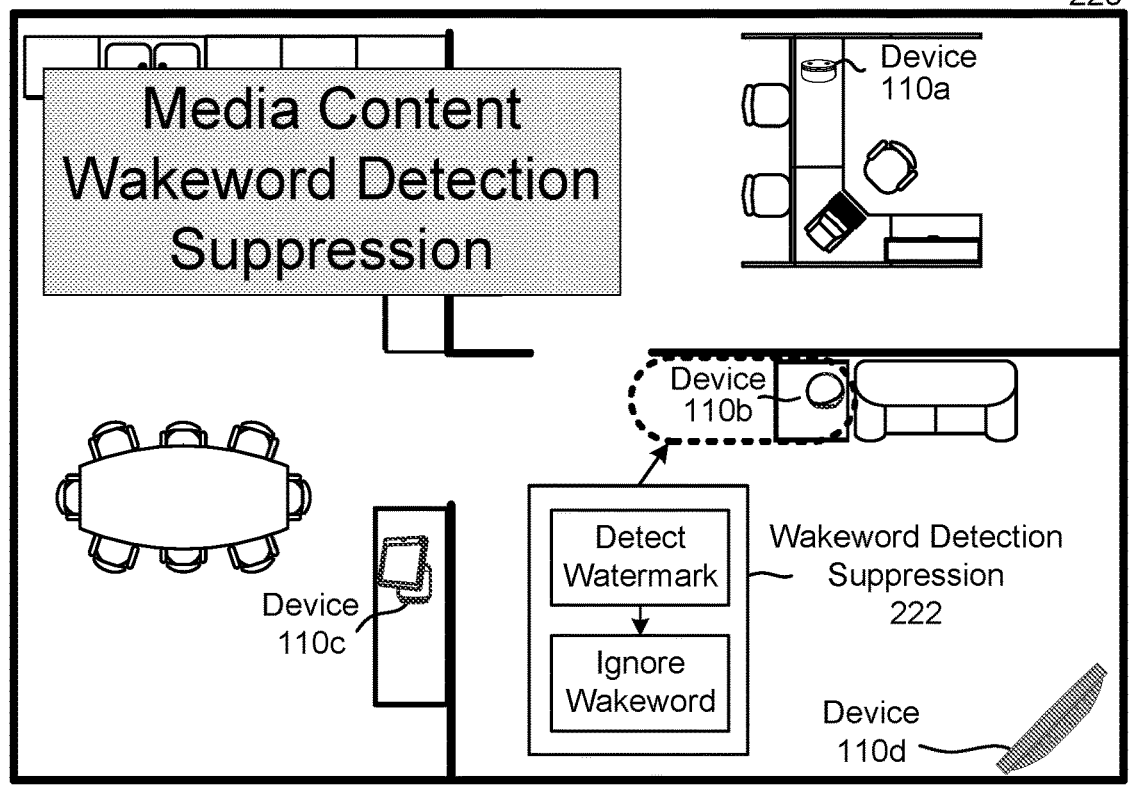

FIG. 2B
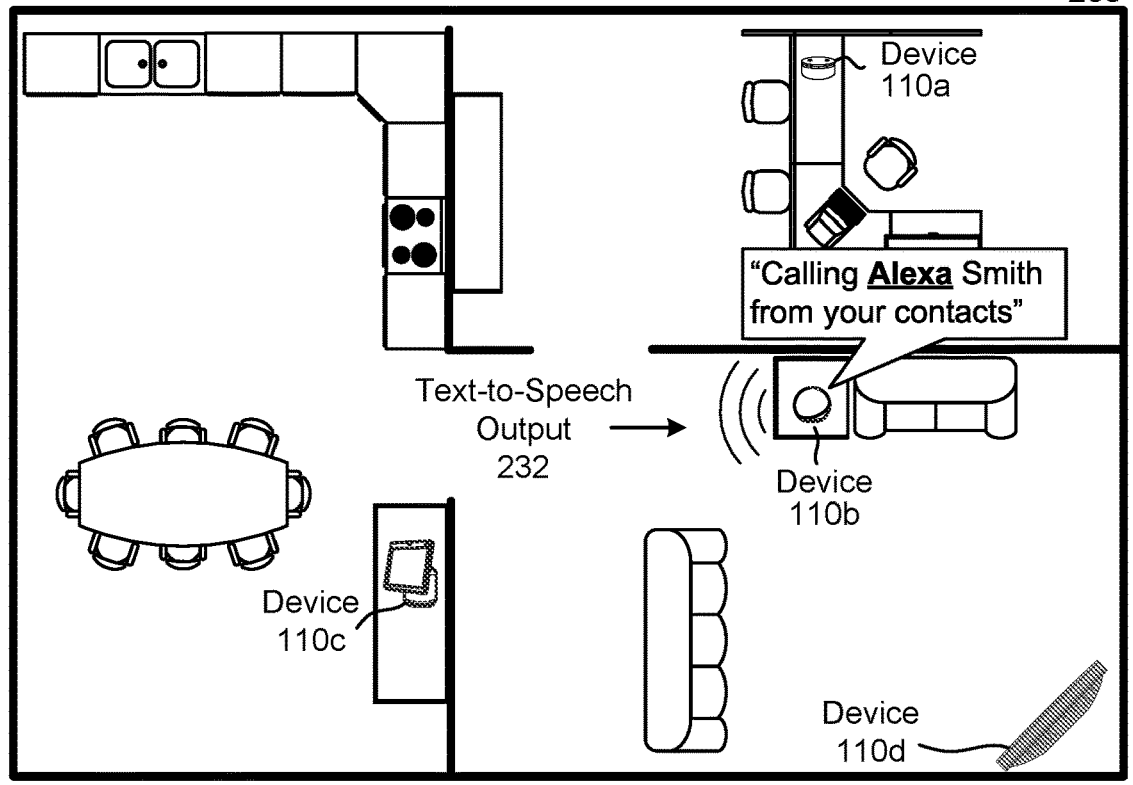
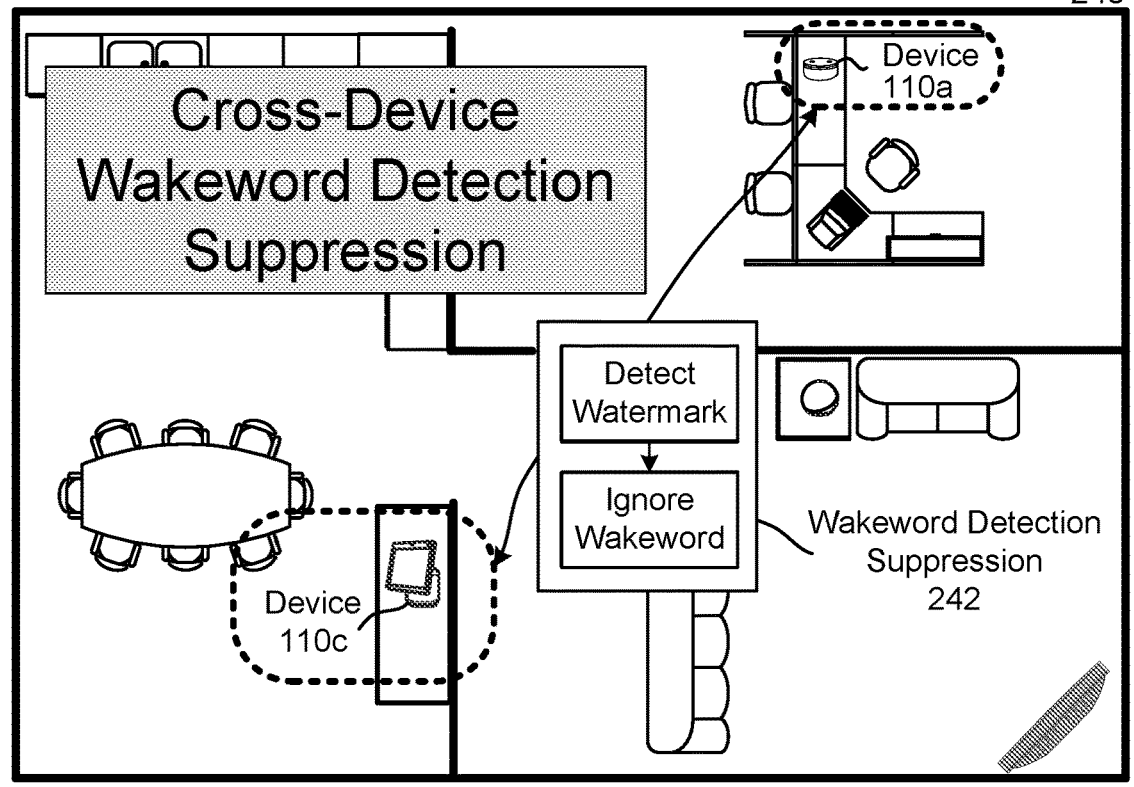

FIG. 2C
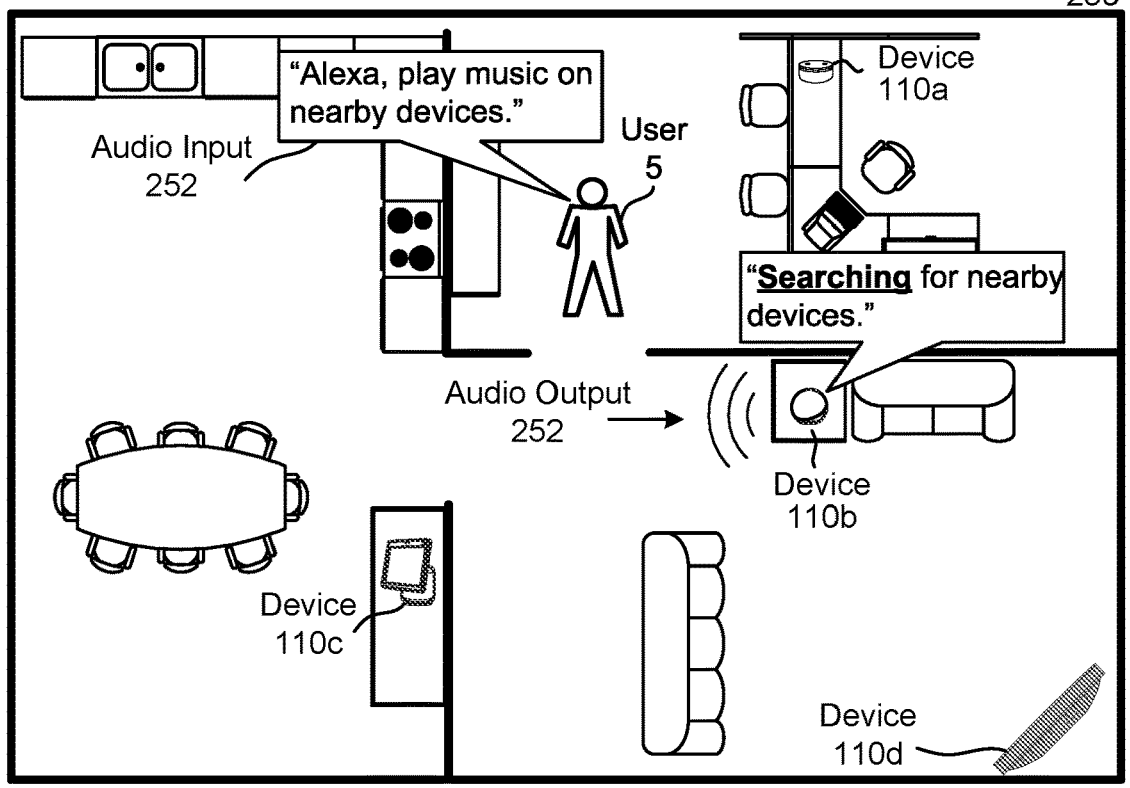
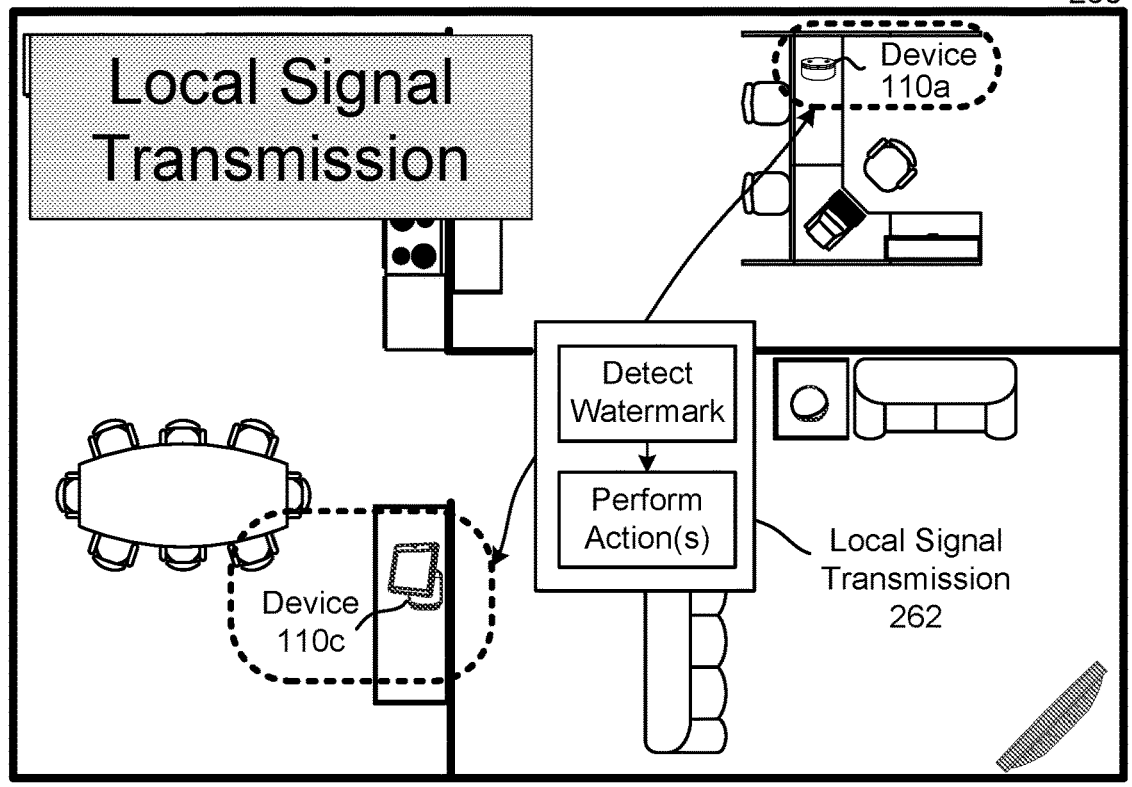

FIG. 2D
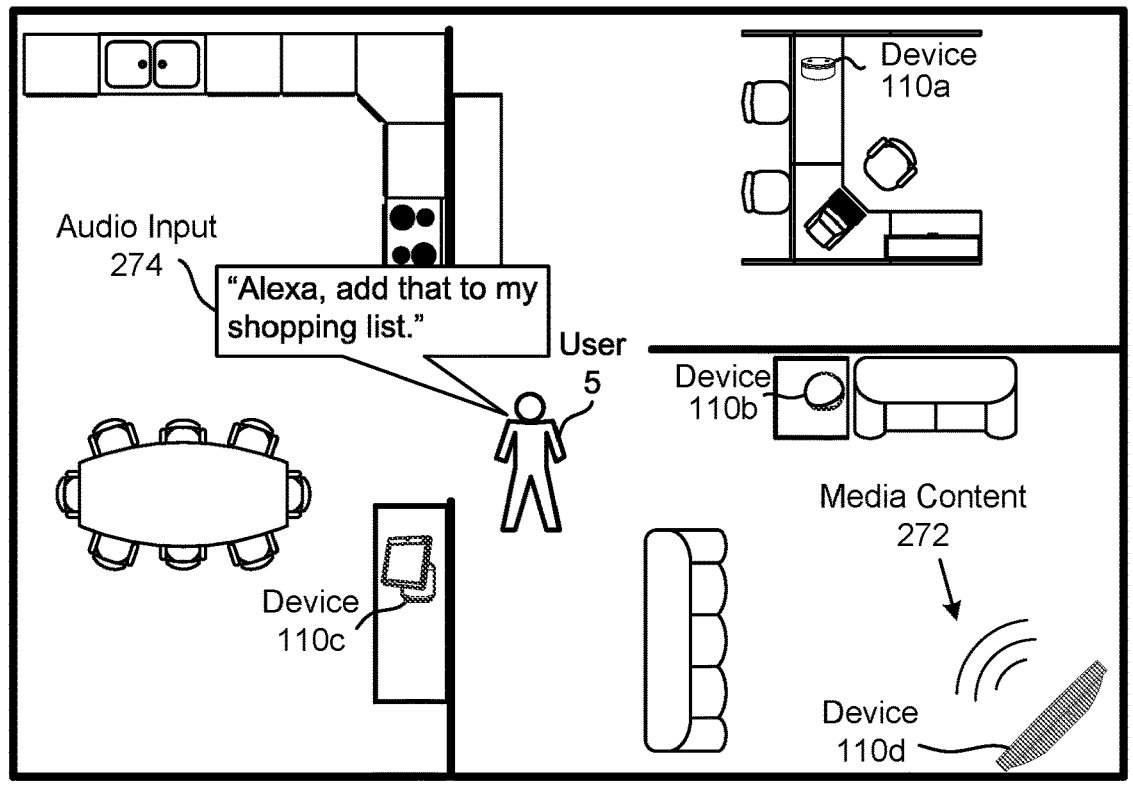
Media Content Example 270
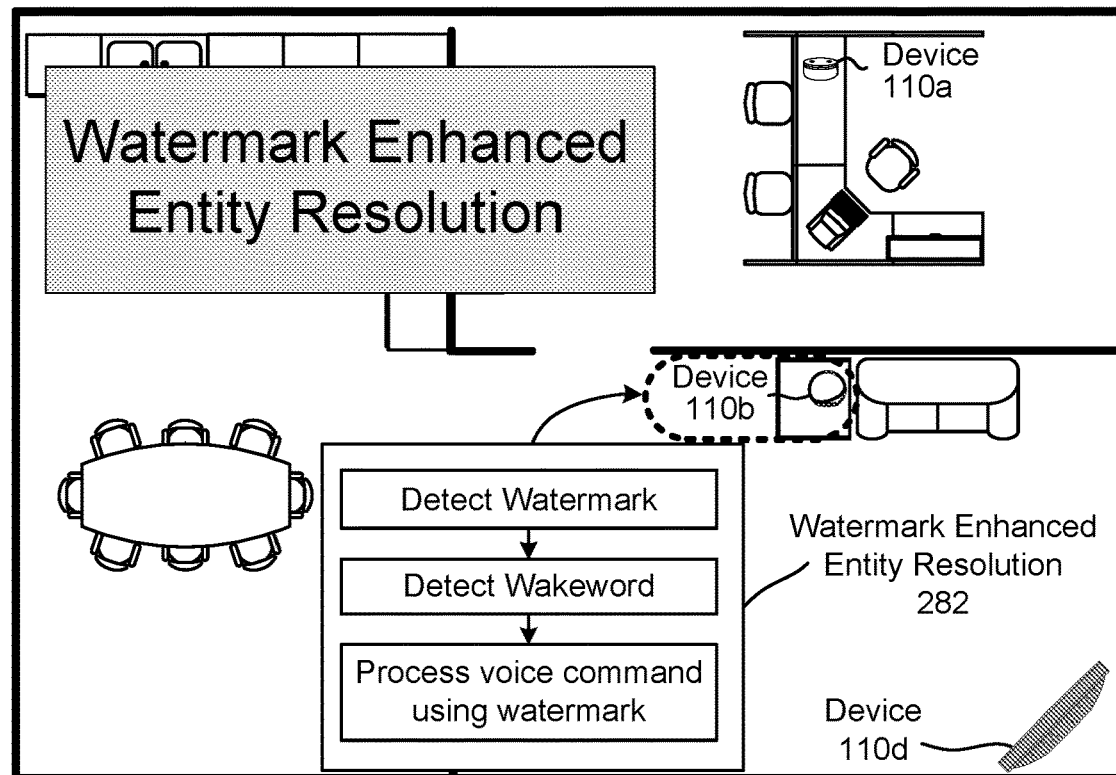
Entity Resolution Example 280

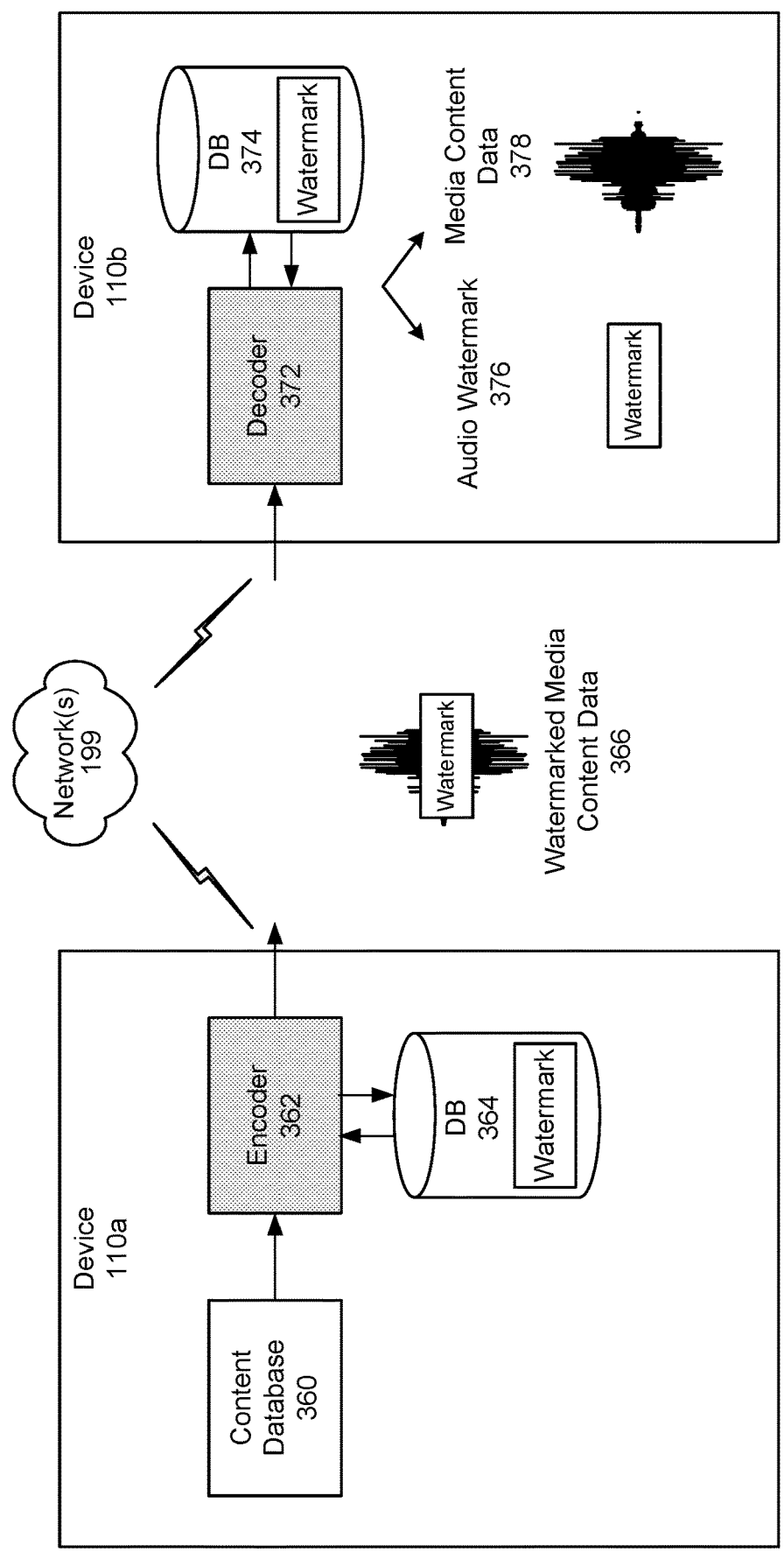

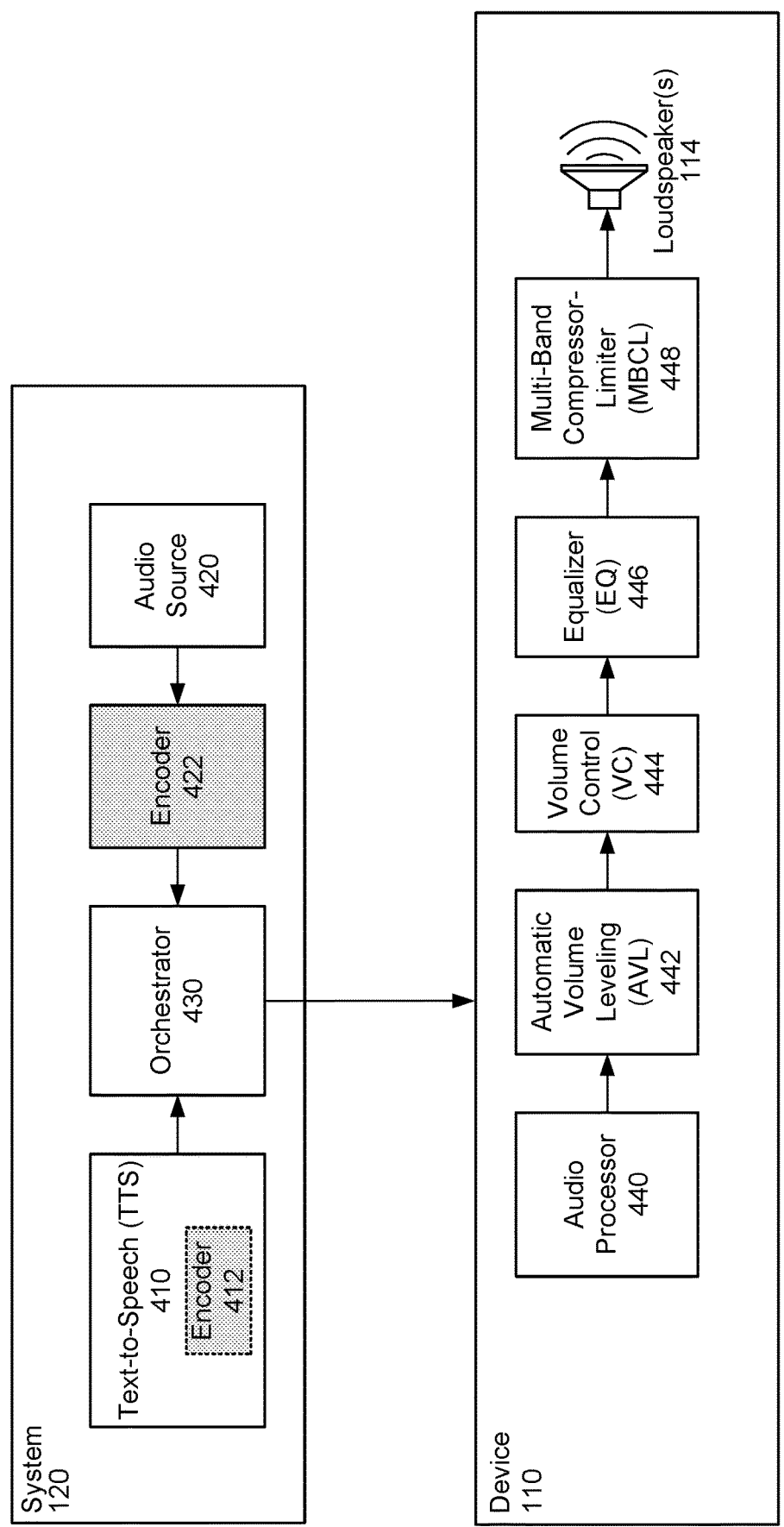

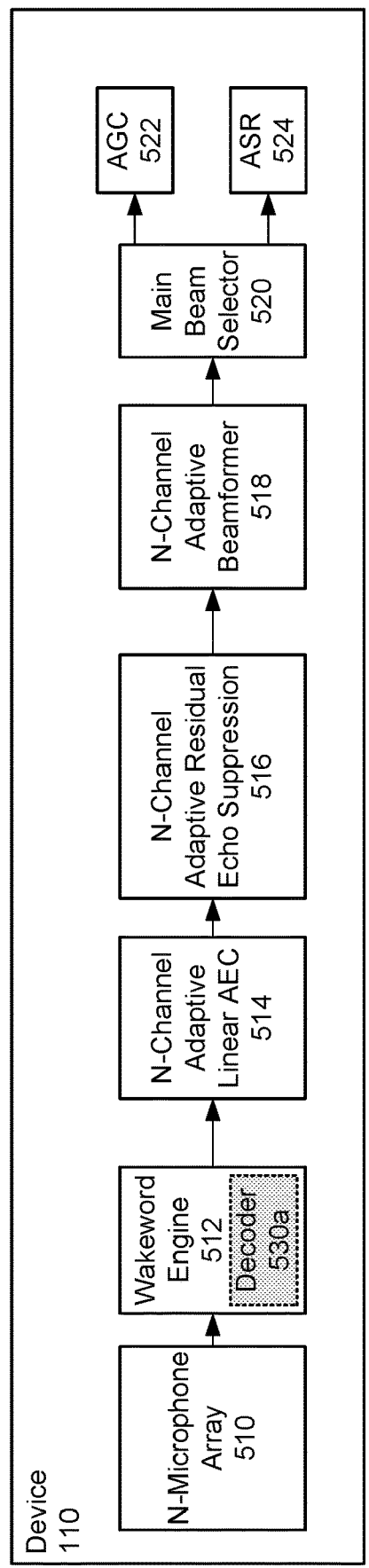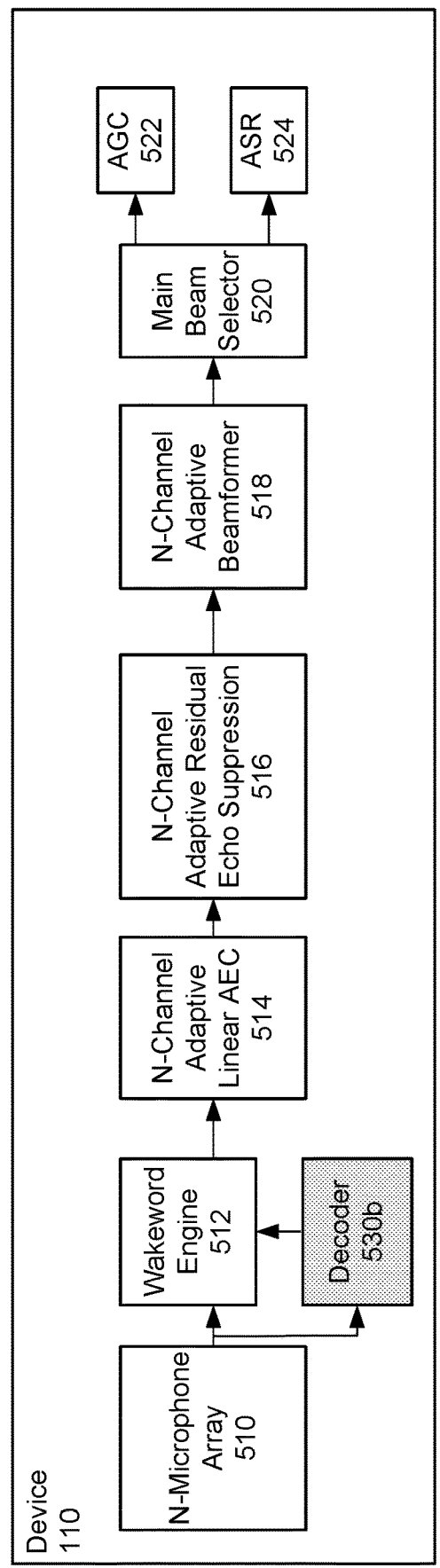

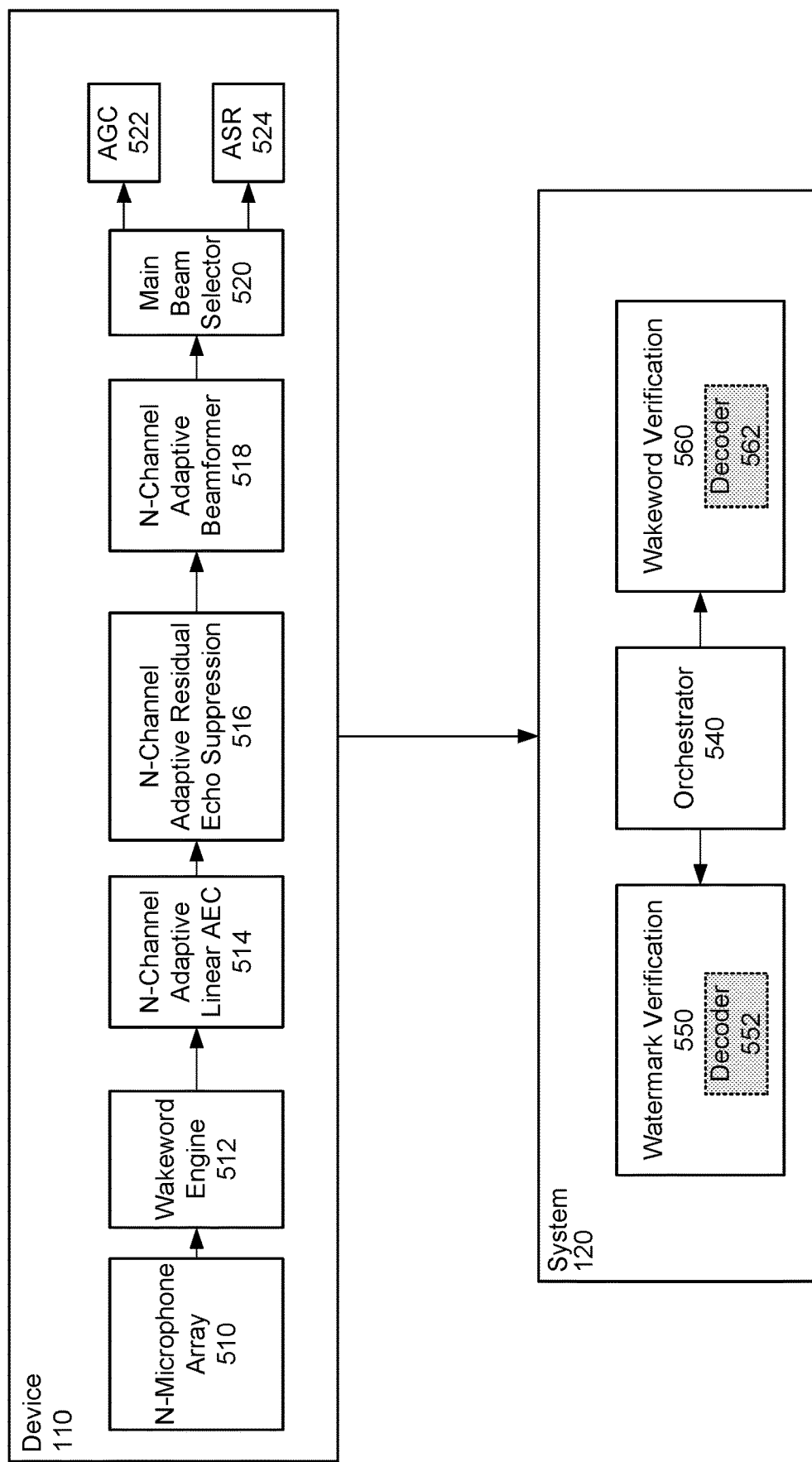

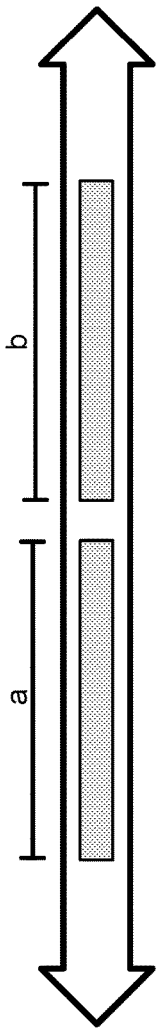
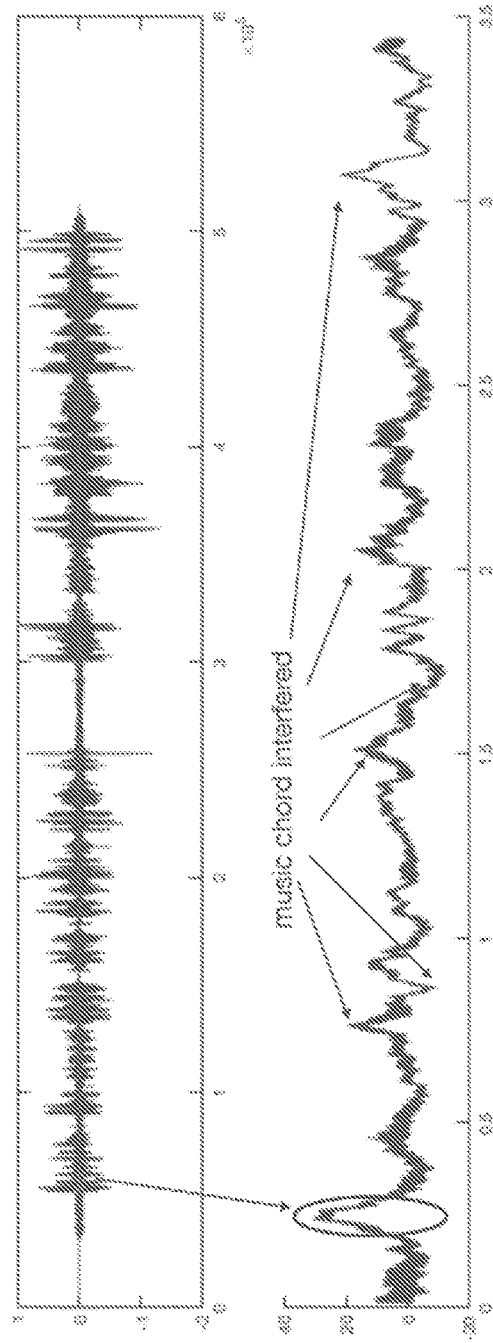
FIG. 6

Watermark Encoding Structure
810

Encoding Algorithm
820

$$|y\rangle^t = \bigoplus_{n=1}^{N_{rep}} \bigoplus_{i=1}^{N_{seg}} \left( |x_{n,i}\rangle^t + \beta \, s_{n,i} \, g_{n,i} \, |w_i\rangle^t \right)$$

Decoding Algorithm
830

$$\Gamma(t=t') \equiv \sum_{i=1}^{N_{seg}} \sum_{n=1}^{N_{rep}-1} \sum_{m=n+1}^{N_{rep}} \frac{s_{m,i} \, s_{n,i} \, \langle y_{m,i} | y_{n,i} \rangle_{lo \to hi}^q}{g_{m,i}^{lo \to hi} \, g_{n,i}^{lo \to hi}}$$

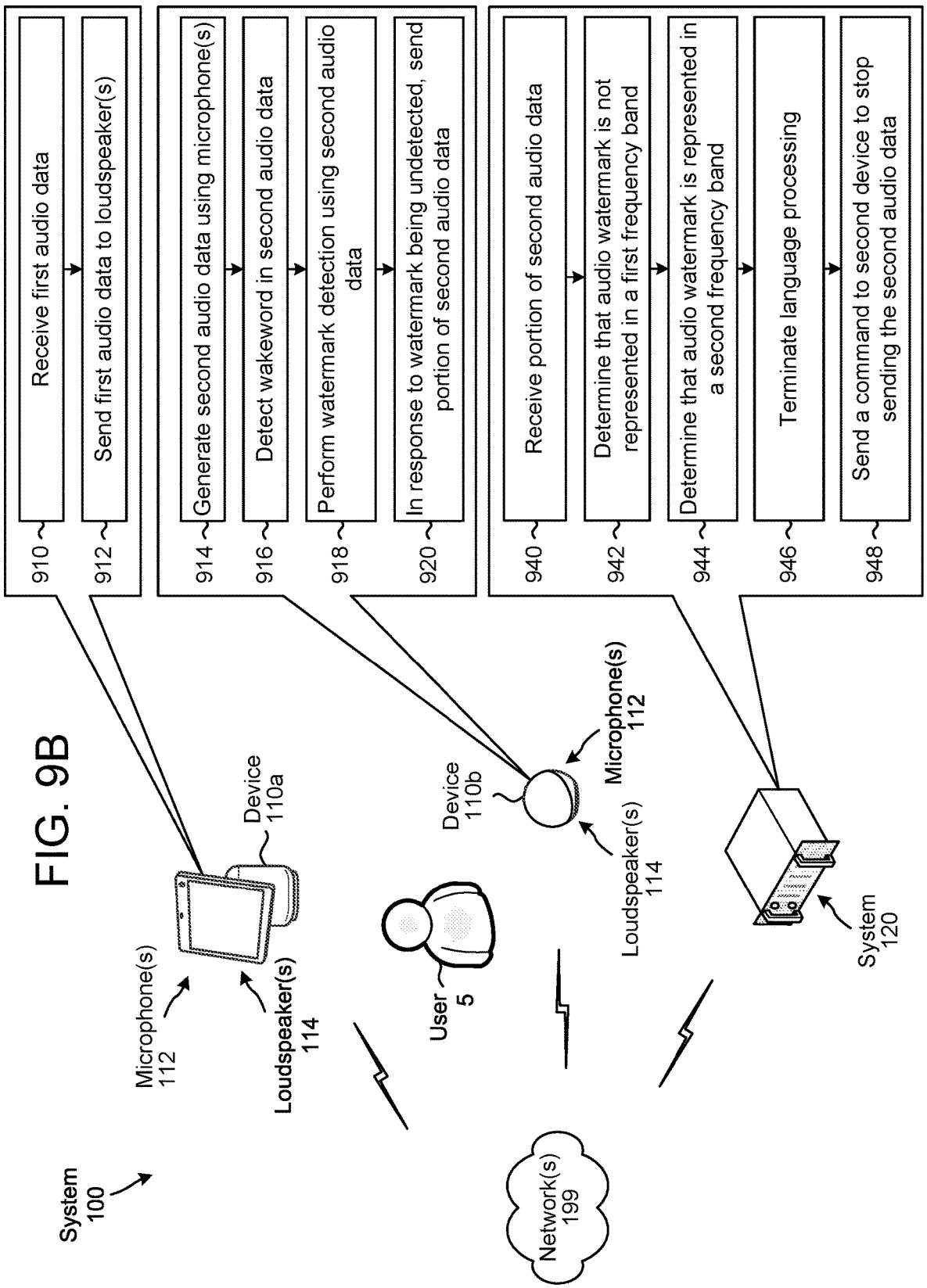

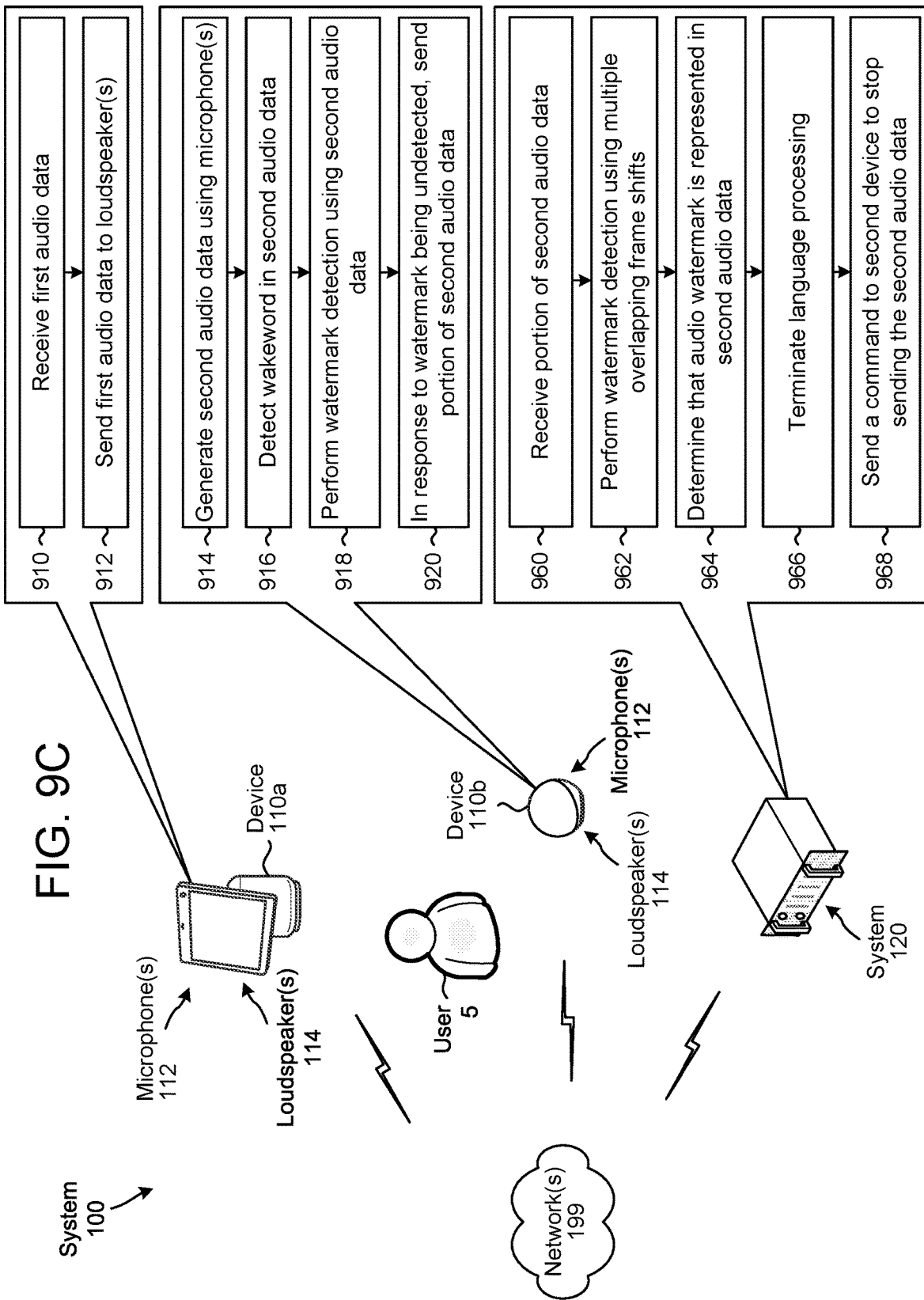

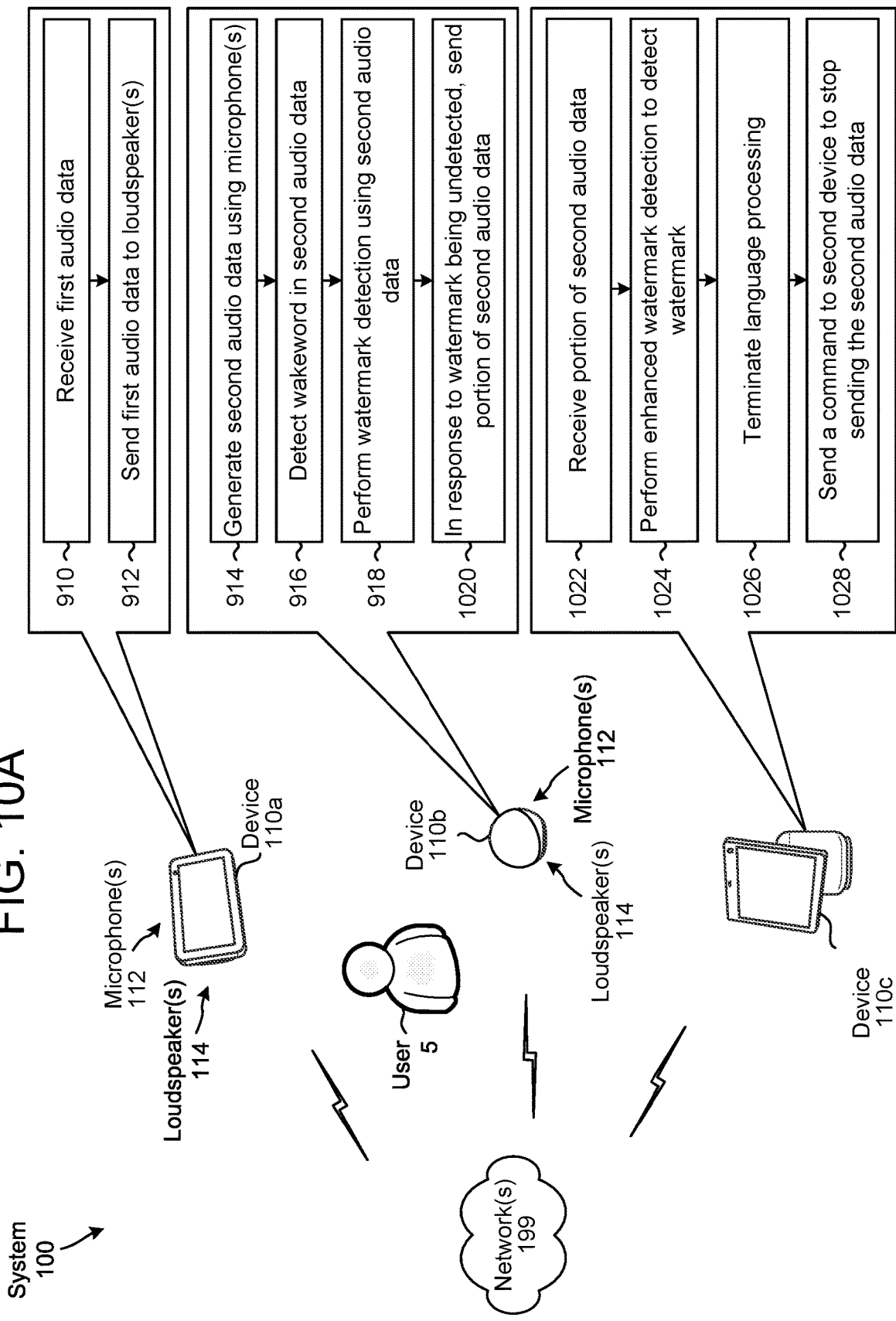

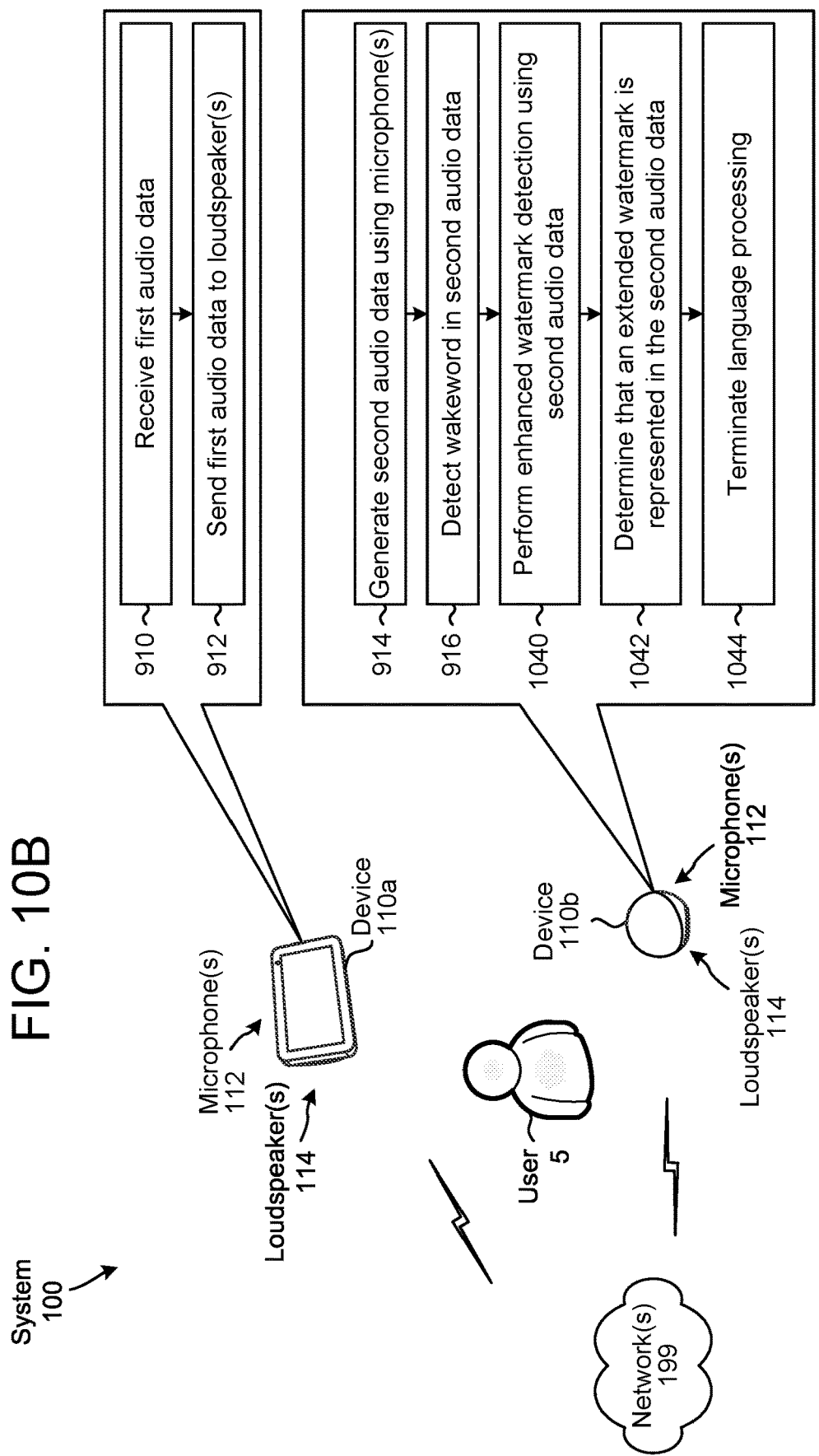

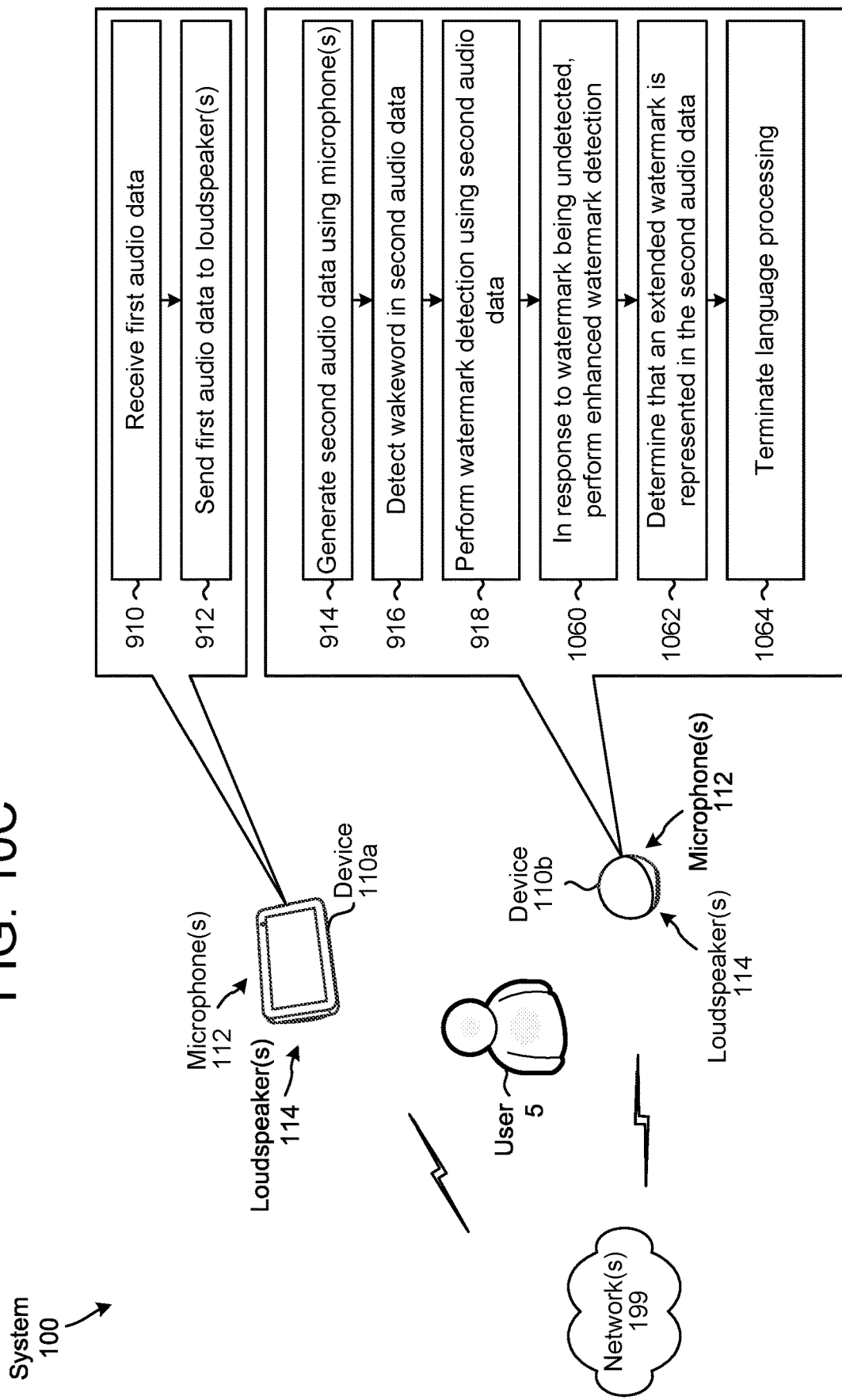

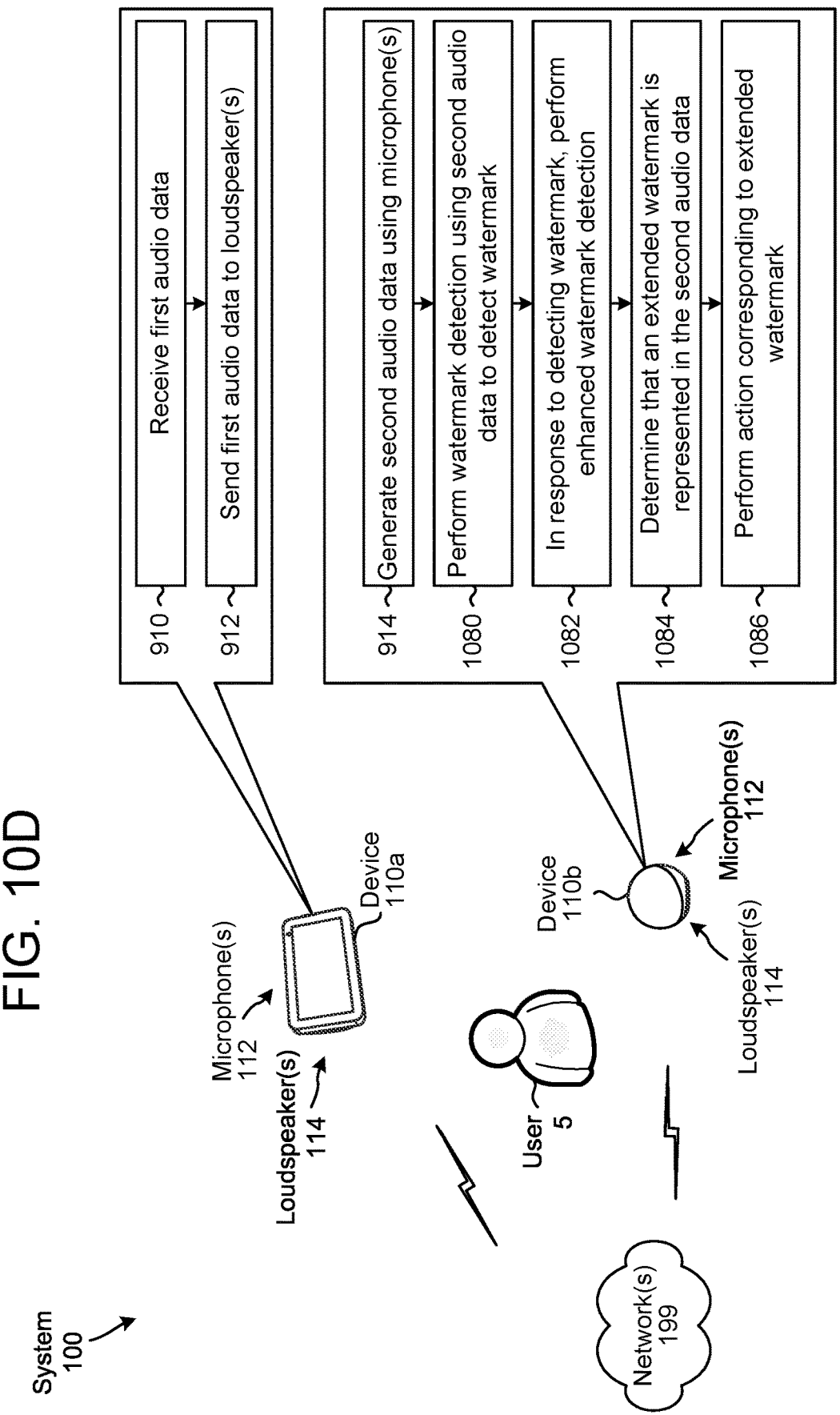

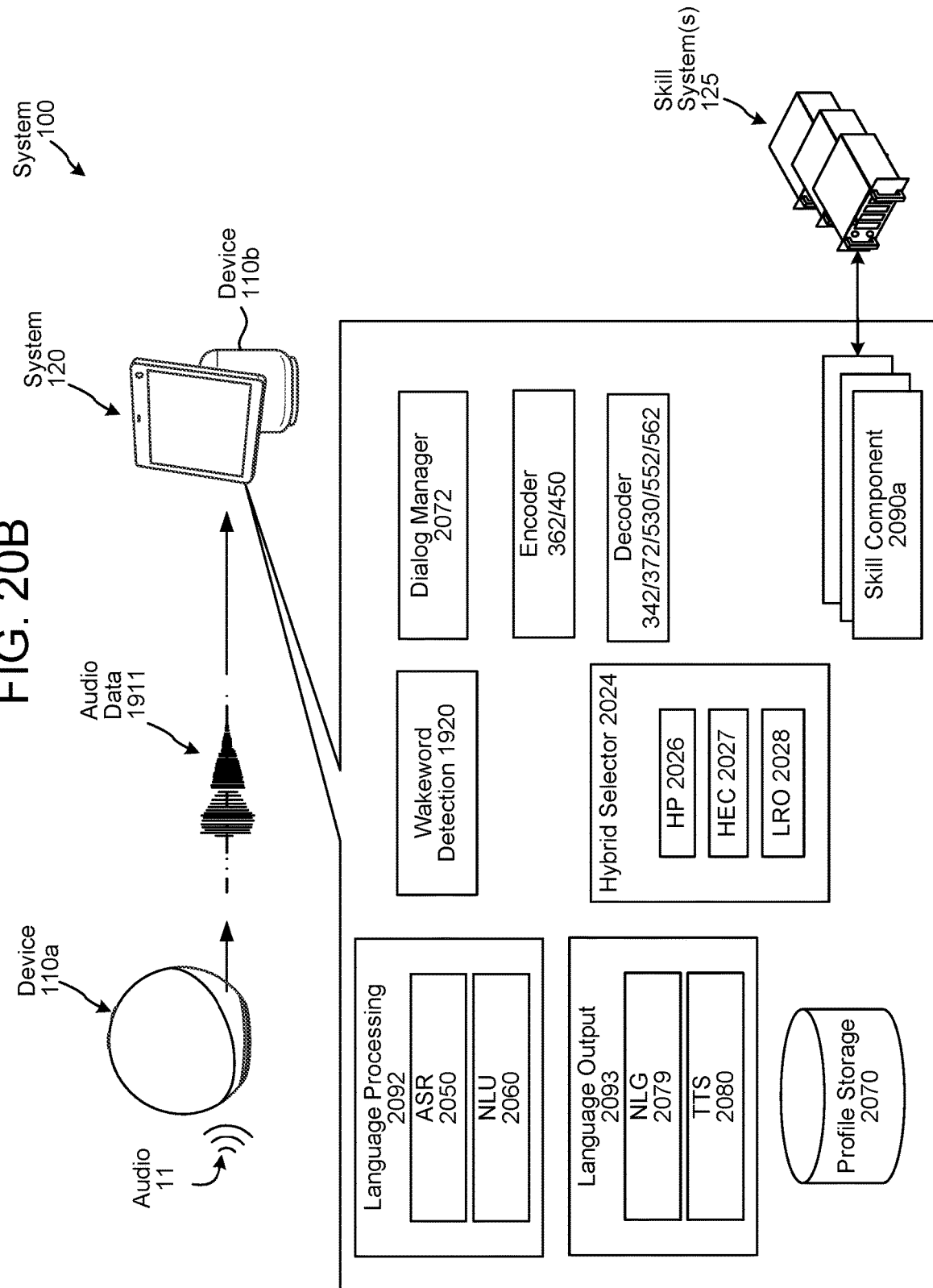

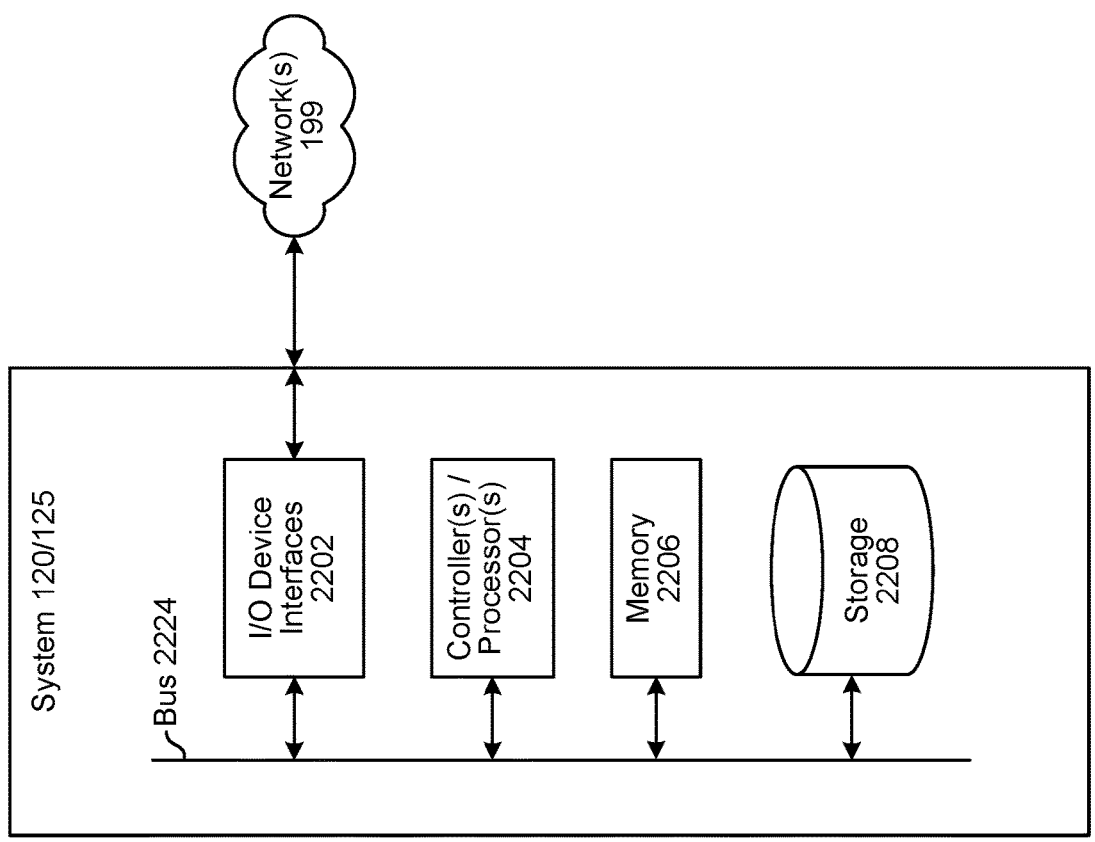

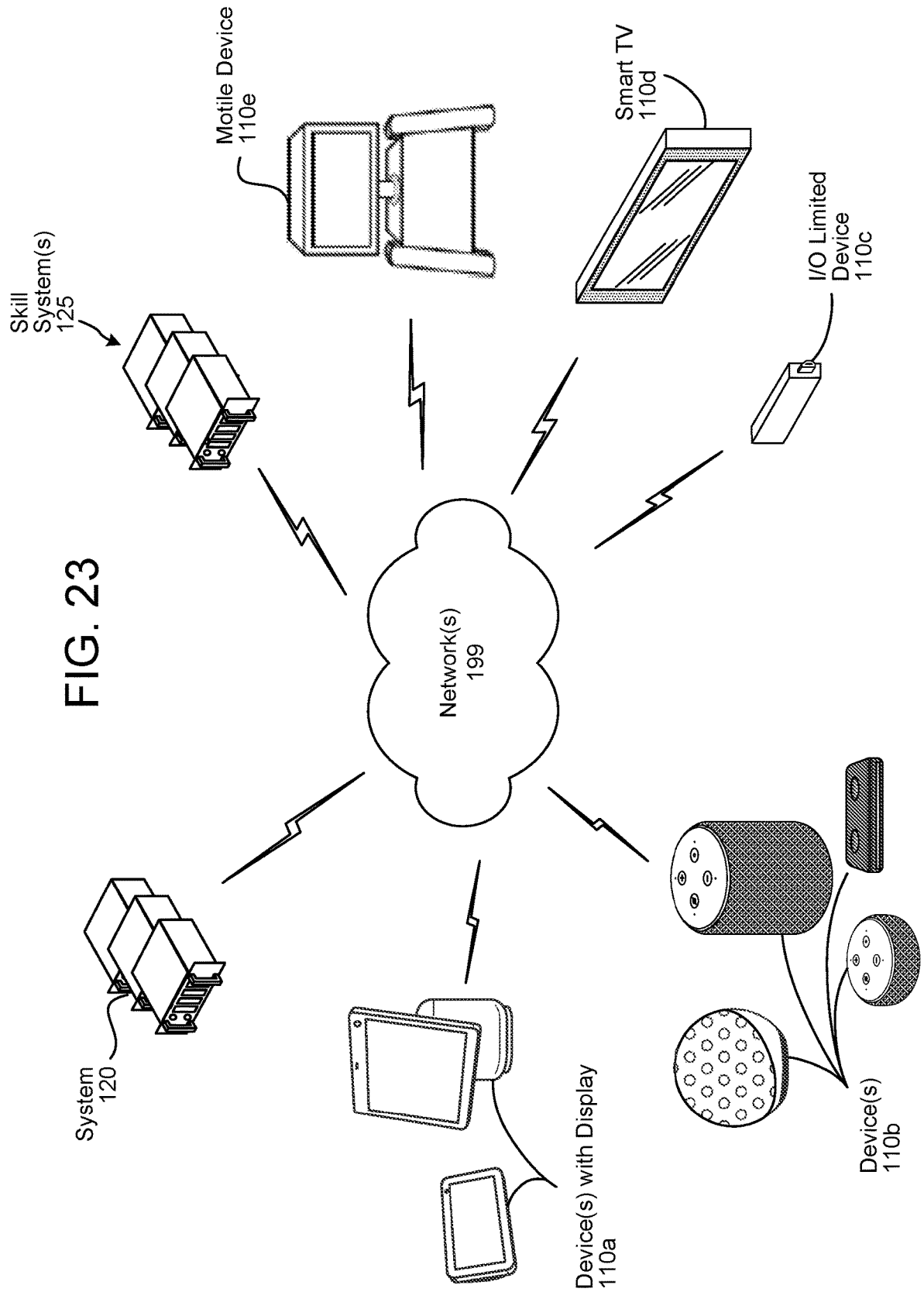

EXTENDED AUDIO WATERMARKS

BACKGROUND

With the advancement of technology, the use and popularity of electronic devices has increased considerably. Electronic devices are commonly used to capture and process audio data. Described herein are technological improvements to such systems, among other things.

BRIEF DESCRIPTION OF DRAWINGS

For a more complete understanding of the present disclosure, reference is now made to the following description taken in conjunction with the accompanying drawings.

FIGS. 2A-2E illustrate examples of unique functionality enabled by encoding and decoding audio watermarks according to embodiments of the present disclosure.

FIGS. 3A-3B illustrate examples of a component diagram for encoding media content according to embodiments of the present disclosure.

FIGS. 4A-4C illustrate examples of component diagrams for encoding audio watermarks according to embodiments of the present disclosure.

FIGS. 5A-5D illustrate examples of component diagrams for decoding audio watermarks according to embodiments of the present disclosure.

FIG. 6 illustrates an example of a self-correlation algorithm according to embodiments of the present disclosure.

FIG. 9B illustrates a system for encoding and decoding audio watermarks using frequency extensions according to embodiments of the present disclosure.

FIG. 9C illustrates a system for decoding audio watermarks using multiple time shifts according to embodiments of the present disclosure.

FIGS. 10A-10D illustrate examples of performing watermark verification and/or enhanced watermark detection according to embodiments of the present disclosure.

FIGS. 20A-20B are conceptual diagrams illustrating components of the system, according to embodiments of the present disclosure.

FIG. 22 is a block diagram conceptually illustrating example components of a system, according to embodiments of the present disclosure.

FIG. 23 illustrates an example of a computer network for use with the overall system, according to embodiments of the present disclosure.

DETAILED DESCRIPTION

Electronic devices may be used to capture audio data and generate audio. For example, an electronic device may generate audio using loudspeakers and may capture audio data using one or more microphones. If multiple electronic devices are located in proximity to each other (e.g., capable of capturing the same audio), the electronic devices may capture audio generated by a neighboring device. In some examples, the devices may embed an audio watermark in the audio in order to enable unique functionality, like wakeword detection suppression.

To improve an accuracy of watermark detection, devices, systems and methods are disclosed that encode watermarks with extensions to enable enhanced watermark detection. In some examples, an extended audio watermark may be used that includes a baseline audio watermark and a watermark extension, enabling backwards compatibility with existing watermark detection while also enabling enhanced watermark detection with increased accuracy. For example, embedding the extended acoustic watermark enables (i) limited devices to perform watermark detection to detect the baseline audio watermark, and (ii) improved devices to perform enhanced watermark detection to detect the extended audio watermark. As the extended audio watermark has a longer time duration than the baseline audio watermark, an accuracy of performing enhanced watermark detection is increased relative to detecting the baseline audio watermark alone.

Figure 1A:
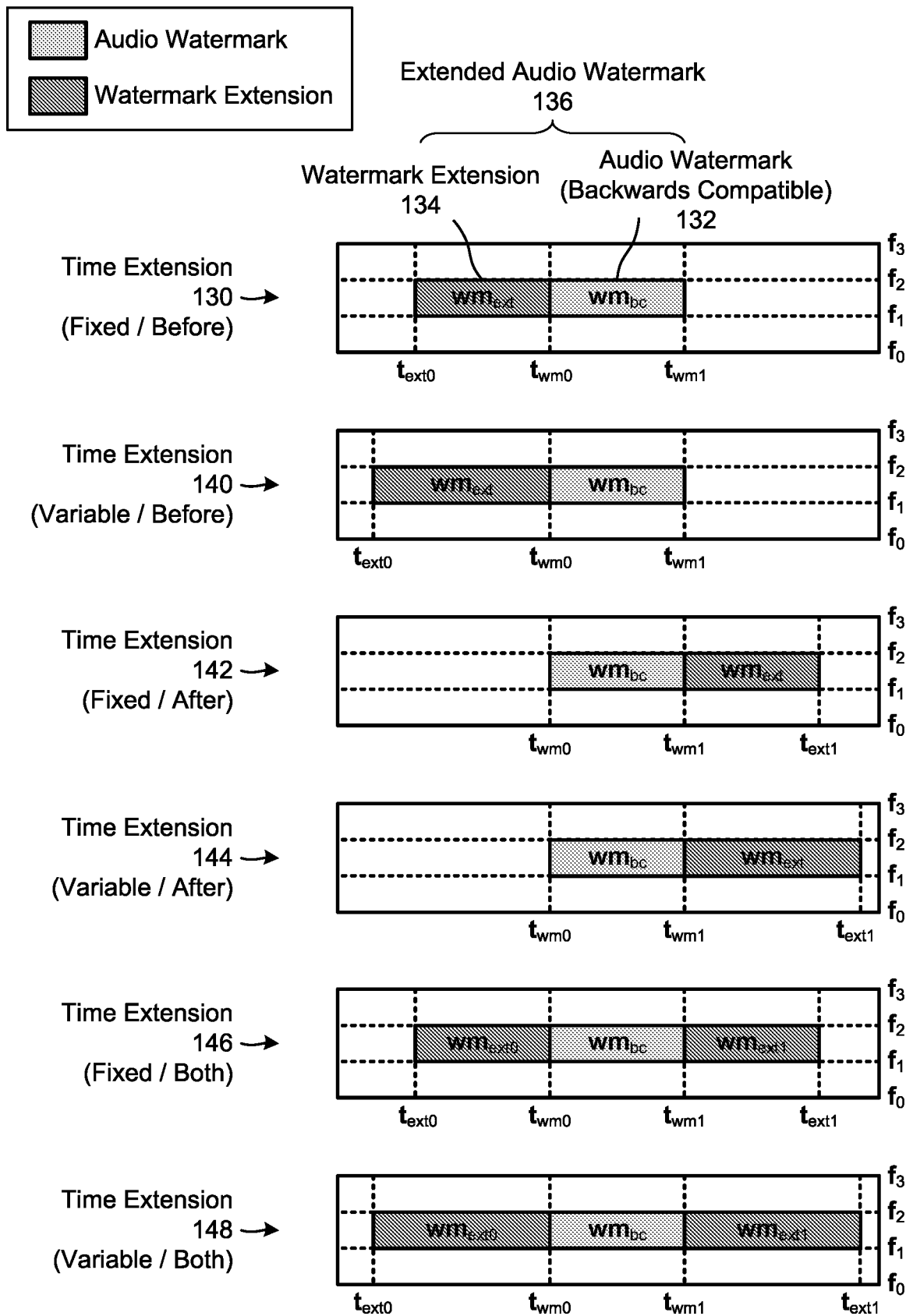
FIG. 1A illustrates examples of encoding and decoding audio watermarks with time extension(s) according to embodiments of the present disclosure.
Figure 1B:
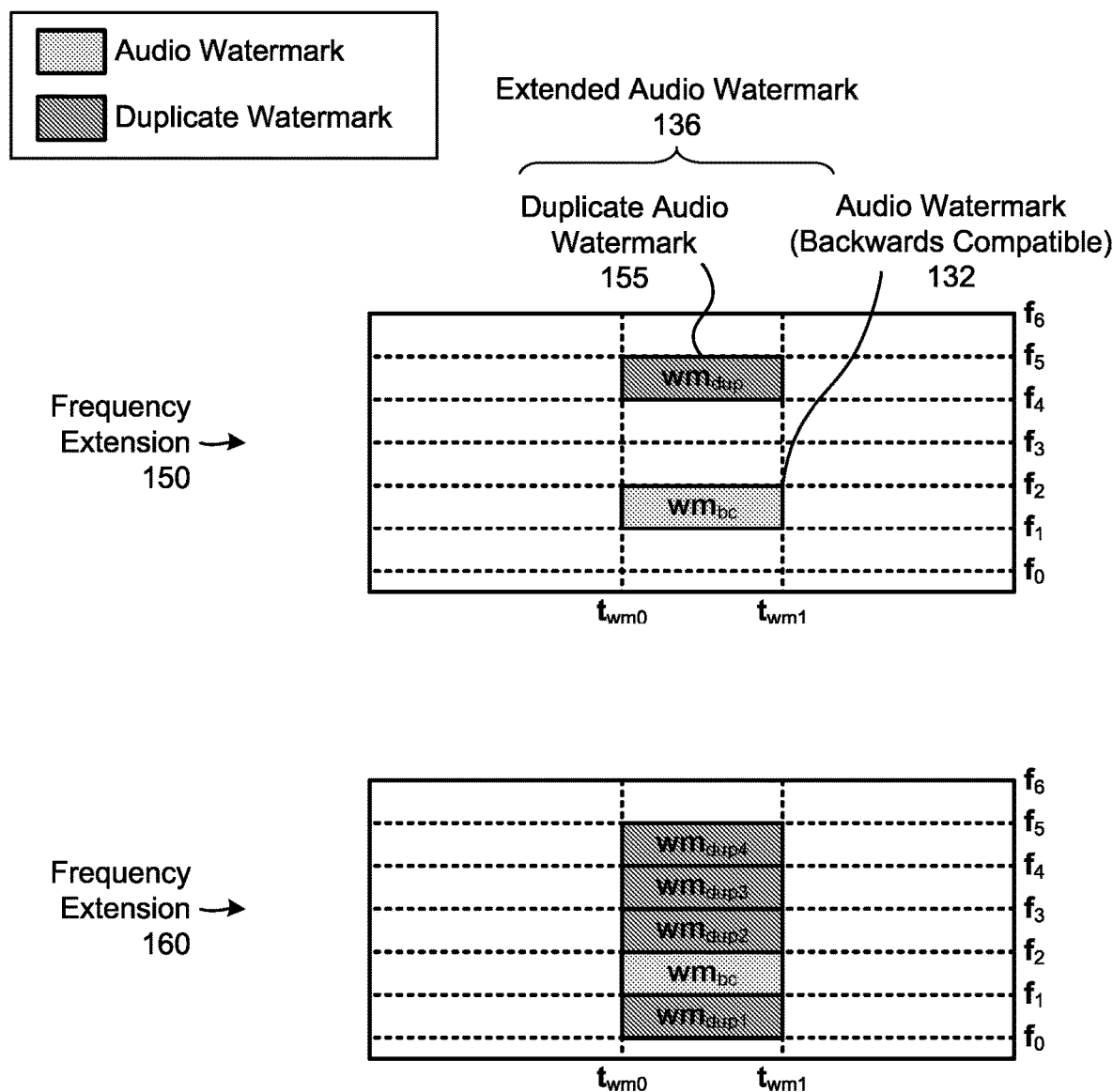
FIG. 1B illustrates examples of encoding and decoding audio watermarks with frequency extension(s) according to embodiments of the present disclosure.
Figure 1C:
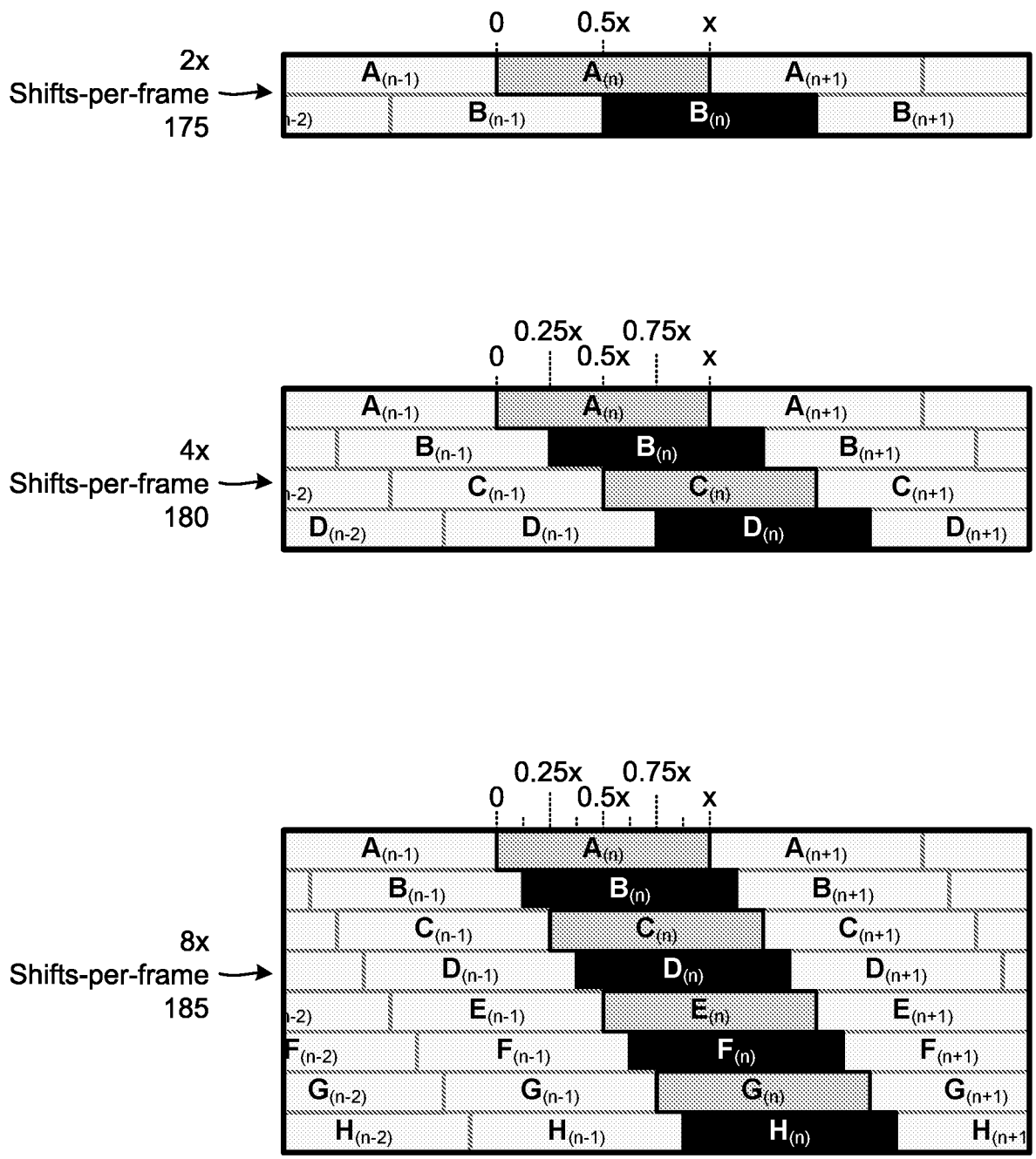
FIG. 1C illustrates examples of decoding audio watermarks using time shifts according to embodiments of the present disclosure.

FIGS. 1A-1C illustrate examples of encoding and decoding audio watermarks according to embodiments of the present disclosure. As will be described in greater detail below with regard to FIGS. 2A-2E, a system 100 may embed output audio data with an audio watermark to perform various actions, enable unique functionality, and/or the like. To illustrate an example, a first device 110a may generate output audio using the output audio data and a second device 110b and/or additional nearby devices 110 may capture the output audio and perform watermark detection to detect the audio watermark. As used herein, devices 110 are considered to be near and/or in proximity to the first device 110a if they are within an audible range, such that the devices 110 may detect the output audio generated by the first device 110a.

Depending on the audio watermark detected, the second device 110b may perform a variety of actions. For example, a first audio watermark may enable wakeword detection suppression (e.g., cause the second device 110b to ignore audio data even if a keyword is detected), a second audio watermark may enable local signal transmission (e.g., the second device may receive information and/or commands from the first device 110a), a third audio watermark may correspond to a unique identifier for media content (e.g., identify the media content corresponding to the output audio), which in some examples may enable watermark enhanced entity resolution when the second device 110b processes voice commands, and/or the like, although the disclosure is not limited thereto.

In some examples, the second device 110b may generate microphone audio data representing the output audio and may perform watermark detection without detecting an audio watermark. For example, interference present in the microphone audio data (e.g., ambient noise, audible sounds, and/or competing frequency content in the output audio data) may prevent a watermark decoder from accurately detecting the audio watermark. In response to the audio watermark being undetected, the second device 110b may respond improperly, such as processing the microphone audio data to determine a voice command, performing a first action that is different than a second action associated with the audio watermark, failing to perform an action indicated by the audio watermark, and/or the like. For example, if the audio watermark is embedded in watermarked media content to enable wakeword detection suppression and the second device 110b does not detect the audio watermark, the watermarked media content may cause the second device 110b to detect the wakeword and perform language processing to determine a voice command.

To improve watermark detection and/or watermark verification, the system 100 may enable enhanced watermark detection by embedding an extended audio watermark. For example, the system 100 may embed an extended audio watermark that includes a baseline audio watermark (e.g., to enable backwards compatibility) along with a watermark extension (e.g., additional watermark data) that includes time extension(s) and/or frequency extension(s). In some examples, the watermark extension may increase a time duration of the extended audio watermark relative to the baseline audio watermark, increasing an accuracy of performing enhanced watermark detection relative to detecting the baseline audio watermark alone.

Additionally or alternatively, the extended audio watermark may include frequency extension(s), such that the baseline audio watermark is embedded in multiple frequency bands (e.g., multiple frequency ranges) of the audio data and/or across a wider frequency range of the audio data. For example, the extended audio watermark may include the baseline audio watermark in a first frequency band (e.g., to enable backwards compatibility) along with a duplicate audio watermark in a second frequency band (e.g., to provide redundancy). However, the disclosure is not limited thereto and the extended audio watermark may include multiple duplicate audio watermarks in additional frequency bands without departing from the disclosure. As the extended audio watermark provides redundancy by including the duplicate audio watermark(s), an accuracy of performing enhanced watermark detection is increased relative to detecting the baseline audio watermark alone.

Regardless of whether performing watermark detection or performing enhanced watermark detection, the device 110 and/or the system 120 may improve watermark detection by decoding the microphone audio data using multiple time shifts (e.g., frame offsets). For example, a first decoder may perform first watermark detection using the microphone audio data without a time offset (e.g., no frame shift), while a second decoder may perform second watermark detection using the microphone audio data with a time offset (e.g., first frame shift), resulting in the first decoder processing a first portion and a second portion of the microphone audio data while the second decoder processes the second portion and a third portion of the microphone audio data. Due to the time shifts, one of the decoders is more likely to be aligned with the audio watermark, which may improve an accuracy of the watermark detection for baseline audio watermarks and/or extended audio watermarks.

In some examples, the second device 110b may be configured to perform watermark detection to detect the baseline audio watermark while another device (e.g., system 120) may be configured to perform enhanced watermark detection to detect the extended audio watermark. For example, the second device 110b may detect a wakeword represented in the microphone audio data and may perform watermark detection using the microphone audio data. If the baseline audio watermark is undetected, the second device 110b may send the microphone audio data to the system 120 for language processing. To prevent unnecessary processing, however, the system 120 may perform watermark verification using the enhanced watermark detection to ensure that the extended audio watermark is not represented in the microphone audio data. As will be described in greater detail below, the system 120 may correspond to a third device 110c and/or server(s) and may be referred to as a natural language command processing system, a verification system, and/or the like without departing from the disclosure.

In other examples, the second device 110b may be configured to perform enhanced watermark detection to detect the extended audio watermark without departing from the disclosure. To illustrate a first example, the second device 110b may be configured to perform two-stage watermark detection prior to performing additional processing on the microphone audio data, such as determining a voice command. For example, the second device 110b may perform watermark detection to detect the baseline audio watermark and, if the baseline audio watermark is undetected, may perform enhanced watermark detection to detect the extended audio watermark. If the second device 110b detects the baseline audio watermark and/or the extended audio watermark, the second device 110b may perform a first action corresponding to the extended audio watermark, such as ignoring the microphone audio data (e.g., wakeword detection suppression). If the baseline audio watermark and the extended audio watermark are undetected, however, the second device 110b may perform a second action, such as performing language processing to determine the voice command represented in the microphone audio data. To illustrate a second example, the second device 110b may be configured to perform enhanced watermark detection to detect the extended audio watermark without first performing watermark detection, although the disclosure is not limited thereto.

For ease of illustration, the following description refers to the system 100 encoding and decoding audio watermarks (e.g., embedding the output audio data with an audio watermark). For example, the system 100 may modify first audio data to include watermark data representing the audio watermark in order to generate second audio data (e.g., watermarked audio data) that is embedded with the audio watermark. When the first device 110a generates the output audio, the audio watermark may be detectable by the second device 110b but may not be noticeable and/or perceived by a user 5, such that the audio watermark does not degrade or otherwise impact a user experience while listening to the output audio. However, while these encoding/decoding techniques are described with regard to audio watermarks, the disclosure is not limited thereto and the system 100 may encode/decode other data and/or information without departing from the disclosure. For example, the system 100 may use these techniques to embed an audio identifier or other data structure within the output audio data without departing from the disclosure.

Additionally or alternatively, the disclosure is not limited to encoding/decoding audio data and the system 100 may encode/decode other types of data without departing from the disclosure. For example, the system 100 may encode/decode image data, video data, other media content data, and/or the like without departing from the disclosure. To illustrate an example, media content data may include image data (e.g., series of image frames) and audio data (e.g., series of audio frames) and the system 100 may embed an audio watermark within the audio data associated with the media content data without departing from the disclosure. In other examples, the system 100 may embed a visual watermark (e.g., image or text, which may be transparent) in the image data without departing from the disclosure. However, the disclosure is not limited thereto and the system 100 may embed data (e.g., auxiliary data) in the audio data, the image data, and/or any type of data without departing from the disclosure. For example, the system 100 may embed auxiliary data in the image data (e.g., without changing an image represented by the image data), in a document or other file, and/or the like without departing from the disclosure.

FIG. 1A illustrates examples of encoding and decoding audio watermarks with time extension(s) according to embodiments of the present disclosure. In some examples, the system 100 may enable enhanced watermark detection by embedding an extended audio watermark that includes a baseline audio watermark (e.g., to enable backwards compatibility) along with a watermark extension (e.g., to increase a time duration of the extended audio watermark). Thus, performing time extension and embedding the extended audio watermark enables (i) the device 110 to perform watermark detection to detect the baseline audio watermark, and (ii) the system 120 to perform enhanced watermark detection to detect the extended audio watermark. As the extended audio watermark has a longer time duration than the baseline audio watermark, an accuracy of performing enhanced watermark detection is increased relative to detecting the baseline audio watermark alone.

As illustrated in FIG. 1A, in a first time extension example 130 the system 100 may generate an audio watermark 132 (e.g., $wm_{bc}$) that is backwards compatible with existing watermark detection processing and may add a fixed time extension prior to the audio watermark 132. For example, the system 100 may generate a watermark extension 134 (e.g., $wm_{ext}$) that extends the audio watermark 132 earlier in time for a fixed duration. The system 100 may refer to the combination of the watermark extension 134 and the audio watermark 132 as an extended audio watermark 136. In the first time extension example 130, the watermark extension 134 is illustrated as extending from a first time (e.g., $t_{ext0}$) to a second time (e.g., $t_{wm0}$) that corresponds to a beginning of the audio watermark 132, and the audio watermark 132 is illustrated as extending from the second time (e.g., $t_{wm0}$) to a third time (e.g., $t_{wm1}$) that corresponds to an end of the audio watermark 132. In this example, the watermark extension 134 may have the same length as the audio watermark 132, such that the extended audio watermark 136 extends for twice as long as the audio watermark 132. However, the disclosure is not limited thereto, and the length of the watermark extension 134 and/or the extended audio watermark 136 may vary without departing from the disclosure.

In the time extension examples illustrated in FIG. 1A, the extended audio watermark 136 is only encoded in a single frequency band. For example, FIG. 1A illustrates the system 100 embedding the extended audio watermark 136 in a second frequency band that extends from a second frequency (e.g., $f_1$) to a third frequency (e.g., $f_2$), while a first frequency band (e.g., $f_0$ to $f_1$) and a third frequency band (e.g., $f_0$ to $f_1$) are empty. However, the disclosure is not limited thereto and the system 100 may embed the extended audio watermark 136 in any of the frequency bands without departing from the disclosure.

As illustrated by a second time extension example 140, the system 100 may generate the audio watermark 132 (e.g., $wm_{bc}$) and may add a variable time extension prior to the audio watermark 132. For example, the system 100 may generate a watermark extension 134 (e.g., $wm_{ext}$) that extends the audio watermark 132 earlier in time for a variable duration, such that the watermark extension 134 has a different length than the audio watermark 132. In the second time extension example 140, the watermark extension 134 is illustrated as extending from a first time (e.g., $t_{ext0}$) to the second time (e.g., $t_{wm0}$) that corresponds to a beginning of the audio watermark 132, and the audio watermark 132 is illustrated as extending from the second time (e.g., $t_{wm0}$) to the third time (e.g., $t_{wm1}$). However, the disclosure is not limited thereto, and the length of the watermark extension 134 and/or the extended audio watermark 136 may vary without departing from the disclosure.

As illustrated by a third time extension example 142, the system 100 may generate the audio watermark 132 (e.g., $wm_{bc}$) and may add a fixed time extension after the audio watermark 132. For example, the system 100 may generate a watermark extension 134 (e.g., $wm_{ext}$) that extends the audio watermark 132 later in time for a fixed duration. In the third time extension example 142, the audio watermark 132 is illustrated as extending from a first time (e.g., $t_{wm0}$) that corresponds to a beginning of the audio watermark 132 to a second time (e.g., $t_{wm1}$) that corresponds to an end of the audio watermark 132, and the watermark extension 134 is illustrated as extending from the second time (e.g., $t_{wm1}$) to a third time (e.g., $t_{ext1}$). In this example, the watermark extension 134 may have the same length as the audio watermark 132, such that the extended audio watermark 136 extends for twice as long as the audio watermark 132. However, the disclosure is not limited thereto, and the length of the watermark extension 134 and/or the extended audio watermark 136 may vary without departing from the disclosure.

As illustrated by a fourth time extension example 144, the system 100 may generate the audio watermark 132 (e.g., $wm_{bc}$) and may add a variable time extension after the audio watermark 132. For example, the system 100 may generate a watermark extension 134 (e.g., $wm_{ext}$) that extends the audio watermark 132 later in time for a variable duration, such that the watermark extension 134 has a different length than the audio watermark 132. In the fourth time extension example 144, the audio watermark 132 is illustrated as extending from the first time (e.g., $t_{wm0}$) that corresponds to a beginning of the audio watermark 132 to the second time (e.g., $t_{wm1}$) that corresponds to an end of the audio watermark 132, and the watermark extension 134 is illustrated as extending from the second time (e.g., $t_{wm1}$) to the third time (e.g., $t_{ext1}$). However, the disclosure is not limited thereto, and the length of the watermark extension 134 and/or the extended audio watermark 136 may vary without departing from the disclosure.

When the system 100 embeds the audio watermark 132 to enable the device 110 to perform wakeword detection suppression, the system 100 may detect a representation of a wakeword in first audio data, determine a first time associated with an end of the representation of the wakeword, determine a time interval corresponding to a duration of the audio watermark 132, and determine a second time at which to embed the audio watermark 132 based on the time interval and the first time. Thus, the system 100 may insert the audio watermark 132 in the first audio data beginning at the second time, such that the audio watermark 132 ends at the same time as the wakeword, so that the device 110 may detect the extended audio watermark 136 and perform wakeword detection suppression before the wakeword is detected and the device 110 sends the audio data to the system 120.

In some examples, the system 100 may add a time extension prior to the audio watermark 132, as illustrated in the first time extension example 130 and the second time extension example 140. For example, the system 100 may add the time extension prior to the audio watermark 132 in order to enable the device 110 to perform enhanced watermark detection locally using the extended audio watermark 136 while still performing wakeword detection suppression. Thus, the system 100 may add the watermark extension 134 prior to the audio watermark 132 so that the extended audio watermark 136 ends before the end of the wakeword.

In other examples, the system 100 may add a time extension after the audio watermark 132, as illustrated in the third time extension example 142 and the fourth time extension example 144. For example, instead of prioritizing performing enhanced watermark detection locally on the device 110, the system 100 may prioritize performing remote watermark verification by the system 120 by adding the time extension after the audio watermark 132. This configuration increases the likelihood that the extended audio watermark 136 will be included in the audio data sent to the system 120.

Additionally or alternatively, the system 100 may add a time extension before and after the audio watermark 132. In some examples, the system 100 may add a fixed time extension before and after the audio watermark 132. For example, a fifth time extension example 146 illustrates that the system 100 may generate a first watermark extension 134a (e.g., $wm_{ext0}$) before the audio watermark 132 and a second watermark extension 134b (e.g., $wm_{ext1}$) after the audio watermark 132. In this example, the first watermark extension 134a and the second watermark extension 134b may have the same length as the audio watermark 132, such that the extended audio watermark 136 extends for three times the duration of the audio watermark 132. However, the disclosure is not limited thereto, and the length of the watermark extensions 134 and/or the extended audio watermark 136 may vary without departing from the disclosure. As used herein, the first watermark extension $wm_{ext0}$ may be referred to as a first portion of the watermark extension 134 and the second watermark extension $wm_{ext1}$ may be referred to as a second portion of the watermark extension 134 without departing from the disclosure.

In other examples, the system 100 may add a variable time extension before and after the audio watermark 132. For example, a sixth time extension example 148 illustrates that the system 100 may generate a first watermark extension 134a (e.g., $wm_{ext0}$) before the audio watermark 132 and a second watermark extension 134b (e.g., $wm_{ext1}$) after the audio watermark 132. The first watermark extension 134a and/or the second watermark extension 134b may have a variable duration, such that the watermark extensions 134a/134b may have different lengths than each other and/or the audio watermark 132. However, the disclosure is not limited thereto, and the length of the watermark extension 134 and/or the extended audio watermark 136 may vary without departing from the disclosure.

FIG. 1B illustrates examples of encoding and decoding audio watermarks with frequency extension(s) according to embodiments of the present disclosure. As illustrated in FIG. 1B, in some examples the system 100 may generate the extended audio watermark with frequency extension(s), such that the baseline audio watermark is embedded in multiple frequency bands of the audio data. For example, as shown in a first frequency extension example 150, the extended audio watermark 136 may include a baseline audio watermark 132 (e.g., $wm_{bc}$) in a second frequency band (e.g., $f_1$ to $f_2$) (e.g., to enable backwards compatibility) along with a duplicate audio watermark 155 (e.g., $wm_{dup}$) in a fifth frequency band (e.g., $f_4$ to $f_5$) (e.g., to provide redundancy). Thus, embedding the extended audio watermark 136 with a frequency extension enables (i) the device 110 to perform watermark detection to detect the baseline audio watermark 132 in the second frequency band, and (ii) the system 120 to perform enhanced watermark detection to detect the baseline audio watermark 132 in the second frequency band and/or the duplicate audio watermark 155 in the fifth frequency band.

While the first frequency extension example 150 illustrates a simple example in which the extended audio watermark 136 includes the audio watermark 132 in the second frequency band and the duplicate audio watermark 155 in the fifth frequency band, the disclosure is not limited thereto and the system 100 may embed the audio watermark 132 and/or the duplicate audio watermark 155 in any frequency band without departing from the disclosure. Additionally or alternatively, while the first frequency extension example 150 only illustrates the extended audio watermark 136 including a single duplicate watermark 155, the disclosure is not limited thereto and the system 100 may include any number of duplicate watermarks 155 in the extended audio watermark 136 without departing from the disclosure. As the extended audio watermark 136 provides redundancy by including the duplicate audio watermark(s) 155, an accuracy of performing enhanced watermark detection is increased relative to detecting the baseline audio watermark 132 alone.

As illustrated in FIG. 1B, in a second frequency extension example 160 the extended audio watermark 136 may include the baseline audio watermark 132 (e.g., $wm_{bc}$) in the second frequency band (e.g., to enable backwards compatibility) along with four duplicate audio watermarks 155 (e.g., $wm_{dup1}$-$wm_{dup4}$) in additional frequency bands. For example, the extended audio watermark 136 may include a first duplicate audio watermark 155a (e.g., $wm_{dup1}$) in a first frequency band (e.g., $f_0$ to $f_1$), a second duplicate audio watermark 155b (e.g., $wm_{dup2}$) in a third frequency band (e.g., $f_2$ to $f_3$), a third duplicate audio watermark 155c (e.g., $wm_{dup3}$) in a fourth frequency band (e.g., $f_3$ to $f_4$), and a fourth duplicate audio watermark 155d (e.g., $wm_{dup4}$) in a fifth frequency band (e.g., $f_4$ to $f_5$).

While FIG. 1B only illustrates two examples of frequency extensions, the disclosure is not limited thereto and the extended audio watermark 136 may include any number of duplicate audio watermark(s) 155 in any of the frequency bands without departing from the disclosure. Additionally or alternatively, while FIG. 1B only illustrates six frequency bands for ease of illustration, the disclosure is not limited thereto and the audio data may include any number of frequency bands without departing from the disclosure.

While the above examples illustrate examples of the extended audio watermark 136 including either the time extension(s) or the frequency extension(s), the disclosure is not limited thereto and the extended audio watermark 136 may include both time extension(s) and frequency extension(s) without departing from the disclosure.

While the extended audio watermark enables enhanced watermark detection with greater accuracy relative to detecting the baseline audio watermark, the time extension(s) and/or the frequency extension(s) associated with the extended audio watermark must be embedded during the encoding process and are therefore not backwards compatible with existing watermarked media content. To improve an accuracy of the enhanced watermark detection for both baseline audio watermarks and enhanced audio watermarks, in some examples the system 120 may perform enhanced watermark detection by decoding audio data using time shifts (e.g., frame offsets). For example, instead of performing watermark detection using a single watermark decoder that processes a series of watermark frames (e.g., 10 ms of audio data for each watermark frame, although the disclosure is not limited thereto), the system 100 may perform enhanced watermark detection using multiple watermark decoders that process the series of watermark frames using multiple time shifts (e.g. frame offsets). Thus, each of the multiple watermark decoders processes overlapping watermark frames that are offset from the other watermark decoders by a variable amount.

FIG. 1C illustrates examples of decoding audio watermarks using time shifts according to embodiments of the present disclosure. As illustrated in FIG. 1C, time shift decoding 170 may correspond to performing enhanced watermark detection using a variety of time shifts (e.g., frame offsets). For example, FIG. 1C illustrates a first example corresponding to 2× shifts-per-frame 175, a second example corresponding to 4× shifts-per-frame 180, and a third example corresponding to 8× shifts-per-frame 185, although the disclosure is not limited thereto and the number of time shifts may vary without departing from the disclosure.

When the system 100 performs time shift decoding 170, the system 100 is increasing a resolution of the enhanced watermark detection at the cost of also increasing a processing consumption associated with performing the enhanced watermark detection. For example, performing 2× shifts-per-frame doubles the processing consumption associated with performing enhanced watermark detection, but also doubles the resolution. Similarly, performing 4× shifts-per-frame 180 quadruples the processing consumption, but also quadruples the resolution. When the system 100 increases the resolution by performing time shift decoding 170, the system 100 increases a likelihood that one of the watermark decoders is aligned with the audio watermark embedded in the audio data, thereby increasing a likelihood that the audio watermark will be detected during enhanced watermark detection.

To illustrate a first example, performing enhanced watermark detection using two time shifts corresponds to two watermark decoders processing the audio data with a single frame offset between them. This example is illustrated in FIG. 1C as 2× shifts-per-frame 175, which shows that the system 100 may perform first watermark decoding using a first series of watermark frames (e.g., $A_{(n)}$) in parallel with second watermark decoding that uses a second series of watermark frames (e.g., $B_{(n)}$) that are offset from the first series by a fixed amount (e.g., 50%). For example, a first watermark decoder may process the audio data using the first series of watermark frames having a first time shift (e.g., 0 ms), while a second watermark decoder may process the audio data using the second series of watermark frames having a second time shift (e.g., 5 ms).

As illustrated in FIG. 1C, the first series of watermark frames are represented by $A_{(n)}$, where n denotes a particular watermark frame in the first series of watermark frames and each watermark frame in the first series is associated with a first duration of time (e.g., "x"). As the first series is used as a reference in this example, a first time shift associated with the first series is equal to zero. For example, a first watermark frame associated with the first series of watermark frames (e.g., $A_{(n)}$) may begin at a first time (e.g., 0) and end at a second time (e.g., x). Similarly, a subsequent watermark frame (e.g., $A_{(n+1)}$) may begin at the second time (e.g., x) and end at a third time (e.g., 2×), a following watermark frame (e.g., $A_{(n+2)}$) may begin at the third time (e.g., 2×) and end at a fourth time (e.g., 3×), and so on. Likewise, a previous watermark frame (e.g., $A_{(n-1)}$) may begin at a fifth time (e.g., −x) and end at the first time (e.g., 0).

In contrast, the second series of watermark frames are represented by $B_{(n)}$, where n denotes a particular watermark frame in the second series of watermark frames and each watermark frame in the second series is also associated with the first duration of time. As illustrated in FIG. 1C, the second series has a frame offset relative to the first series, such that a second time shift associated with the second series of watermark frames is equal to 0.5×. For example, a second watermark frame associated with the second series of watermark frames (e.g., $B_{(n)}$) may begin at a sixth time (e.g., 0.5×) and end at a seventh time (e.g., 1.5×). Thus, the second watermark frame overlaps the first watermark frame by 50%, with a second half of the first watermark frame being equal to a first half of the second watermark frame. A subsequent watermark frame (e.g., $B_{(n+1)}$) may begin at the seventh time (e.g., 1.5×) and end at an eighth time (e.g., 2.5×), a following watermark frame (e.g., $B_{(n+2)}$) may begin at the eighth time (e.g., 2.5×) and end at a ninth time (e.g., 3.5×), and so on. Similarly, a previous watermark frame (e.g., $B_{(n-1)}$) may begin at a tenth time (e.g., −0.5×) and end at the sixth time (e.g., 0.5×).

To illustrate a second example, performing enhanced watermark detection using four time shifts corresponds to four watermark decoders processing the audio data with three frame offsets between them. This example is illustrated in FIG. 1C as 4× shifts-per-frame 180, which shows that the system 100 may perform first watermark decoding using a first series of watermark frames (e.g., $A_{(n)}$), second watermark decoding using a second series of watermark frames (e.g., $B_{(n)}$), third watermark decoding using a third series of watermark frames (e.g., $C_{(n)}$), and fourth watermark decoding using a fourth series of watermark frames (e.g., $D_{(n)}$). Thus, the time shifts are staggered by 0.25×, such that the first series has a first time shift (e.g., 0), the second series has a second time shift (e.g., 0.25×), the third series has a third time shift (e.g., 0.5×), and the fourth series has a fourth time shift (e.g., 0.75×).

As illustrated in FIG. 1C, as the second series is associated with the second time shift (e.g., 0.25×) relative to the first series, the second watermark frame (e.g., $B_{(n)}$) overlaps the first watermark frame (e.g., $A_{(n)}$) by 75%. For example, a first portion of the audio data (e.g., from 0.25× to 0.75×) is included in both the first watermark frame and the second watermark frame. Similarly, as the third series is associated with the third time shift (e.g., 0.5×) relative to the first series, a third watermark frame (e.g., $C_{(n)}$) associated with the third series overlaps the first watermark frame (e.g., $A_{(n)}$) by 50%. For example, a second portion of the audio data (e.g., from 0.5× to x) is included in both the first watermark frame and the third watermark frame. Finally, as the fourth series is associated with the fourth time shift (e.g., 0.75×) relative to the first series, a fourth watermark frame (e.g., $D_{(n)}$) associated with the fourth series overlaps the first watermark frame (e.g., $A_{(n)}$) by 25%. For example, a third portion of the audio data (e.g., from 0.75× to x) is included in both the first watermark frame and the fourth watermark frame. To illustrate a third example, performing enhanced watermark detection using eight time shifts corresponds to eight watermark decoders processing the audio data with seven frame offsets between them. This example is illustrated in FIG. 1C as 8× shifts-per-frame 185, which shows that the system 100 may perform watermark decoding using eight different series of watermark frames (e.g., $A_{(n)}$ to $H_{(n)}$), with corresponding time shifts staggered by 0.125×.

While the examples illustrated in FIG. 1C are described with reference to multiple watermark decoders performing watermark detection in parallel, the disclosure is not limited thereto. In some examples, the enhanced watermark detection illustrated in FIG. 1C may be performed by a single component without departing from the disclosure. Thus, instead of multiple separate watermark decoders individually processing each series of watermark frames, a single watermark decoder may process multiple series of watermark frames without departing from the disclosure.

Figure 2E:
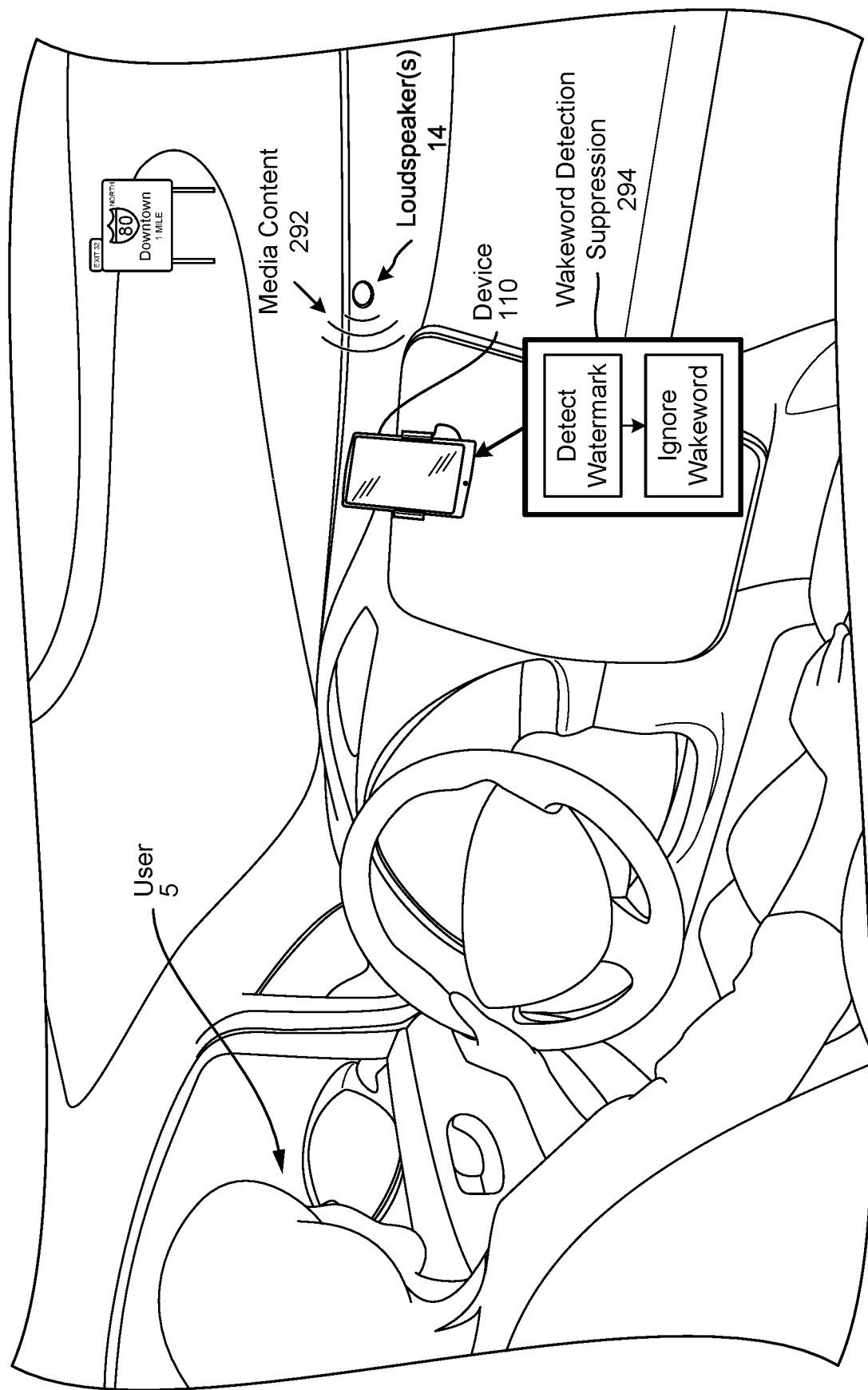

FIGS. 2A-2E illustrate examples of unique functionality enabled by encoding and decoding audio watermarks according to embodiments of the present disclosure. As illustrated in FIG. 2A, a first media content example 210 corresponds to embedding an audio watermark in media content 212 to perform wakeword detection suppression during playback of the media content 212. For example, the media content 212 may correspond to audio, video, and/or other media content that includes a sentence (e.g., "Alexa, how are you doing") that includes a representation of a wakeword. For ease of illustration, wakeword detection suppression may be referred to as wakeword suppression without departing from the disclosure.

During normal playback of the media content 212 (e.g., without the audio watermark embedded), a fourth device 110d (e.g., television) may generate output audio corresponding to the media content 212 and neighboring device(s) 110 (e.g., first device 110a, second device 110b, third device 110c, and/or the like) may detect a representation of the wakeword. In response to detecting the representation of the wakeword, the neighboring device(s) 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the media content 212 is embedded with the audio watermark, however, the neighboring device(s) 110 may detect the audio watermark and ignore the representation of the wakeword. As illustrated in FIGS. 2A-2C, an embedded audio watermark is indicated by bolded and underlined text. Thus, the first media content example 210 indicates that the audio watermark is embedded within a first word (e.g., "Alexa") of the media content 212. The disclosure is not limited thereto, however, and the audio watermark may be embedded within a different word and/or two or more words of the media content 212 without departing from the disclosure.

In the example illustrated in FIG. 2A, the only device 110 close enough to the fourth device 110d to detect the representation of the wakeword is the second device 110b. However, as a result of the audio watermark being embedded in the media content 212, FIG. 2A illustrates a second media content example 220 showing that the second device 110b may perform wakeword detection suppression 222 by detecting the audio watermark and ignoring the wakeword. Thus, despite detecting the representation of the wakeword, the neighboring device(s) 110 (e.g., first device 110a, second device 110b, third device 110c, and/or the like) may not generate audio data and/or send the audio data to the system 120.

As illustrated in FIG. 2B, a first cross-talk example 230 corresponds to embedding an audio watermark in text-to-speech (TTS) output 232 to perform wakeword detection suppression during playback of the TTS output 232. For example, the TTS output 232 may correspond to audio that includes synthesized speech corresponding to a sentence (e.g., "Calling Alexa Smith from your contacts") that includes a representation of a wakeword.

During normal playback of the TTS output 232 (e.g., without the audio watermark embedded), the second device 110b may generate output audio corresponding to the TTS output 232 and neighboring device(s) 110 (e.g., first device 110a, third device 110c, and/or the like) may detect a representation of the wakeword. In response to detecting the representation of the wakeword, the neighboring device(s) 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the TTS output 232 is embedded with the audio watermark, however, the neighboring device(s) 110 may detect the audio watermark and ignore the representation of the wakeword. As mentioned above, an embedded audio watermark is indicated by bolded and underlined text. Thus, the first cross-talk example 230 indicates that the audio watermark is embedded within a first word (e.g., "Alexa") of the TTS output 232. The disclosure is not limited thereto, however, and the audio watermark may be embedded within a different word and/or two or more words of the TTS output 232 without departing from the disclosure. As a result of the audio watermark being embedded in the TTS output 232, FIG. 2B illustrates a second cross-talk example 240 showing that the first device 110a and the third device 110c may perform wakeword detection suppression 242 by detecting the audio watermark and ignoring the wakeword. Thus, despite detecting the representation of the wakeword, the neighboring device(s) 110 (e.g., first device 110a, third device 110c, and/or the like) may not generate audio data and/or send the audio data to the system 120.

While FIGS. 2A-2B illustrate examples of performing wakeword detection suppression, the disclosure is not limited thereto. Instead, the system 120 may embed audio watermarks in order to implement other unique functionality that is not limited to performing wakeword detection suppression. FIG. 2C illustrates an example of performing local signal transmission in order to send commands to neighboring device(s) 110 by generating audio. For example, the second device 110*b* may generate output audio that includes an embedded audio watermark. While the audio watermark corresponds to a command, it may be embedded within the output audio such that it is undetectable by the user 5. Thus, neighboring device(s) 110 may capture the output audio using one or more microphone(s) 112, detect the audio watermark embedded in the output audio, determine the command associated with the audio watermark, and perform one or more action(s) corresponding to the command.

As illustrated in FIG. 2C, a first transmission example 250 corresponds to embedding an audio watermark in audio output 252 to perform local signal transmission and send a command to one or more neighboring device(s) 110. For example, the audio output 252 may correspond to audio that includes synthesized speech representing a sentence (e.g., "Searching for nearby devices"). In contrast to the examples illustrated in FIGS. 2A-2B, the audio output 252 does not include a representation of the wakeword. While the audio output 252 is described as corresponding to synthesized speech (e.g., generated using text-to-speech processing), the disclosure is not limited thereto and the audio output 252 may correspond to any other audio data without departing from the disclosure.

During normal playback of the audio output 252 (e.g., without the audio watermark embedded), the second device 110*b* may generate the audio output 252 using the loudspeaker(s) 114. As a representation of the wakeword is not included in the audio output 252, the neighboring device(s) 110 (e.g., first device 110*a*, third device 110*c*, and/or the like) will not detect a representation of the wakeword and therefore may ignore the audio output 252 and not capture audio data or perform any action(s).

When the audio output 252 is embedded with the audio watermark, however, the neighboring device(s) 110 may detect the audio watermark and perform one or more actions associated with the audio watermark. As mentioned above, an embedded audio watermark is indicated by bolded and underlined text. Thus, the first transmission example 250 indicates that the audio watermark is embedded within a first word (e.g., "Searching") of the audio output 252. The disclosure is not limited thereto, however, and the audio watermark may be embedded within a different word and/or two or more words of the audio output 252 without departing from the disclosure. As a result of the audio watermark being embedded in the audio output 252, FIG. 2C illustrates a second transmission example 260 showing that the first device 110*a* and the third device 110*c* may perform local signal transmission 262 by detecting the audio watermark and performing action(s). Thus, despite not detecting the representation of the wakeword, the neighboring device(s) 110 (e.g., first device 110*a*, third device 110*c*, and/or the like) may perform one or more action(s) associated with the audio watermark embedded within the audio output 252.

As discussed above, the one or more action(s) may correspond to sending a message to the second device 110*b* and/or the system 120, although the disclosure is not limited thereto. Instead, the one or more action(s) may correspond to any command known to one of skill in the art. As will be discussed in greater detail below, the devices 110 and/or the system 120 may use a watermark database to detect one of a plurality of audio watermarks. For example, each audio watermark included in the watermark database may correspond to a specific command and/or group of commands.

Additionally or alternatively, an audio watermark may correspond to a specific device, a group of devices, and/or be generic to all devices. For example, the second device 110*b* may embed a first audio watermark to send a first command to the first device 110*a* at a first time, may embed a second audio watermark to send a second command to the third device 110*c* at a second time, and/or may embed a third audio watermark to send a third command to both the first device 110*a* and the third device 110*c* at a third time.

In some examples, the system 120 may detect an audio watermark that corresponds to a unique identifier associated with media content. For example, the audio watermark may be embedded in the media content to identify the media content in order to enable watermark enhanced entity resolution. In response to detecting the audio watermark, the system 120 may determine context data or other information associated with the unique identifier, may perform language processing using the audio data, and may use the context data and the language processing to interpret a voice command represented in the audio data, although the disclosure is not limited thereto.

As illustrated in FIG. 2D, media content may be embedded with an audio watermark to enable watermark enhanced entity resolution. For example, media content example 270 illustrates a scenario in which a fourth device 110*d* is playing media content 272 that is embedded with an audio watermark that is unique to the media content 272. In some examples, the audio watermark may specifically indicate the media content 272 and/or may be associated with context data that provides information about what the media content 272 is, products or other objects represented in the media content 272, and/or the like, although the disclosure is not limited thereto. While the media content 272 is playing, a second device 110*b* may capture audio input 274 from the user 5 (e.g., "Alexa, add that to my shopping list") that is associated with the media content 272.

Entity resolution example 280 illustrates an example of performing watermark enhanced entity resolution 282 using the audio watermark detected in the media content 272. For example, the second device 110*b* may detect the audio watermark, detect the wakeword, and then process a voice command using the audio watermark. In some examples, processing the voice command may comprise sending the audio data and/or the audio watermark (or an indication of the media content 272) to the system 120 for language processing, although the disclosure is not limited thereto. In other examples, however, the second device 110*b* and/or another device in proximity to the second device 110*b* may be capable of processing the voice command locally without sending the audio data to the system 120.

To illustrate an example of processing the voice command using the audio watermark, the media content 272 may correspond to a commercial for a particular product. The system 120 may perform language processing using audio data representing the audio input 274 and determine that the audio input 274 represents an utterance (e.g., "add that to my shopping list"). However, the utterance does not include enough information to resolve which entity is to be added to the shopping list. As the system 120 knows that the audio watermark was detected around the time that the audio input 274 was captured, the system 120 may perform watermark enhanced entity resolution to determine that the utterance is referring to the product featured in the commercial. Thus, the audio watermark enabled the system 120 to correctly identify what the user 5 intended to add to the shopping list without further dialog with the user 5.

While FIG. 2D illustrates the second device 110b detecting the audio watermark prior to detecting the wakeword, the disclosure is not limited thereto. In some examples, the second device 110b may detect the wakeword prior to detecting the audio watermark. Additionally or alternatively, the second device 110b may not detect the audio watermark and may only detect the wakeword and the system 120 may still perform watermark enhanced entity resolution. For example, the second device 110b may detect the wakeword and send audio data representing the voice command to the system 120 for language processing. While processing the audio data, the system 120 may determine that the audio watermark is represented in the audio data and may use information associated with the audio watermark to resolve the utterance represented in the audio data without departing from the disclosure.

As illustrated in FIG. 2E, a media content example 290 corresponds to embedding an audio watermark in media content 292 to perform wakeword detection suppression during playback of the media content 292 in a vehicle. For example, the media content 292 may correspond to audio, video, and/or other media content that includes a sentence including a representation of a wakeword.

During normal playback of the media content 292 (e.g., without the audio watermark embedded), loudspeaker(s) 14 included in the vehicle may generate output audio corresponding to the media content 292 and a device 110 (e.g., smart phone) may detect a representation of the wakeword. In response to detecting the representation of the wakeword, the device 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the media content 292 is embedded with the audio watermark, however, the device 110 may detect the audio watermark and ignore the representation of the wakeword. In the example illustrated in FIG. 2E, the device 110 detects the representation of the wakeword and performs wakeword detection suppression 294 by detecting the audio watermark and ignoring the wakeword. Thus, despite detecting the representation of the wakeword, the device 110 may not generate audio data and/or send the audio data to the system 120.

While FIGS. 2A-2E illustrate audio data only being embedded with a single audio watermark, the disclosure is not limited thereto and audio data may be embedded with multiple audio watermarks without departing from the disclosure. For example, the audio output 252 may embed multiple audio watermarks within the sentence and/or within a single word of the sentence without departing from the disclosure.

Figure 3A:
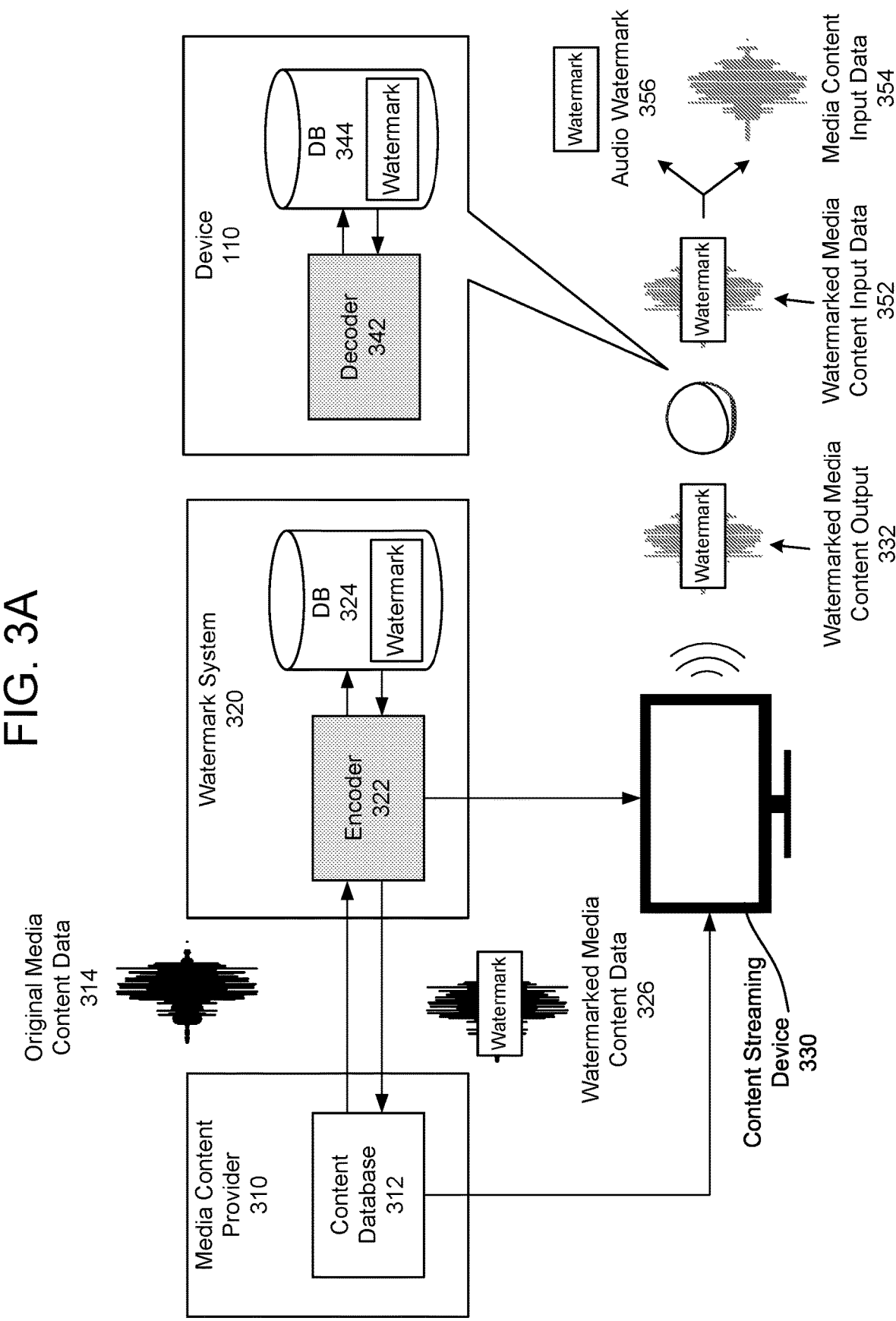

FIGS. 3A-3B illustrate examples of a component diagram for encoding media content according to embodiments of the present disclosure. Referring back to FIG. 2A, embedding an audio watermark in media content may enable wakeword detection suppression during playback of the media content. As an example of media content, FIG. 3A illustrates a media content provider 310 including a content database 312 of media content, such as original media content data 314. For example, the media content provider 310 may be a streaming service that streams the original media content data 314 to the device(s) 110 (e.g., a subscription streaming service).

However, the disclosure is not limited thereto and the media content provider 310 may correspond to any source of media content, including network storage or other local devices that are accessible only to the user 5. In addition, the media content may correspond to any media content known to one of skill in the art, including audio data (e.g., music, radio stations, etc.), video data (e.g., television shows, movies, home videos, etc.), and/or the like.

In some examples, the system 100 may monitor the original media content data 314 while streaming the original media content data 314 to a content streaming device 330 in order to detect representation(s) of a wakeword and embed an audio watermark within each representation of the wakeword. For example, the media content provider 310 may send the original media content data 314 to the content streaming device 330 via a watermark system 320. The watermark system 320 may include an encoder component 322 and a watermark database 324 and the watermark system 320 may embed audio watermarks in the original media content data 314 to generate watermarked media content data 326. In this implementation, the watermark system 320 may store the watermarked media content data 326 and/or may directly stream the watermarked media content data 326 to the content streaming device 330. However, this implementation may consume a lot of resources and is inefficient as the system 100 must generate the watermarked media content data 326 each time the original media content data 314 is viewed by the user 5.

To improve efficiency, the media content provider 310 may instead send the original media content data 314 to the watermark system 320 a single time and may receive the watermarked media content data 326 from the watermark system 320. For example, media content provider 310 may send the original media content data 314 from the content database 312 to the watermark system 320, the watermark system 320 may generate watermarked media content data 326 corresponding to the original media content data 314, and may send the watermarked media content data 326 back to the media content provider 310. Thus, the media content provider 310 may update the content database 312 with the watermarked media content data 326 and may stream the watermarked media content data 326 directly to the content streaming device 330 in the future. Thus, this implementation embeds the audio watermarks a single time and reuses the watermarked media content data 326.

As illustrated in FIG. 3A, the content streaming device 330 may use the watermarked media content data 326 to generate watermarked media content output 332 via one or more loudspeaker(s). However, due to a distance between the one or more loudspeaker(s) of the content streaming device 330 and the device 110, the watermarked media content output 332 received by the device 110 includes distortion caused by reverberations (e.g., reflection/refraction of a sound wave inside a building structure). Thus, the watermarked media content output 332 captured by the device 110 is not identical to the watermarked media content 326, which is illustrated in FIG. 3A as the waveform changing shape and color (e.g., from black to gray). While there are multiple conventional techniques for detecting audio watermarks within digital audio data, the distortion caused by reverberation results in many of these techniques being unable to accurately detect the audio watermark after watermarked audio data is output by loudspeaker(s) and recaptured by microphone(s).

In contrast, the system 100 may be configured to detect the audio watermark despite the effects of reverberation. For example, the device 110 may include a decoder component 342 and a watermark database 344. The device 110 may capture the watermarked media content output 332 using one or more microphone(s) 112 and generate watermarked media content input data 352. Using the decoder component 342 and/or the watermark database 344, the device 110 may detect an audio watermark 356 embedded within the watermarked media content input data 352 and the device 110 may generate media content input data 354 and the audio watermark 356.

The decoding algorithm used by the system 100 may be able to detect the audio watermark 356 despite the effects of reverberation by performing a self-correlation. For example, while a cross-correlation between an ideal representation of the audio watermark 356 (e.g., without distortion) and the watermarked media content input data 352 may be unable to accurately detect the audio watermark 356, the system 100 may perform a cross-correlation between a first portion of the watermarked media content input data 352 and a second portion of the watermarked media content input data 352. As the encoder component 322 repeats the audio watermark 356 across two or more portions of the watermarked media content data 326, the effects of reverberation are applied equally to both a first representation of the audio watermark 356 included in the first portion and a second representation of the audio watermark 356 included in the second portion.

While FIG. 3A illustrates an example of generating output audio using loudspeaker(s) and detecting the audio watermark 356 despite the effects of reverberation, the disclosure is not limited thereto. Instead, the audio watermark may be embedded in audio data for copyright protection, without regard to whether the watermarked audio data will be output by loudspeaker(s). For example, the audio watermark may be embedded in media content data and transmitted digitally to a remote device, and the remote device may detect the audio watermark prior to generating any output audio. An example implementation is illustrated in FIG. 3B.

As illustrated in FIG. 3B, a first device 110a may include a content database 360 of media content data, an encoder component 362, and a watermark database 364. The first device 110a may use the encoder component 362 to embed an audio watermark in media content data to generate watermarked media content data 366 and may send the watermarked media content data 366 to a second device 110b via network(s) 199 (e.g., using wired network(s), wireless network(s), and/or a combination thereof).

The second device 110b may receive the watermarked media content data 366 as a digital copy. The watermarked media content data 366 may have been subjected to multiple transmission channels, including encoding/decoding and/or compression, but the watermarked media content data 366 received by the second device 110b is substantially similar to when it was originally transmitted by the first device 110a. The second device 110b may include a decoder component 372 and a watermark database 374 and may separate the audio watermark 376 from the media content data 378. As a result of detecting the audio watermark 376, the second device 110b may perform an action corresponding to the audio watermark 376. For example, the second device 110b may apply copyright protection, preventing output of the media content data 378, copying of the media content data 378, and/or the like, although the disclosure is not limited thereto.

Figure 4B:
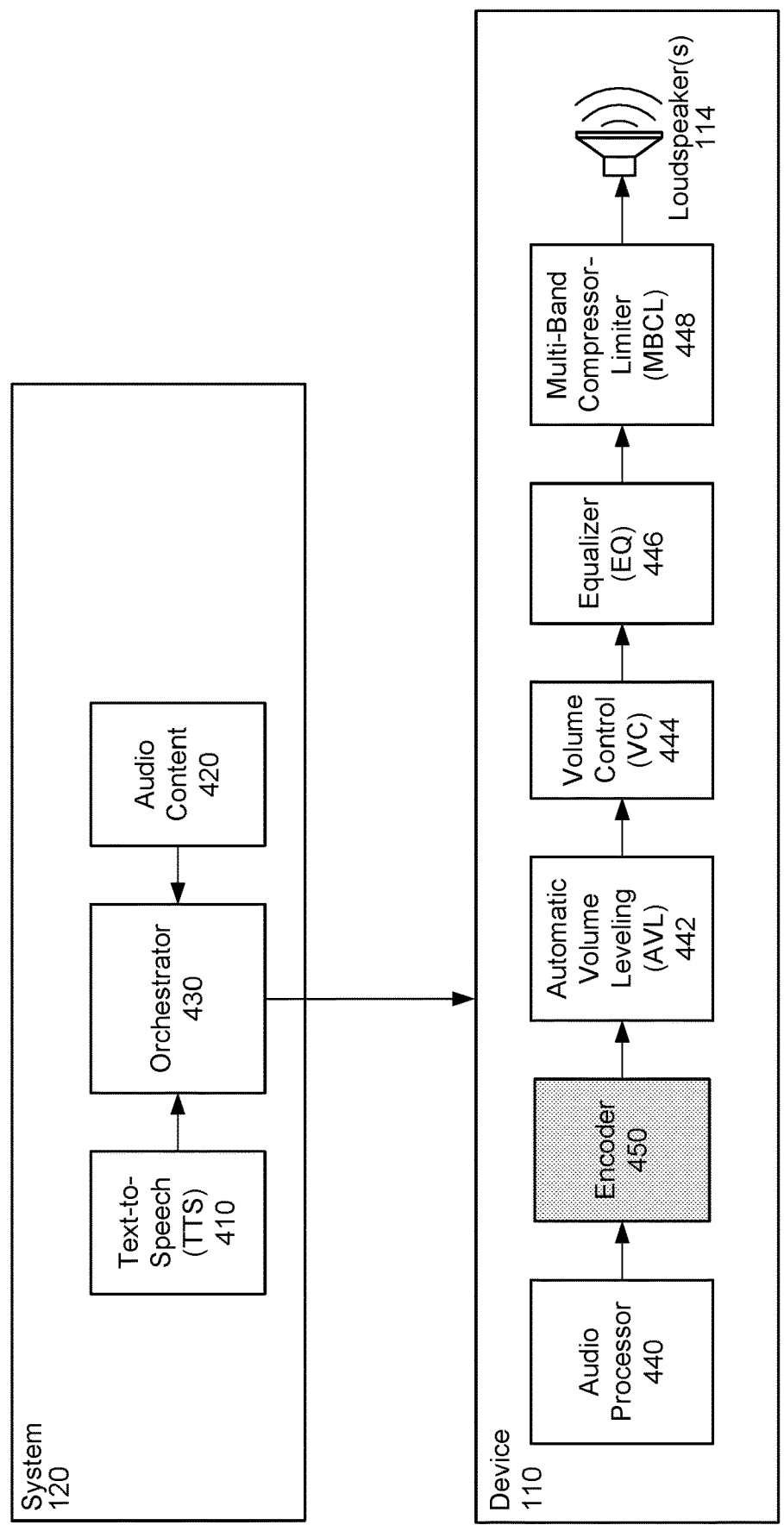
Figure 4C:
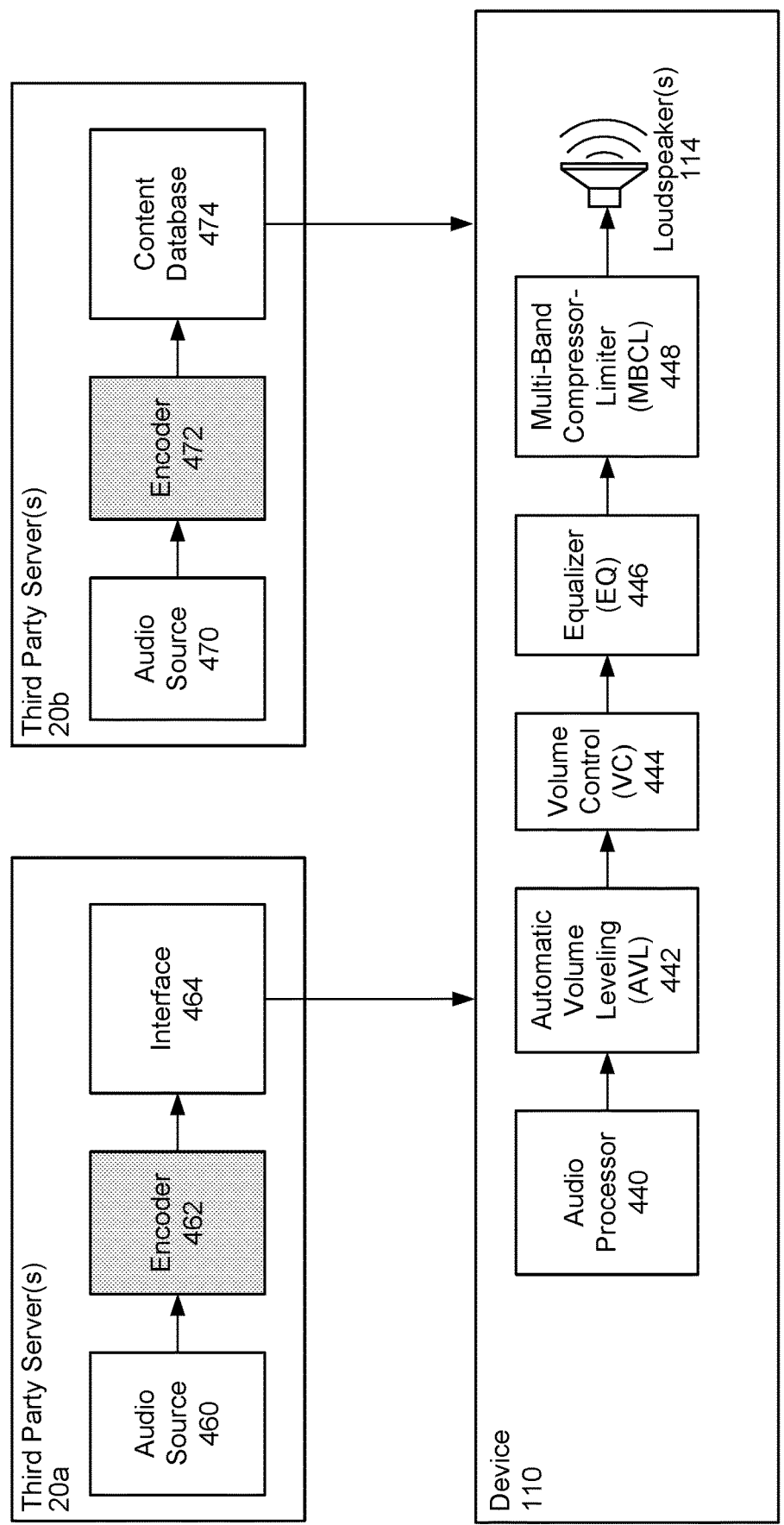

FIGS. 4A-4C illustrate examples of component diagrams for encoding audio watermarks according to embodiments of the present disclosure. As illustrated in FIG. 4A, the system 120 may encode audio watermarks using one or more encoders located along one or more audio paths.

As a first example, FIG. 4A illustrates a first encoder component (e.g., encoder component 412) along a first audio path (e.g., text-to-speech audio path). For example, the encoder component 412 may be included as part of a text-to-speech (TTS) 410 component operating on the system 120. Thus, the TTS 410 component may generate first audio data corresponding to synthesized speech and the encoder component 412 may generate second audio data by embedding the audio watermarks. Therefore, TTS output data generated by the TTS 410 component may include one or more embedded audio watermarks. While FIG. 4A illustrates the encoder component 412 as part of the TTS 410 component, the disclosure is not limited thereto and the encoder component 412 may be separate from the TTS 410 component without departing from the disclosure.

As a second example, FIG. 4A illustrates a second encoder component (e.g., encoder component 422) along a second audio path (e.g., audio content path). For example, the encoder component 422 may be an independent component that receives first audio data from an audio source 420 and may generate second audio data by embedding the audio watermark(s) in the first audio data. In contrast to the TTS audio path, which generates synthesized speech, the audio content path corresponds to non-TTS audio data, such as audio data corresponding to speech (e.g., pre-recorded first speech stored in a database, second speech generated by a remote user during a conversation, etc.), media content (e.g., pre-recorded audio sounds, pre-generated audio clips or audio recordings, audio associated with a video, etc.), and/or the like. Therefore, audio content data originating from the audio source 420, which can be a remote device, remote storage, a database of audio data, and/or the like, may be modified by embedding audio watermarks.

While FIG. 4A illustrates the system 120 including the first encoder component 412 and the second encoder component 422, the disclosure is not limited thereto. Instead, the system 120 may include the first encoder component 412, the second encoder component 422, and/or both the first encoder component 412 and the second encoder component 422 without departing from the disclosure.

Whether generated by the TTS 410 component or originating from the audio source 420, the first watermarked output audio data is sent to the orchestrator 430 of the system 120 and the orchestrator 430 sends the first watermarked output audio data to the device 110 to be output via the loudspeaker(s). To illustrate an example audio path associated with outputting the first watermarked output audio data, the device 110 may modify the first watermarked output audio data using an audio processor 440, an automatic volume leveling (AVL) 442 component (which may correspond to an automatic volume leveling and control (AVCL) component), a volume control (VC) 444 component, an equalizer (EQ) 446 component, and/or a multi-band compressor-limiter (MBCL) 448 component to generate the second watermarked output audio data to be sent to the loudspeaker(s) 114.

Instead of or in addition to encoding the audio watermark on the system 120, in some examples the device 110 may include an encoder component 450 and may encode the audio watermark(s) directly. As illustrated in FIG. 4B, the system 120 may not include an encoder component and may send first audio data without audio watermarks to the device 110. The device 110 may process the first audio data and generate watermarked second audio data using the encoder component 450. While FIG. 4B illustrates the encoder component 450 in a specific location along the audio pipeline, the disclosure is not limited thereto and a location of the encoder component 450 may vary without departing from the disclosure.

FIG. 4A only illustrates the system 120 being configured to perform watermark encoding, whereas FIG. 4B only illustrates the device 110 being configured to perform watermark encoding. However, the disclosure is not limited thereto, and in some examples both the system 120 and the device 110 may be configured to perform watermark encoding. For example, while the system 120 may perform a majority of the audio watermark encoding, the device 110 may be configured to embed audio watermarks in certain situations.

While FIGS. 4A-4B illustrate the system 120 and/or the device 110 performing watermark encoding, the disclosure is not limited thereto. As illustrated in FIG. 3A, a separate device (e.g., watermark system 320) may perform the watermark encoding without departing from the disclosure. However, while FIG. 3A illustrated the watermarked media content being output via loudspeaker(s) prior to being decoded, the disclosure is not limited thereto. Instead, FIG. 4C illustrates examples of a third party device or third party server(s) performing watermark encoding to generated watermarked audio data and the watermarked audio data being decoded prior to being output via loudspeaker(s). For example, the watermarked audio data may be generated and transmitted digitally to the device 110, and the device 110 may detect the audio watermark prior to generating any output audio via the loudspeaker(s) 114.

As a first example, FIG. 4C illustrates a first encoder component (e.g., encoder component 462) included within third party server(s) 20a along a first audio path. As illustrated in FIG. 4C, the first encoder component 462 may perform watermark encoding during transmission of first audio data. For example, the first audio data may originate at an audio source 460 and may be sent to encoder component 462, which generates second audio data by embedding an audio watermark within the first audio data. The second audio data is then sent to interface 464, which sends the second audio data to the device 110.

As a second example, FIG. 4C illustrates a second encoder component (e.g., encoder component 472) included within third party server(s) 20b along a second audio path, similar to the example illustrated in FIG. 3A. As illustrated in FIG. 4C, the second encoder component 472 may perform watermark encoding prior to transmission. For example, third audio data may originate at an audio source 470 and may be sent to encoder component 472, which generates fourth audio data by embedding an audio watermark within the third audio data. The fourth audio data is then sent to content database 474, which stores the fourth audio data. At a later point in time, the device 110 may send a request to the third party server(s) 20b to receive the fourth audio data, and the content database 474 may send the fourth audio data (e.g., watermarked audio data) to the device 110.

While FIGS. 4A-4C illustrate the device 110, the system 120, and/or the third party server(s) 20 including a number of components, this is intended as an illustrative example and the disclosure is not limited thereto. Instead, the device 110, the system 120, and/or the third party server(s) 20 may include additional components not illustrated in FIGS. 4A-4C and/or may omit components illustrated in FIGS. 4A-4C.

While not illustrated in FIGS. 4A-4C, the encoders 412/422/450/462/472 may include a volume control component configured to dynamically determine a scaling factor with which to embed the audio watermark, as described in greater detail below with regard to FIGS. 6-8. For example, the encoder component(s) may be configured to determine Bark-scale values of the media content data in order to calculate scaling factor(s) with which to scale audio watermark data. Using the scaling factor(s), the encoder component(s) may generate scaled watermark data and embed the scaled watermark data in the media content data in order to generate watermarked media content data.

Figure 5D:
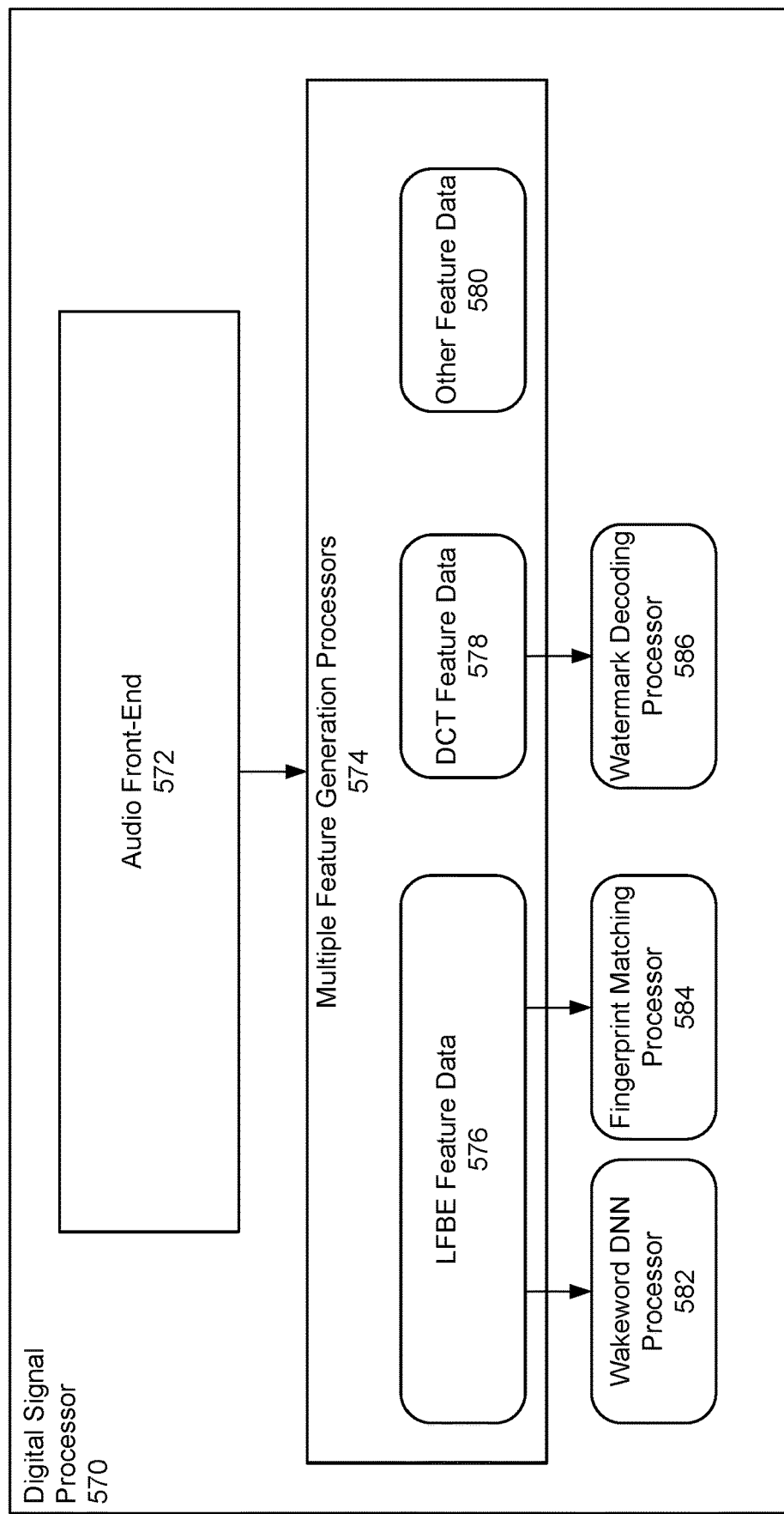

FIGS. 5A-5D illustrate examples of component diagrams for decoding audio watermarks according to embodiments of the present disclosure. As illustrated in FIGS. 5A-5B, the device 110 may include a decoder component 430 configured to detect audio watermarks and the decoder component 430 may be located along an input audio path. For example, the device 110 may include a number of components along the input audio path, such as an N-microphone array 510, a wakeword engine 512, an N-channel adaptive linear acoustic echo canceller (AEC) 514, an N-channel adaptive residual echo suppression 516, an N-channel adaptive beamformer 518, a main beam selector 520, adaptive gain control 522, and/or automatic speech recognition 524.

FIG. 5A illustrates a first example in which the decoder component 530a is included in the wakeword engine 512. For example, as the wakeword engine 512 may process all inbound audio data generated by the one or more microphone(s) 112, the device 110 may include the decoder component 530a as part of the wakeword engine 512 and may use the decoder component 530a to process all inbound audio data. However, the disclosure is not limited thereto. Instead, FIG. 5B illustrates a second example in which the decoder component 530b is an independent device (e.g., separate from the wakeword engine 512) that receives duplicate copies of the audio data. While FIG. 5B illustrates the decoder component 530b generating output data and sending the output data to the wakeword engine 512, this is intended to conceptually illustrate a simple example and the disclosure is not limited thereto. For example, the decoder component 530b may send the output data to other components in addition to or instead of the wakeword engine 512 without departing from the disclosure.

While FIGS. 5A-5B illustrate the device 110 including the decoder component 530, the disclosure is not limited thereto. In addition to and/or instead of the device 110 including the decoder component 530, the system 100 may detect audio watermark(s) using decoder(s) located in the system 120. For example, FIG. 5C illustrates the system 120 including a first decoder component 552 that is incorporated into a watermark verification 550 component. In this example, the device 110 may perform real-time audio watermark detection using a local decoder component 530 and the system 120 may verify whether the audio watermarks were accurately detected. For example, the device 110 may send the audio data to the orchestrator 540 and the orchestrator 540 may send the audio data to the watermark verification 550 for decoding.

In some examples, however, instead of including an independent watermark verification 550 component, the system 120 may modify an existing wakeword verification 560 component to include a decoder component 562. For example, the system 120 may already include the wakeword verification 560 component in order to verify whether wakewords are properly detected in the audio data or not. Thus, the orchestrator 540 receives the audio data from the device 110 and automatically sends the audio data to the wakeword verification 560 component. If the wakeword verification 560 component includes the decoder component 562, the wakeword verification X560 component may use the decoder component 562 to detect the audio watermark in the audio data along with verifying whether the wakeword is accurately detected.

As discussed above, in some examples the device 110 may include the decoder component 530 and detect the audio watermark locally. Therefore, the system 120 may include the first decoder component 552 and/or the second decoder component 562 in order to perform oversight by verifying an accuracy of the audio watermark detection. However, the disclosure is not limited thereto and in other examples, the device 110 may not include the decoder component 530 and the system 120 may include the first decoder component 552 and/or the second decoder component 562 and may detect all audio watermarks included in the audio data received from the device 110.

If the system 120 include the decoder component 552 and/or the decoder component 562, the system 120 may detect an audio watermark in the audio data as discussed above. Additionally or alternatively, the system 120 may determine from which device the audio data originated. In some examples, the system 120 may store an indication that the audio watermark was detected in the audio data, including an indication from which particular device the watermarked audio data originated and an indication of which particular device(s) detected the watermarked audio data. Thus, the system 120 may store additional information associated with the generation and transmission of the audio watermark and/or the watermarked audio data. This information may be stored in a user profile, which the system 120 and/or other systems or services can access to provide functionality to the user 5.

As illustrated in FIG. 5D, the device 110 may include a digital signal processor 570 that includes an audio front-end 572 and multiple feature generation processors 574. For example, the multiple feature generation processors 574 may generate Log-Filter Bank Energies (LFBE) feature data 576 (e.g., log-mel filter bank energy feature data), Discrete cosine transform (DCT) feature data 578, and/or other feature data 580.

The feature data may be input to different processors. For example, the LFBE feature data 576 may be input to a wakeword deep neural network (DNN) processor 582, a fingerprint matching processor 584, and/or the like. In contrast, the DCT feature data 578 may be input to a watermark decoding processor 586 to perform watermark decoding.

As mentioned above with regard to FIG. 3A, when an audio watermark is transmitted as a sound wave through the air, reverberations caused by reflection/refraction of the sound wave results in distortion. This distortion may impact an accuracy associated with detecting audio watermarks using conventional techniques. To illustrate an example, a spread spectrum based watermark algorithm may use the following equation to embed an audio watermark:

$$|y\rangle = |x\rangle + |w\rangle \qquad [1]$$

where $|y\rangle$ is the watermark embedded audio sequence, $|x\rangle$ is the original audio signal segment and $|w\rangle$ is the audio watermark. For ease of illustration, the disclosure will use Dirac notation (e.g., Bra-ket notation), with bra-A $\langle A|$ denoting a row vector $\langle A| = (A_1^* \ A_2^* \ \ldots \ A_N^*)$, ket-B $|B\rangle$ denoting a column vector $$|B\rangle = \begin{pmatrix} B_1 \\ B_2 \\ \vdots \\ B_N \end{pmatrix},$$

and an inner product of two vectors (e.g., the bra-A and the ket-B) expressed as $\langle A|B\rangle$. The inner product can also be written as a matrix multiplication of a row vector with a column vector, such as:

$$\langle A|B\rangle \doteq A_1^* B_1 + A_2^* B_2 + \ldots + A_N^* B_N = (A_1^* A_2^* \ \ldots \ A_N^*) \begin{pmatrix} B_1 \\ B_2 \\ \vdots \\ B_N \end{pmatrix} \qquad [2]$$

As illustrated in Equation [2], the inner product corresponds to a sum of products between element i of the bra-A and element i of the ket-B.

The effect of reverberation α can be shown in the time domain:

$$y(t) = \int dt' y(t') \alpha(t-t') \qquad [3]$$

and in the frequency domain:

$$\tilde{y}(q) = y(q)\alpha(q) \qquad [4]$$

where t indicates time and q indicates frequency. Therefore, if α(q) corresponds to a fast oscillation function, the spread-spectrum based audio watermark detection score will be destroyed based on the following:

$$\langle w|y\rangle^q = \langle w|(x+w)\times\alpha\rangle^q$$

$$= \langle w|x\alpha\rangle^q + \langle w|w\alpha\rangle^q \qquad [5]$$

where w is the audio watermark, $\tilde{y}(q)$ is the received embedded audio sequence in the frequency domain, $\langle w|\tilde{y}\rangle^q$ is the inner product of the audio watermark w and the received embedded audio sequence $\tilde{y}(q)$, x is the original audio segment, α is the reverberation function, and the value of $\rangle w|w\alpha\langle^q$ is close to the noise level. To phrase this differently, the original audio watermark $|w\rangle$ used to encode the audio watermark does not accurately detect the received audio watermark $|w\alpha\rangle$ distorted due to the reverberation α.

To illustrate an example, conventional techniques may generate the watermark embedded audio sequence $|y\rangle$ using the original audio watermark $|w\rangle$. When the watermark embedded audio sequence $|y\rangle$ is not distorted by the reverberation α, such as when detecting an audio watermark within digital audio data that was never converted to sound waves and/or when the sound waves traveled a very short distance (e.g., distance between the loudspeaker(s) and the microphone(s) is relatively small), conventional techniques may detect that the audio watermark is present using the original audio watermark $|w\rangle$. However, when the watermark embedded audio sequence $|y\rangle$ is used to generate output audio via loudspeaker(s) and corresponding sound waves travel a longer distance (e.g., distance between the loudspeaker(s) and the microphone(s) is relatively large) before being captured by the microphone array as input audio data, the original audio watermark $|w\rangle$ does not correspond to the received audio watermark $|w\alpha\rangle$ distorted due to the reverberation α and therefore the conventional techniques may be unable to detect the audio watermark in the input audio data.

FIG. 6 illustrates an example of a self-correlation algorithm according to embodiments of the present disclosure. As the reverberation function α does not change drastically between time segments, the system 100 may use a self-correlation algorithm to minimize the oscillations and decode the audio watermark. As illustrated in FIG. 6, the self-correlation algorithm consists of two portions, with the audio watermark $|w\rangle$ being repeated in a first portion a and a second portion b. As the audio watermark $|w\rangle$ is repeated, a first received audio watermark $|w_a\alpha\rangle$ represented within the first portion a corresponds to a second received audio watermark $|w_b\alpha\rangle$ represented within the second portion b. Thus, the system 100 may perform self-correlation by determining a cross-correlation between the first portion a and the second portion b and may detect the audio watermark. As illustrated in FIG. 6:

Encoder:

$$|y\rangle = |y_a\rangle^t \oplus |y_b\rangle^t$$

$$= |x_a + w\rangle^t \oplus |x_b + w\rangle^t \quad [5]$$

Decoder:

$$\langle \tilde{y}_a | \tilde{y}_b \rangle^q = \langle (x_a + w_a) \times \alpha |$$
$$(x_b + w_b) \times \alpha \rangle^q$$

$$= \langle x_a\alpha | x_b\alpha \rangle^q + \langle w_a\alpha | w_b\alpha \rangle^q + \langle w_a\alpha | x_b\alpha \rangle^q + \langle x_a\alpha | w_b\alpha \rangle^q$$

$$\approx \langle x_a | x_b \rangle \alpha^2 \rangle^q + \langle w_a | w_b \rangle \alpha^2 \rangle^q$$

where $|y\rangle$ is the transmitted watermark embedded audio sequence, $|y_a\rangle^t$ is a first portion of the transmitted watermark embedded audio sequence associated with the first portion a, $|y_b\rangle^t$ is a second portion of the transmitted watermark embedded audio sequence associated with the second portion b, $\oplus$ denotes a direct sum, $x_a$ is a first portion of the original audio signal segment associated with the first portion a, $x_b$ is a second portion of the original audio signal segment associated with the second portion b, w is the transmitted audio watermark, $\tilde{y}_a$ is a first portion of a received watermark embedded audio sequence associated with the first portion a, $\tilde{y}_b$ is a second portion of the received watermark embedded audio sequence associated with the second portion b, $\langle \tilde{y}_a | \tilde{y}_b \rangle^q$ is the inner product of the first portion $\tilde{y}_a$ and the second portion $\tilde{y}_b$, $x_a$ is a first portion of the original audio segment associated with the first portion a, $x_b$ is a second portion of the original audio segment associated with the second portion b, $w_a$ is a first representation of the audio watermark associated with the first portion a, $w_b$ is a second representation of the audio watermark associated with the second portion b, a is the reverberation function, $\langle x_a | x_b \rangle$ is the inner product of the first portion $x_a$ and the second portion $x_b$, and $\langle w_a | w_b \rangle$ is the inner product of the first representation $w_a$ and the second representation $w_b$.

As illustrated in Equation [5], the value of cross-terms $\langle w_a\alpha | x_b\alpha \rangle^q$ and $\langle x_a\alpha | w_b\alpha \rangle^q$ will be close to noise level and can be ignored. Thus, the inner product $\langle \tilde{y}_a | \tilde{y}_b \rangle^q$ effectively corresponds to two elements: a first inner product $\langle x_a | x_b \rangle$ between the first portion a and the second portion b of the original audio segment, and a second inner product $\langle w_a | w_b \rangle$ between the first representation $w_a$ and the second representation $w_b$ of the audio watermark. When the original audio segment is not repetitive (e.g., $x_a \neq x_b$), the first inner product $\langle x_a | x_b \rangle$ may be effectively ignored and thus the inner product $\langle \tilde{y}_a | \tilde{y}_b \rangle^q$ corresponds to the audio watermark. As a result, the system 100 may detect a location of the audio watermark by determining the inner product $\langle \tilde{y}_a | \tilde{y}_b \rangle^q$.

However, when the original audio segment is repetitive (e.g., $x_a \sim x_b$), the first inner product $\langle x_a | x_b \rangle$ may result in interference that prevents the system 100 from accurately detecting the audio watermark. For example, FIG. 6 illustrates music chords interfering with the self-correlation algorithm, preventing the system 100 from detecting a clear peak associated with the audio watermark.

To improve detection of the audio watermark, the system 100 may modify the self-correlation algorithm to include additional elements. For example, the system 100 may use an eigenvector matrix as a building block for the audio watermark and may apply a sign sequence to the eigenvector matrix in order to cancel repetitive portions of the original audio segment. In addition, as will be discussed in greater detail below, the system 100 may generate an encoding algorithm that incorporates several discrete concepts, such as the eigenvector matrix, applying the sign sequence, applying neighborhood de-noise, performing segment normalization, and embedding the audio watermark using a guard band. As a result of these improvements, the system 100 may accurately detect the audio watermark using a decoding algorithm that performs the self-correlation discussed above using the eigenvector matrix, applies sign-correction using the sign sequence after canceling repetitive portions of the original audio segment, and performs memorization of segment contraction to reduce a number of computations and/or processing requirement associated with detecting the audio watermark.

Figure 7:
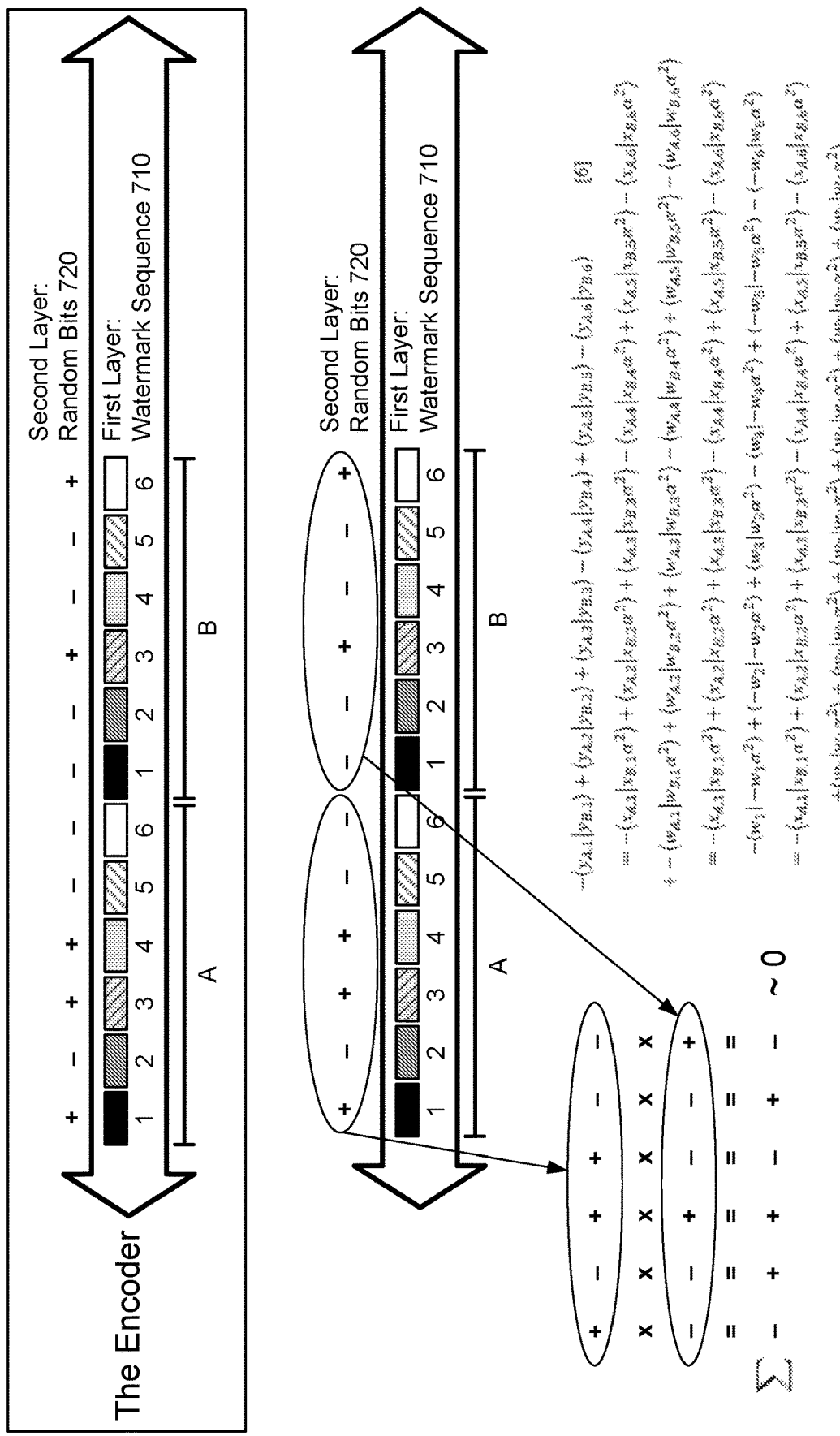
FIG. 7 illustrates an example of a bi-layer watermark encoding structure according to embodiments of the present disclosure.

FIG. 7 illustrates an example of a bi-layer watermark encoding structure according to embodiments of the present disclosure. The bi-layer watermark encoding structure illustrated in FIG. 7 corresponds to two layers, a first layer comprising a watermark sequence (e.g., eigenvector matrix) as a building block for the audio watermark, and a second layer that applies a sign sequence (e.g., shared key) to the watermark sequence in order to cancel repetitive portions of the original audio segment.

As illustrated in FIG. 7, a first layer of encoding comprises a watermark sequence 710, which includes a series of segments (e.g., discrete portions of a repeating pattern), and the watermark sequence 710 repeats a certain number of times (e.g., the entire series of segments repeats two or more times). For example, the watermark sequence 710 illustrated in FIG. 7 includes six segments (e.g., segment 1-6) and repeats twice (e.g., portion A and portion B). Thus, the first portion (e.g., watermark sequence 710a) corresponds a first series of segments A1-A6 and the second portion (e.g., watermark sequence 710b) corresponds to a second series of segments B1-B6. However, the disclosure is not limited thereto and the number of segments and/or the number of repetitions may vary without departing from the disclosure. In some examples, the watermark sequence 710 may correspond to a series of Eigenvectors, as described above, although the disclosure is not limited thereto.

The watermark sequence 710 is a repeating pattern that makes use of the same concept as the self-correlation algorithm. For example, a first segment of the first portion (A1) and a first segment of the second portion (B1) may include first segment data (e.g., first Eigenvector), a second segment of the first portion (A2) and a second segment of the second portion (B2) may include second segment data (e.g., second Eigenvector), and so on. Thus, the system 100 may detect the audio watermark by performing a cross-correlation between the first portion A and the second portion B, with a strong correlation existing between segments having the same segment data (e.g., A1-B1, A2-B2, A3-B3, A4-B4, A5-B5, and A6-B6). While repetitive chords or other repetitions in the original audio segment may interfere with detecting each peak associated with the corresponding segments, the system 100 may detect the audio watermark and/or determine a beginning of the audio watermark using only the watermark sequence 710 without departing from the disclosure.

To improve the detection of the audio watermark, however, the system 100 may apply the sign sequence to the watermark sequence 710 (e.g., Eigenvector matrix) to remove the interference caused by repetitions in the original audio segment. The sign sequence may be a shared key that corresponds to a series of positive or negative values (e.g., +1 or −1) and is applied to the watermark sequence 710 to modify the binary phase of the watermark sequence 710. The sign sequence is illustrated in FIG. 7 as second layer comprised of random bits 720, which may be referred to as a random bit layer (RBL) without departing from the disclosure.

As illustrated in FIG. 7, a first portion of the random bits 720 (e.g., first sign changes associated with portion A) is applied to the first repetition of the watermark sequence 710 (e.g., A1-A6) and a second portion of the random bits 720 (e.g., second sign changes associated with portion B) is applied to the second repetition of the watermark sequence 710 (e.g., B1-B6). The random bits 720 enables the system 100 to detect the audio watermark whether the original audio segment is repetitive (e.g., $x_a$ correlates to $x_b$) or not.

As discussed above and illustrated in Equation [5], the inner product $\rangle \tilde{y}_a | \tilde{y}_b \langle^q$ (e.g., cross-correlation between the first portion A and the second portion B) effectively corresponds to two elements: a first inner product $\rangle x_a | x_b \langle$ between the first portion $x_a$ and the second portion $x_b$ of the original audio segment, and a second inner product $\rangle w_a | w_b \langle$ between the first representation $w_a$ and the second representation $w_b$ of the audio watermark. When the original audio segment is not repetitive (e.g., $x_a \neq x_b$), the first inner product $\rangle x_a | x_b \langle$ may be effectively ignored and thus the inner product $\rangle \tilde{y}_a | \tilde{y}_b \langle^q$ corresponds to the audio watermark.

In contrast, when the original audio segment is repetitive (e.g., $x_a \sim x_b$), the first inner product $\rangle x_a | x_b \langle$ cannot be ignored. However, by applying the random bits 720, the system 100 may cancel out the first inner product $\rangle x_a | x_b \langle$. For example, if an inner product for a first segment $\rangle x_{a1} | x_{b1} \langle$ has a different sign than an inner product for a second segment $\rangle x_{a2} | x_{b2} \langle$, the opposite signs cancel each other out. Thus, a sum of the first inner product $\rangle x_a | x_b \langle$ for each segment of the watermark sequence 710 may be equal to zero, enabling the system 100 to cancel the correlation associated with the original audio segment without cancelling the correlation associated with the audio watermark itself.

As illustrated on the bottom left in FIG. 7, the sign changes associated with the first portion A and the second portion B are multiplied for each segment. For example, an inner product of the first portion of the random bits 720 and the second portion of the random bits 720 results in a series of sign changes that correspond to the cross-correlation between the first portion A and the second portion B. This series of sign changes may apply separately to the first inner product $\rangle x_a | x_b \langle$ between the first portion $x_a$ and the second portion $x_b$ of the original audio segment and the second inner product $\rangle w_a | w_b \langle$ between the first representation $w_a$ and the second representation $w_b$ of the audio watermark, as shown in the equation illustrated on the bottom right of FIG. 7.

$$-\rangle y_{A,1}|y_{B,1}\langle +\rangle y_{A,2}|y_{B,2}\langle +\rangle y_{A,3}|y_{B,3}\langle -\rangle y_{A,4}|y_{B,4}\langle +$$
$$\rangle y_{A,5}|y_{B,5}\langle -\rangle y_{A,6}|y_{B,6}\langle =-\rangle y_{A,1}|y_{B,1}$$
$$\alpha^2 \langle +\rangle y_{A,2}|y_{B,2}\alpha^2 \langle +\rangle y_{A,3}|y_{B,3}\alpha^2 \langle -\rangle y_{A,4}|y_{B,4}\alpha^2$$
$$\langle +\rangle y_{A,5}|y_{B,5}\alpha^2 \langle -\rangle y_{A,6}|y_{B,6}\alpha^2 \langle +-\rangle w_{A,1}|w_{B,1}\alpha^2$$
$$\langle +\rangle w_{A,2}|w_{B,2}\alpha^2 \langle +\rangle w_{A,3}|w_{B,3}\alpha^2 \langle -\rangle$$
$$w_{A,4}|w_{B,4}\alpha^2 \langle +\rangle w_{A,5}|w_{B,5}\alpha^2 \langle -\rangle w_{A,6}|w_{B,6}\alpha^2$$
$$\langle =-\rangle x_{A,1}|x_{B,1}\alpha^2 \langle +\rangle x_{A,2}|x_{B,2}\alpha^2 \langle +\rangle x_{A,3}|x_{B,3}\alpha^2$$
$$\langle -\rangle x_{A,4}|x_{B,4}\alpha^2 \langle +\rangle x_{A,5}|x_{B,5}\alpha^2 \langle -\rangle x_{A,6}|x_{B,6}\alpha^2$$
$$\langle -\rangle w_1|-w_1\alpha^2 \langle +\rangle w_2|-w_2\alpha^2 \langle +\rangle w_3|-w_3\alpha^2$$
$$\langle -\rangle w_4|-w_4\alpha^2 \langle +\rangle w_5|-w_5\alpha^2 \langle -\rangle w_6|-w_6$$

$$\alpha^2 \langle =-\rangle x_{A,1}|x_{B,1}\alpha^2 \langle +\rangle x_{A,2}|x_{B,2}\alpha^2 \langle +\rangle$$
$$x_{A,3}|x_{B,3}\alpha^2 \langle -\rangle x_{A,4}|x_{B,4}\alpha^2 \langle +\rangle x_{A,5}|x_{B,5}$$
$$\alpha^2 \langle -\rangle x_{A,6}|x_{B,6}\alpha^2 \langle +\rangle w_1|w_1\alpha^2 \langle +\rangle w_2|w_2\alpha^2$$
$$\langle +\rangle w_3|w_3\alpha^2 \langle +\rangle w_4|w_4\alpha^2 \langle +\rangle w_5|w_5\alpha^2$$
$$\langle +\rangle w_6|w_6\alpha^2 \langle$$

where $\rangle y_{A,i}|y_{B,i}\langle$ corresponds to an inner product of a first portion of the watermarked audio data and a second portion of the watermarked audio data, $\rangle x_{A,i}|x_{B,i}\langle$ corresponds to an inner product of a first portion of the original audio data and a second portion of the original audio data, $\rangle w_{A,i}|w_{B,i}\langle$ corresponds to an inner product of a first representation of an audio watermark included in the first portion of the watermarked audio data and a second representation of the watermark included in the second portion of the watermarked audio data, and the first representation and the second representation correspond to an original watermark $w_i$, such that $\rangle w_i|w_i\langle$ corresponds to an inner product of the original watermark $w_i$ represented in the first portion of the watermarked audio data and original watermark $w_i$ represented in the second portion of the watermarked audio data.

As illustrated in Equation [6], the system 100 may perform sign correction such that each of the inner products associated with the audio watermark is positive. For example, the system 100 may include the sign indicated by the random bits 720 in the encoding algorithm and may account for the random bits 720 in the decoding algorithm, such that the random bits 720 are squared and therefore positive. As a result, the inner products associated with the original audio data include positive and negative values, which may offset and/or reduce a contribution of the original audio data, while the inner products associated with the audio watermark include only positive values, increasing a contribution of the audio watermark.

Figure 8:
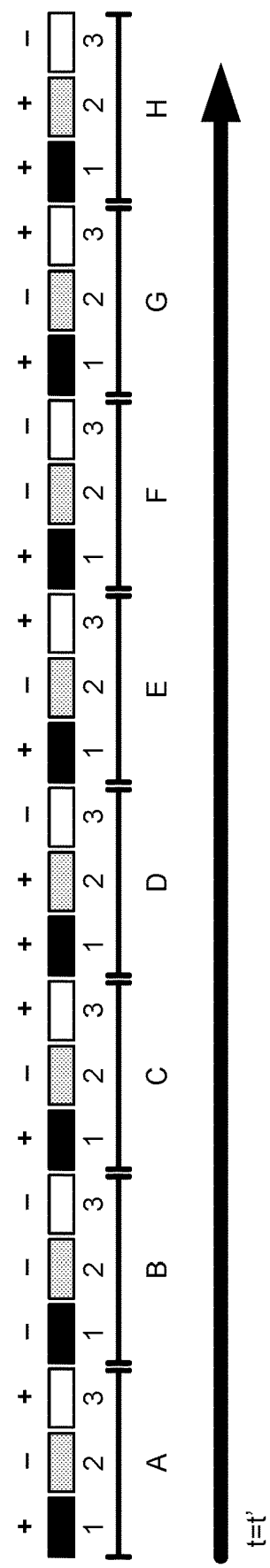
FIG. 8 illustrates an example of an encoding algorithm and a decoding algorithm according to embodiments of the present disclosure.

FIG. 8 illustrates an example of an encoding algorithm and a decoding algorithm according to embodiments of the present disclosure. Building upon the concepts illustrated in FIG. 7, the system 100 may encode the audio watermark using a number of different segments and/or a number of different repetitions. For example, FIG. 8 illustrates a watermark encoding structure 810 with a watermark sequence that comprises 3 segments of Eigenvectors (e.g., segments 1-3) and includes 8 repetitions (e.g., repetitions A-H) of the watermark sequence.

FIG. 8 illustrates an encoding algorithm 820:

$$|y\rangle^t = \bigoplus_{n=1}^{N_{rep}} \bigoplus_{i=1}^{N_{seg}} \left(|x_{n,i}\rangle^t + \beta s_{n,i} g_{n,i} |w_i\rangle^t\right) \quad [7]$$

where $|y\rangle^t$ is the watermark embedded audio sequence, $N_{rep}$ is the number of repetitions of the watermark sequence, $N_{seg}$ is the number of segments included in each watermark sequence, $|x_{n,i}\rangle^t$ is the original audio sequence, $\beta$ is the encoding strength, $s_{n,i}$ is the sign sequence for a combination of the segments and repetitions, $g_{n,i}$ is the segment normalization factor, and $|w_i\rangle^t$ is the audio watermark.

Similarly, FIG. 8 illustrates a decoding algorithm 830:

$$\Gamma(t=t') \equiv \sum_{i=1}^{N_{seg}} \sum_{n=1}^{N_{rep}-1} \sum_{m=n+1}^{N_{rep}} \frac{s_{m,i} s_{n,i} \langle y_{m,i}|y_{n,i}\rangle^q_{lo \to hi}}{g_{m,i}^{lo \to hi} g_{n,i}^{lo \to hi}} \quad [8.1]$$

where $$g_{m,i}^{lo \to hi} \equiv \sqrt{\langle y_{m,i} | y_{m,i} \rangle_{lo \to hi}^q} \quad [8.2]$$

$$g_{n,i}^{lo \to hi} \equiv \sqrt{\langle y_{n,i} | y_{n,i} \rangle_{lo \to hi}^q} \quad [8.3]$$

where Γ(t=t') is the decoding score, $N_{rep}$ is the number of repetitions of the watermark sequence, $N_{seg}$ is the number of segments included in each watermark sequence, $s_{m,i}$ is the sign sequence for a combination of the segments and repetitions for a first portion A, $s_{n,i}$ is the sign sequence for a combination of the segments and repetitions for a second portion B, $y_{m,i}$ is a first portion of a received watermark embedded audio sequence associated with the first portion A, $y_{n,i}$ is a second portion of the received watermark embedded audio sequence associated with the second portion B, $\rangle y_{m,i} | y_{n,i} \langle$ is the inner product of the first portion $y_{m,i}$ and the second portion $y_{n,i}$, $g_{m,i}$ is the segment normalization factor for the first portion A, $g_{n,i}$ is the segment normalization factor for the second portion B, and the notation lo→hi denotes that the frequency domain inner product only goes from $q_{lo}$ to $q_{hi}$.

Figure 9A:
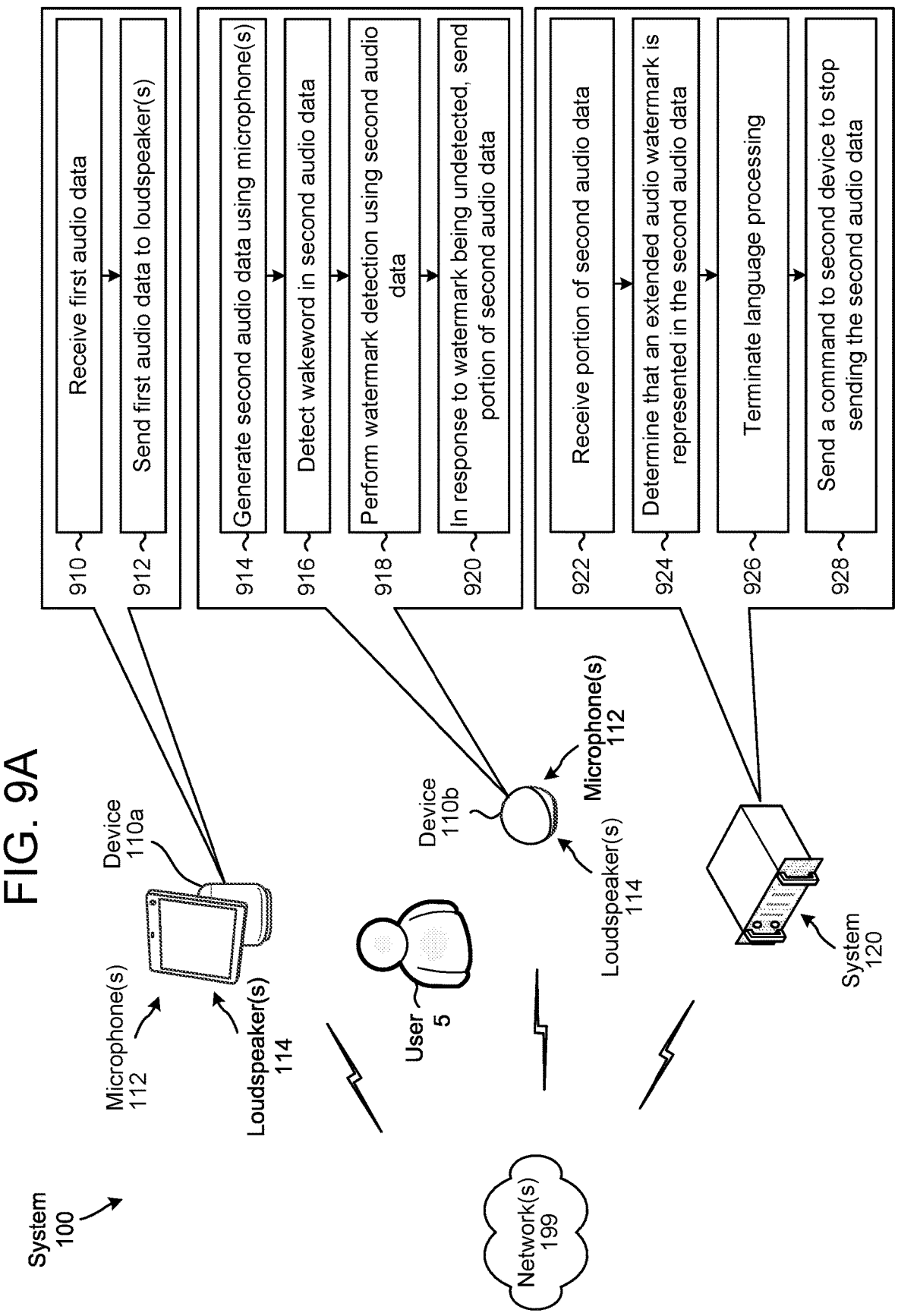
FIG. 9A illustrates a system for encoding and decoding extended audio watermarks using time extensions according to embodiments of the present disclosure.

As illustrated in FIG. 9A, the system 100 may include one or more devices 110, such as the first device 110a and the second device 110b (e.g., voice-enabled devices 110). The first device 110a and/or the second device 110b may include one or more microphone(s) 112 and/or one or more loudspeaker(s) 114. To detect user speech or other inputs, each device 110 may use the one or more microphone(s) 112 to generate microphone audio data that captures audio in a room (e.g., an environment) in which the device 110 is located. For example, if the devices 110 are located within earshot of a user 5, the devices 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. For example, the device 110 may include a wakeword engine that processing the microphone audio data to detect a representation of a wakeword. When a wakeword is detected in the microphone audio data, the device 110 may generate audio data corresponding to the wakeword and send the audio data to the system 120 for speech processing. The system 120 may process the audio data, determine the voice command, and perform one or more actions based on the voice command. For example, the system 120 may generate a command instructing the device 110 (or any other device) to perform an action, may generate output audio data corresponding to the action, may send the output audio data to the device 110, and/or may send the command to the device 110.

In some examples, the device 110 may generate microphone audio data that captures a wakeword that does not correspond to speech from the user 5. For example, the first device 110a may generate output audio including a representation of the wakeword and the second device 110b may capture the output audio and detect the representation of the wakeword. Upon detecting the representation of the wakeword, the second device 110b may generate audio data and (i) perform speech processing using the audio data and/or (ii) send the audio data to the system 120 for speech processing. However, the audio data does not correspond to speech from the user 5 and therefore does not correspond to a voice command.

To prevent nearby devices from reacting to the wakeword represented in the output audio, in some examples the system 100 may embed output audio data with an audio watermark to perform wakeword detection suppression. For example, if a representation of the wakeword is included in output audio data being sent to the first device 110a, the system 100 may embed the audio watermark in the output audio data. Thus, the second device 110b may detect the representation of the wakeword but may also detect the audio watermark instructing the second device 110b to ignore the wakeword. Additionally or alternatively, the system 100 may embed audio watermark(s) in output audio data to perform unique functionality, such as local signal transmission, enhanced entity resolution, and/or the like, as will be described in greater detail below with regard to FIGS. 2A-2E.

As described above, interference present in the audio data may prevent the watermark decoder from accurately detecting the audio watermark. If the audio watermark is embedded in watermarked media content to enable wakeword detection suppression and the audio watermark is undetected, the watermarked media content may cause the device 110 to detect the wakeword and perform speech processing on microphone audio data.

To prevent unnecessary processing, the system 100 may perform watermark verification to ensure that the audio watermark is not represented in the microphone audio data. As described above with regard to FIG. 5C, in some examples the device 110 may perform real-time audio watermark detection using a local decoder component 530 and the system 120 may verify whether the audio watermarks were accurately detected. For example, if the audio watermark goes undetected and the device 110 sends the microphone audio data to the system 120 for language processing, the system 120 may process the microphone audio data using a first decoder component 552 that is included in a watermark verification component 550. However, the disclosure is not limited thereto, and in other examples the system 120 may process the microphone audio data using a second decoder component 562 that is included in an existing wakeword verification component 560 without departing from the disclosure.

During watermark verification, the system 120 may perform watermark detection using the microphone audio data to detect a plurality of potential audio watermarks. If the watermark detection determines that an audio watermark is represented in the audio data, the system 120 may determine a command associated with the audio watermark and may perform an action corresponding to the command.

To illustrate a first example, if the system 120 detects a first audio watermark that is used to enable wakeword detection suppression, the system 120 may determine that the microphone audio data does not represent an utterance and/or does not correspond to a voice command and may perform one or more actions in response. For example, the system 120 may (i) terminate language processing being performed by the system 120 using the microphone audio data (e.g., terminate automatic speech recognition (ASR) processing and/or the like), (ii) terminate other verification processing being performed on the microphone audio data, such as wakeword verification, fingerprint verification, and/or the like, (iii) send a notification to the device 110 to stop transmitting the microphone audio data and/or perform one or more actions to indicate that the system 120 is no longer processing the microphone audio data (e.g., turn off an indicator light associated with processing a voice command, generate a notification to the user 5, etc.), and/or additional actions without departing from the disclosure.

While the example described above is associated with different actions that the system 120 may perform in response to detecting a first audio watermark used to enable wakeword detection suppression, the disclosure is not limited thereto. In other examples, the system 120 may detect a second audio watermark associated with performing other commands and may perform additional actions without departing from the disclosure. For example, the second audio watermark may correspond to a local signal transmission being sent between two devices in proximity to each other, and in response to detecting the second audio watermark the system 120 may send a command to one of the devices 110 to perform the action associated with the local signal transmission without departing from the disclosure.

Additionally or alternatively, the system 120 may detect a third audio watermark that corresponds to a unique identifier associated with media content. For example, the third audio watermark may be embedded in the media content to identify the media content in order to enable watermark enhanced entity resolution. In response to detecting the third audio watermark, the system 120 may determine context data or other information associated with the unique identifier, may perform language processing using the microphone audio data, and/or may use the context data and the language processing to interpret a voice command represented in the microphone audio data.

While the system 120 may perform watermark verification and identify audio watermarks that were undetected by the device 110, the watermark detection performed by the system 120 may suffer from the same issues that caused the device 110 to be inaccurate and/or fail to detect the audio watermark. For example, the microphone audio data in which the audio watermark is embedded may interfere with the watermark detection and/or there may be other issues causing the audio watermark to be undetectable.

To improve watermark detection and/or watermark verification, the device 110 and/or the system 120 may be configured to perform enhanced watermark detection. In some examples, the system 100 may embed extended acoustic watermarks that include time extension(s) and/or frequency extension(s) to enable the enhanced watermark detection to detect the extended audio watermark with greater accuracy. For example, the extended audio watermark may include a baseline audio watermark (e.g., to enable backwards compatibility) along with a watermark extension (e.g., to increase a time duration of the extended audio watermark). Thus, embedding the extended acoustic watermark with the watermark extension enables (i) the device 110 to perform watermark detection to detect the baseline audio watermark, and (ii) the system 120 to perform enhanced watermark detection to detect the extended audio watermark. As the extended audio watermark has a longer time duration than the baseline audio watermark, an accuracy of performing enhanced watermark detection is increased relative to detecting the baseline audio watermark alone.

Additionally or alternatively, the extended audio watermark may include frequency extension(s), such that the baseline audio watermark is embedded in multiple frequency bands (e.g., multiple frequency ranges) of the audio data. For example, the extended audio watermark may include the baseline audio watermark in a first frequency band (e.g., to enable backwards compatibility) along with a duplicate audio watermark in a second frequency band (e.g., to provide redundancy). Thus, embedding the extended acoustic watermark with a frequency extension enables (i) limited devices 110 to perform watermark detection to detect the baseline audio watermark, and (ii) improved devices 110 and/or the system 120 to perform enhanced watermark detection to detect the baseline audio watermark in the first frequency band and/or the duplicate audio watermark in the second frequency band. However, the disclosure is not limited thereto and the extended audio watermark may include multiple duplicate audio watermarks in additional frequency bands without departing from the disclosure. As the extended audio watermark provides redundancy by including the duplicate audio watermark(s), an accuracy of performing enhanced watermark detection is increased relative to detecting the baseline audio watermark alone.

While the above examples describe the extended audio watermark including the time extension or the frequency extension, the disclosure is not limited thereto and the extended audio watermark may include both time extension(s) and frequency extension(s) without departing from the disclosure. For example, the extended audio watermark may include the baseline audio watermark (e.g., to provide backwards compatibility) along with the watermark extension in the first frequency band, in addition to including one or more duplicate audio watermarks in additional frequency bands. In some examples, the duplicate audio watermarks may correspond to a combination of the baseline audio watermark and the watermark extension, although the disclosure is not limited thereto and the duplicate audio watermarks may only correspond to the baseline audio watermark without departing from the disclosure.

Additionally or alternatively, the system 120 may perform the enhanced watermark detection by decoding the microphone audio data using multiple time shifts (e.g., frame offsets). For example, a first decoder may perform first watermark detection using the microphone audio data without a time offset, while a second decoder may perform second watermark detection using the microphone audio data with a time offset, resulting in the first decoder processing a first portion of the microphone audio data while the second decoder processes a second portion of the microphone audio data. Due to the time shifts, one of the decoders is more likely to be aligned with the audio watermark, which may improve an accuracy of the watermark detection for both baseline audio watermarks and extended audio watermarks.

FIG. 9A illustrates an example of decoding extended audio watermarks using time extensions. As illustrated in FIG. 9A, the first device 110a may receive (910) first audio data that is embedded with an extended audio watermark. For example, the extended audio watermark may include a baseline audio watermark along with a time extension that extends the audio watermark earlier or later in time. In some examples, the first device 110a may receive the first audio data from the system 120, although the disclosure is not limited thereto and the first device 110a may receive the first audio data from a storage component, a third party server(s), and/or the like without departing from the disclosure. Additionally or alternatively, the first device 110a may generate the first audio data without departing from the disclosure.

After receiving the first audio data, the first device 110a may send (912) the first audio data to the loudspeaker(s) 114 to generate output audio. To illustrate a first example corresponding to wakeword detection suppression, the first device 110a may generate output audio corresponding to a sentence that includes a representation of the wakeword (e.g., "Calling Alexa Smith from your contacts"), with the extended audio watermark embedded in the wakeword (e.g., "Alexa"). To illustrate a second example corresponding to local signal transmission, the first device 110*a* may generate output audio corresponding to a sentence indicating an action being performed (e.g., "Searching for nearby devices"), with the extended audio watermark embedded in one or more words in the sentence (e.g., "searching").

The second device 110*b* may generate (914) second audio data corresponding to the output audio using one or more microphone(s) 112. The second device 110*b* may detect (916) a wakeword represented in the second audio data, may perform (918) watermark detection using the second audio data, and may send (920) a portion of the second audio data to the system 120 for language processing in response to the watermark being undetected.

The system 120 may receive (922) the portion of the second audio data and may determine (924) that an extended audio watermark is represented in the second audio data. For example, the system 120 may detect the extended audio watermark in the second audio data despite the baseline audio watermark being undetected due to interference and/or the like. In response to detecting the extended audio watermark, the system 120 may terminate (926) language processing and may send (928) a command to the second device 110*b* to stop sending the second audio data and/or perform an action indicating that language processing is not being performed.

To continue the first example, the system 120 may detect the extended audio watermark represented in the second audio data, may determine that the extended audio watermark corresponds to a command to ignore the representation of the wakeword, and may perform a corresponding action (e.g., ignore the representation of the wakeword and terminate language processing instead of determining a voice command represented in the second audio data). However, the disclosure is not limited thereto, and in some examples the system 120 may detect the extended audio watermark and perform a different action corresponding to the extended audio watermark without departing from the disclosure. To continue the second example, the system 120 may detect the extended audio watermark within the second audio data, may determine that the extended audio watermark corresponds to a command to synchronize playback of music with the first device 110*a*, and may perform a corresponding action (e.g., send a message to the second device 110*b* and/or the first device 110*a* in order to synchronize playback of the music).

FIG. 9B illustrates an example of decoding extended audio watermarks using frequency extensions. As illustrated in FIG. 9B, the first device 110*a* may receive (910) the first audio data that is embedded with an extended audio watermark. In this example, the extended audio watermark may include a baseline audio watermark along with a duplicate audio watermark that repeats the audio watermark in an additional frequency band. In some examples, the first device 110*a* may receive the first audio data from the system 120, although the disclosure is not limited thereto and the first device 110*a* may receive the first audio data from a storage component, a third party server(s), and/or the like without departing from the disclosure. Additionally or alternatively, the first device 110*a* may generate the first audio data without departing from the disclosure.

After receiving the first audio data, the first device 110*a* may send (912) the first audio data to the loudspeaker(s) 114 to generate output audio, as described in greater detail above. The second device 110*b* may generate (914) the second audio data corresponding to the output audio using one or more microphone(s) 112. The second device 110*b* may detect (916) the wakeword represented in the second audio data, may perform (918) watermark detection using the second audio data, and may send (920) a portion of the second audio data to the system 120 for language processing in response to the watermark being undetected.

In the example illustrated in FIG. 9B, the system 120 may receive (940) the portion of the second audio data, may determine (942) that the audio watermark is not represented in a first frequency band, and may determine (944) that a duplicate audio watermark is represented in a second frequency band. For example, the system 120 may detect the duplicate audio watermark in the second frequency band audio data despite the baseline audio watermark being undetected in the first frequency band due to interference and/or the like. Thus, the system 120 may determine that the extended audio watermark is represented in the second audio data. In response to detecting the duplicate audio watermark, the system 120 may terminate (946) language processing and may send (948) a command to the second device 110*b* to stop sending the second audio data and/or perform an action indicating that language processing is not being performed.

FIG. 9C illustrates an example of decoding audio watermarks using multiple time shifts. As illustrated in FIG. 9C, the first device 110*a* may receive (910) the first audio data that is embedded with an audio watermark, which may be a baseline audio watermark and/or an extended audio watermark without departing from the disclosure. In some examples, the first device 110*a* may receive the first audio data from the system 120, although the disclosure is not limited thereto and the first device 110*a* may receive the first audio data from a storage component, a third party server(s), and/or the like without departing from the disclosure. Additionally or alternatively, the first device 110*a* may generate the first audio data without departing from the disclosure.

After receiving the first audio data, the first device 110*a* may send (912) the first audio data to the loudspeaker(s) 114 to generate output audio, as described in greater detail above. The second device 110*b* may generate (914) the second audio data corresponding to the output audio using one or more microphone(s) 112. The second device 110*b* may detect (916) the wakeword represented in the second audio data, may perform (918) watermark detection using the second audio data, and may send (920) a portion of the second audio data to the system 120 for language processing in response to the watermark being undetected.

In the example illustrated in FIG. 9C, the system 120 may receive (960) the portion of the second audio data, may perform (962) watermark detection using multiple overlapping frame shifts, and may determine (964) that the audio watermark is represented in the second audio data. In response to detecting the audio watermark, the system 120 may terminate (966) language processing and may send (968) a command to the second device 110*b* to stop sending the second audio data and/or perform an action indicating that language processing is not being performed.

While FIGS. 9A-9C illustrate examples in which the system 120 performs enhanced watermark detection and/or watermark verification, the disclosure is not limited thereto. In some examples, improved devices 110 may be configured to perform enhanced watermark detection and/or watermark verification without departing from the disclosure. As used herein, improved devices 110 may be devices that have more resources and/or processing capabilities and are capable of performing advanced functionality, such as language processing, without departing from the disclosure.

FIGS. 10A-10D illustrate examples of performing watermark verification and/or enhanced watermark detection according to embodiments of the present disclosure. In a first example illustrated in FIG. 10A, the third device 110c may be an improved device capable of performing advanced functionality, such as language processing. Thus, the second device 110b may be configured to send audio data to the third device 110c to perform language processing and/or determine action(s) to perform in response to a voice command represented in the audio data. After receiving the audio data from the second device 110b, but prior to performing the language processing, the third device 110c may be configured to perform watermark verification using enhanced watermark detection, although the disclosure is not limited thereto.

As illustrated in FIG. 10A, the first device 110a may receive (910) first audio data that is embedded with an extended audio watermark. In some examples, the first device 110a may receive the first audio data from the system 120, although the disclosure is not limited thereto and the first device 110a may receive the first audio data from a storage component, a third party server(s), and/or the like without departing from the disclosure. Additionally or alternatively, the first device 110a may generate the first audio data without departing from the disclosure.

After receiving the first audio data, the first device 110a may send (912) the first audio data to the loudspeaker(s) 114 to generate output audio, as described in greater detail above. The second device 110b may generate (914) second audio data corresponding to the output audio using one or more microphone(s) 112. The second device 110b may detect (916) a wakeword represented in the second audio data, and may perform (918) watermark detection using the second audio data. In response to the watermark being undetected, the second device 110b may send (1020) a portion of the second audio data to the third device 110c for language processing.

The third device 110c may receive (1022) the portion of the second audio data and may perform (1024) enhanced watermark detection to detect the extended audio watermark represented in the second audio data. For example, the third device 110c may detect the extended audio watermark in the second audio data despite the baseline audio watermark being undetected due to interference and/or the like. In response to detecting the extended audio watermark, the third device 110c may terminate (1026) language processing and may send (1028) a command to the second device 110b to stop sending the second audio data and/or perform an action indicating that language processing is not being performed.

To continue the first example, the third device 110c may detect the extended audio watermark represented in the second audio data, may determine that the extended audio watermark corresponds to a command to ignore the representation of the wakeword, and may perform a corresponding action (e.g., ignore the representation of the wakeword and terminate language processing instead of determining a voice command represented in the second audio data). However, the disclosure is not limited thereto, and in some examples the third device 110c may detect the extended audio watermark and perform a different action corresponding to the extended audio watermark without departing from the disclosure. To continue the second example, the third device 110c may detect the extended audio watermark within the second audio data, may determine that the extended audio watermark corresponds to a command to synchronize playback of music with the first device 110a, and may perform a corresponding action (e.g., send a message to the second device 110b and/or the first device 110a in order to synchronize playback of the music).

While FIG. 10A illustrates an example in which the second device 110b generates the second audio data and sends the second audio data to the third device 110c for language processing, the disclosure is not limited thereto. In some examples, the second device 110b may also be an improved device capable of performing additional functionality without departing from the disclosure. Thus, FIGS. 10B-10D illustrate examples in which the second device 110b generates the second audio data and then performs enhanced watermark detection.

In a second example illustrated in FIG. 10B, the second device 110b may only perform enhanced watermark detection, without first performing watermark detection, without departing from the disclosure. The disclosure is not limited thereto, however, and in a third example illustrated in FIG. 10C, the second device 110b may perform two-stage watermark decoding, similar to the watermark verification described above. For example, the second device 110b may perform watermark detection and, if the baseline audio watermark undetected, the second device 110b may be configured to perform watermark verification using enhanced watermark detection prior to beginning any resource and/or computationally intensive tasks like language processing. Finally, a fourth example illustrated in FIG. 10D is directed to the second device 110b performing two-stage watermark decoding to enable advanced functionality. For example, the second device 110b may perform watermark detection and, if the second device 110b detects the baseline audio watermark, the second device 110b may begin performing enhanced watermark detection to detect extended audio watermark(s).

As illustrated in FIG. 10B, the first device 110a may receive (910) first audio data and send (912) the first audio data to the loudspeaker(s) 114, as described above. The second device 110b may generate (914) second audio data using the microphone(s) 112 associated with the second device 110b and may detect (916) a wakeword represented in the second audio data.

After detecting the wakeword, the second device 110b may perform (1040) enhanced watermark detection using the second audio data. For example, the second device 110b may immediately perform enhanced watermark detection to detect the extended audio watermark without first performing watermark detection to detect the baseline audio watermark. The second device 110b may determine (1042) that an extended watermark is represented in the second audio data and, in response to detecting the extended audio watermark, the second device 110b may terminate (1044) language processing and/or perform an action indicating that language processing is not being performed, as described in greater detail above. However, the disclosure is not limited thereto, and in some examples the second device 110b may detect the extended audio watermark and perform a different action corresponding to the extended audio watermark without departing from the disclosure, as described in greater detail above.

As shown in the second example illustrated in FIG. 10B, the second device 110b may be capable of performing enhanced watermark detection immediately, without first performing watermark detection to detect the baseline audio watermark. However, in some examples performing enhanced watermark detection may be an inefficient use of resources and/or processing capabilities, so the second device 110b may be configured to perform the two-stage watermark decoding shown in the third example illustrated in FIG. 10C. For example, while the second device 110b may be an improved device, performing language processing may consume a large portion of the resources and/or processing capabilities of the second device 110b. To avoid unnecessarily tying up these resources and/or processing capabilities, the second device 110b may perform watermark verification using enhanced watermark detection to confirm that an audio watermark is not represented in the second audio data.

As illustrated in FIG. 10C, the first device 110a may receive (910) first audio data and send (912) the first audio data to the loudspeaker(s) 114, as described above. The second device 110b may generate (914) second audio data using the microphone(s) 112 associated with the second device 110b, may detect (916) a wakeword represented in the second audio data, and may perform (918) watermark detection using the second audio data. For example, the second device 110b may perform the watermark detection in an attempt to detect the baseline audio watermark 132.

In response to the audio watermark being undetected after performing the watermark detection, the second device 110b may perform (1060) enhanced watermark detection and may determine (1062) that an extended audio watermark is represented in the second audio data. For example, the second device 110b may detect the extended audio watermark in the second audio data despite the baseline audio watermark being undetected previously.

In response to detecting the extended audio watermark, the second device 110b may terminate (1064) language processing and/or perform an action indicating that language processing is not being performed. However, the disclosure is not limited thereto, and in some examples the second device 110b may detect the extended audio watermark and perform a different action corresponding to the extended audio watermark without departing from the disclosure, as described in greater detail above.

While the third example shown in FIG. 10C illustrates the second device 110b performing enhanced watermark detection in response to the watermark being undetected, the disclosure is not limited thereto. In a fourth example illustrated in FIG. 10D, the second device 110b may do the opposite and may perform enhanced watermark detection in response to a baseline audio watermark being detected in the second audio data. Thus, the fourth example is directed to the second device 110b performing two-stage watermark decoding to enable advanced functionality. For example, the second device 110b may perform watermark detection and, if the second device 110b detects the baseline audio watermark, the second device 110b may begin performing enhanced watermark detection to detect extended audio watermark(s).

To illustrate an example, if the system 100 transmits the extended audio watermark infrequently, it may be inefficient for the second device 110b to constantly perform enhanced watermark detection in order to detect a sparse signal. Instead, the system 100 may first send the baseline audio watermark as a notification to the devices 110, prompting the second device 110b to begin performing enhanced watermark detection and continue performing the enhanced watermark detection for a period of time after the baseline audio watermark is detected. Thus, in some examples the system 100 may send a baseline audio watermark followed by an extended audio watermark without departing from the disclosure.

As illustrated in FIG. 10D, the first device 110a may receive (910) first audio data and may send (912) the first audio data to the loudspeaker(s) 114, as described above. The second device 110b may generate (914) second audio data using the microphone(s) 112 associated with the second device 110b and may perform (1080) watermark detection using the second audio data to detect the audio watermark. For example, the second device 110b may determine that the baseline audio watermark is represented in the second audio data.

In response to detecting the baseline audio watermark, the second device 110b may perform (1082) enhanced watermark detection and may determine (1084) that an extended audio watermark is represented in the second audio data and may perform (1086) an action corresponding to the extended audio watermark. For example, the extended audio watermark may indicate a command intended for the second device 110b and the second device 110b may perform an action corresponding to the command, although the disclosure is not limited thereto.

To illustrate an example, the system 100 may send a baseline audio watermark followed by an extended audio watermark as part of local signal transmission and/or the like. In contrast to enabling wakeword detection suppression, which only requires performing watermark detection for a short period of time after a wakeword is detected, enabling local signal transmission requires performing watermark detection constantly in order to detect an embedded command received from neighboring device(s) 110. In order to conserve resources and/or processing capabilities, the system 100 may cause the second device 110b to perform watermark detection using baseline audio watermarks until a first audio watermark is received that indicates that a second audio watermark (e.g., extended audio watermark) will be transmitted within a short period of time.

In some examples, the first audio watermark may instruct the second device 110b to perform enhanced watermark detection using a plurality of frequency bands. For example, the system 100 may configure the first audio watermark to be easy to detect (e.g., simple audio watermark, short sign sequence, single frequency band, etc.), whereas the system 100 may configure the second audio watermark to include additional information and/or complexity (e.g., longer sign sequence, multiple frequency bands, etc.). Thus, the first audio watermark may prompt the second device 110b to prepare for the second audio watermark, which may be embedded in multiple frequency bands, may be longer in duration, and/or the like, although the disclosure is not limited thereto.

Additionally or alternatively, the system 100 may configure the first audio watermark as a notification, triggering the second device 110b to perform enhanced watermark detection to listen for subsequent extended audio watermarks, and the system 100 may transmit multiple second audio watermarks following the first audio watermark. For example, the system 100 may transmit a payload comprising a large amount of data embedded across multiple extended audio watermarks without departing from the disclosure.

Figure 11:
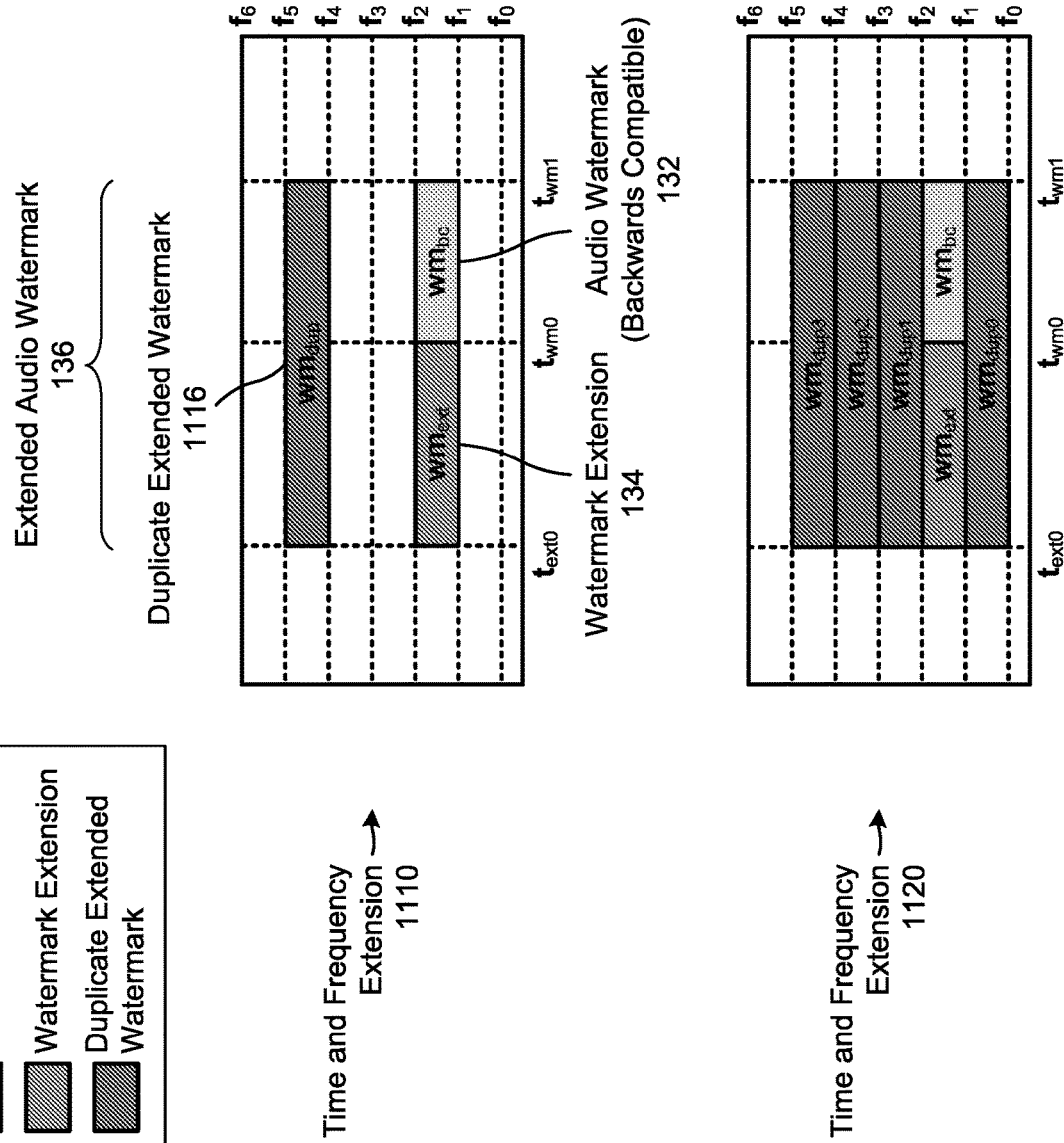
FIG. 11 illustrates examples of encoding and decoding audio watermarks with a combination of time extension(s) and frequency extension(s) according to embodiments of the present disclosure.

FIG. 11 illustrates examples of encoding and decoding audio watermarks with a combination of time extension(s) and frequency extension(s) according to embodiments of the present disclosure. As illustrated in a first time and frequency extension example 1110, the extended audio watermark 136 may include the baseline audio watermark 132 (e.g., $wm_{bc}$) (e.g., to enable backwards compatibility) along with the watermark extension (e.g., $wm_{ext}$) 914 in the second frequency band (e.g., $f_1$ to $f_2$). In addition, the extended audio watermark 136 may include a duplicate audio watermark 1116 (e.g., $wm_{dup}$) in a fifth frequency band (e.g., $f_4$ to $f_5$). As illustrated in FIG. 11, in some examples the duplicate audio watermark 1116 may correspond to a combination of the baseline audio watermark $wm_{bc}$ 132 and the watermark extension $wm_{ext}$ 134. However, the disclosure is not limited thereto and the duplicate audio watermark 1116 may only correspond to the baseline audio watermark $wm_{bc}$ 132 without departing from the disclosure.

While the first time and frequency extension example 1110 illustrates that the extended audio watermark 136 may include a single duplicate audio watermark 1116, the disclosure is not limited thereto and the extended audio watermark 136 may include two or more duplicate audio watermarks 1116 without departing from the disclosure. As illustrated in a second time and frequency extension example 1120, the extended audio watermark 136 may include the baseline audio watermark 132 (e.g., $wm_{bc}$) and the watermark extension (e.g., $wm_{ext}$) 134 in the second frequency band (e.g., $f_1$ to $f_2$), along with four duplicate audio watermarks 1116 in four other frequency bands. For example, the second time and frequency extension example 1120 illustrates an example in which the extended audio watermark 136 includes a first duplicate audio watermark 1116 (e.g., $wm_{dup1}$) in a first frequency band (e.g., $f_0$ to $f_1$), a second duplicate audio watermark 1116 (e.g., $wm_{dup2}$) in a third frequency band (e.g., $f_2$ to $f_3$), a third duplicate audio watermark 1116 (e.g., $wm_{dup3}$) in a fourth frequency band (e.g., $f_3$ to $f_4$), and a fourth duplicate audio watermark 1116 (e.g., $wm_{dup4}$) in a fifth frequency band (e.g., $f_4$ to $f_5$). As illustrated in FIG. 11, in some examples the duplicate audio watermarks 1116 may correspond to a combination of the baseline audio watermark $wm_{bc}$ 132 and the watermark extension $wm_{ext}$ 134. However, the disclosure is not limited thereto and the duplicate audio watermarks 1116 may only correspond to the baseline audio watermark $wm_{bc}$ 132 without departing from the disclosure.

While the second time and frequency extension example 1120 illustrates the extended audio watermark 136 including a duplicate audio watermark 1116 in multiple consecutive frequency bands, the disclosure is not limited thereto and the extended audio watermark 136 may include breaks between duplicate audio watermarks 1116 without departing from the disclosure.

Figure 12A:
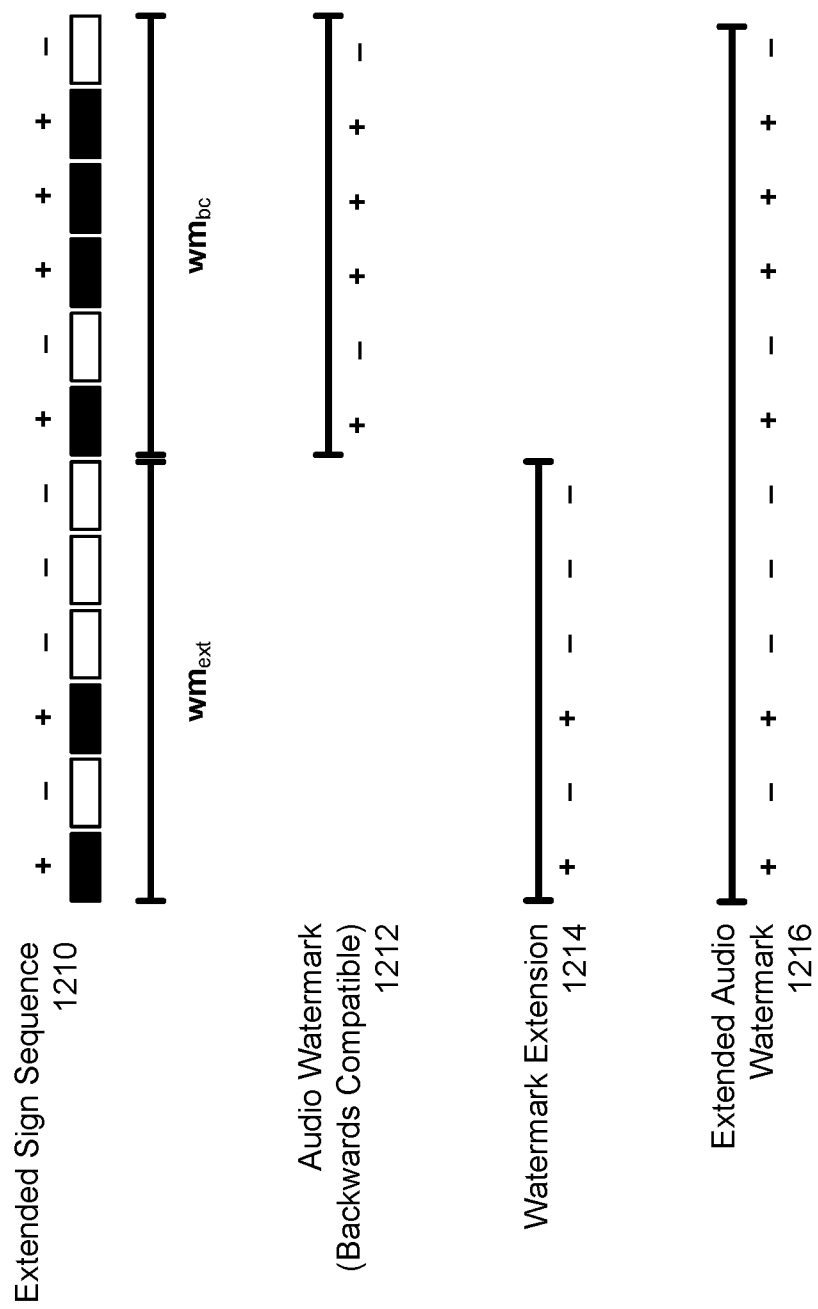
FIGS. 12A-12B illustrate examples of performing time extension by extending a sign sequence according to embodiments of the present disclosure.
Figure 12B:
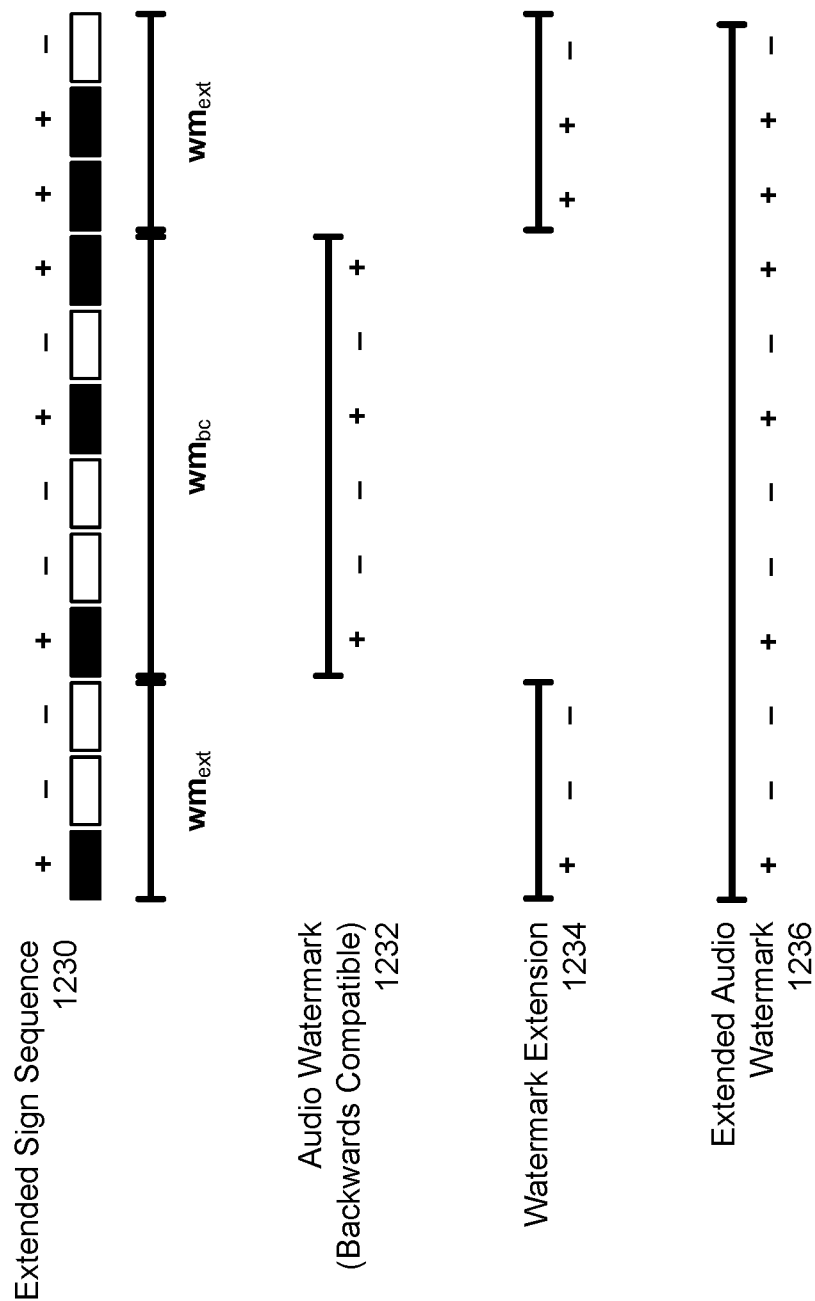

FIGS. 12A-12B illustrate examples of performing time extension by extending a sign sequence according to embodiments of the present disclosure. As illustrated in FIG. 12A, the system 100 may perform unilateral time extension 1200 to extend the audio watermark earlier in time. For example, an audio watermark 1212 may correspond to a first sign sequence (e.g., first shared key), which is illustrated in FIG. 12A as a series of six positive or negative values (e.g., +−+++−) that correspond to six segments of the repeated wakeword sequence. In this example, the six segments could correspond to two repetitions of a three segment wakeword sequence or three repetitions of a two segment wakeword sequence, but the disclosure is not limited thereto.

To generate an extended audio watermark 1216, the system 100 may add a watermark extension 1214 prior to the audio watermark 1212. For example, the watermark extension 1214 may correspond to a second sign sequence, which is illustrated in FIG. 12A as a series of six positive or negative values (e.g., +−+−−−) that correspond to six additional segments of the repeated wakeword sequence. While FIG. 12A illustrates an example in which the second sign sequence associated with the watermark extension 1214 is the same size as the first sign sequence associated with the audio watermark 1212, the disclosure is not limited thereto and the size of the second sign sequence may vary without departing from the disclosure. For example, if the audio watermark 1212 corresponds to three repetitions of a two segment wakeword sequence, the second sign sequence may correspond to any number of repetitions of the two segment wakeword sequence (e.g., 2, 4, 6, etc. additional segments) without departing from the disclosure.

As illustrated in FIG. 12A, the extended sign sequence 1210 comprises the second sign sequence associated with the watermark extension 1214 followed by the first sign sequence associated with the audio watermark 1212. This allows the device 110 to perform watermark detection using the first sign sequence to detect the audio watermark 1212 while enabling the system 120 to perform enhanced watermark detection using the extended sign sequence 1210 to detect the extended audio watermark 1216.

While FIG. 12A illustrates an example of the unilateral time extension 1210 extending earlier in time relative to the audio watermark, the disclosure is not limited thereto. In some examples, the system 100 may perform unilateral time extension to extend the audio watermark later in time without departing from the disclosure. For example, the extended sign sequence may add the watermark extension 1214 after the audio watermark 1212 without departing from the disclosure. Additionally or alternatively, the system 100 may perform bilateral time extension to extend the audio watermark earlier in time and later in time without departing from the disclosure.

As illustrated in FIG. 12B, the system 100 may perform bilateral time extension 1220 to extend the audio watermark both earlier and later in time. For example, an audio watermark 1232 may correspond to a first sign sequence, which is illustrated in FIG. 12B as a series of six positive or negative values (e.g., +−−+−+) that correspond to six segments of the repeated wakeword sequence. In this example, the six segments correspond to two repetitions of a three segment wakeword sequence, although the disclosure is not limited thereto.

To generate an extended audio watermark 1236, the system 100 may add a first portion of a watermark extension 1234 before the audio watermark 1232 and a second portion of the watermark extension 1234 after the audio watermark 1232. For example, the first portion of the watermark extension 1234 is illustrated as a first series of three positive or negative values (e.g., +−−) that correspond to an additional repetition of the wakeword sequence before the audio watermark 1232, while the second portion of the watermark extension 1234 is illustrated as a second series of three positive or negative values (e.g., ++−) that correspond to an additional repetition of the wakeword sequence after the audio watermark 1232.

For ease of illustration, the watermark extension 1234 may be referred to as a second sign sequence that includes the first series and the second series, for a total of six values. However, the disclosure is not limited thereto, and the watermark extension 1234 may also be referred to as including a second sign sequence that includes the first series and a third sign sequence that includes the second series without departing from the disclosure. While FIG. 12B illustrates an example in which the watermark extension 1234 has the same combined length as the audio watermark 1232, the disclosure is not limited thereto and the length of the watermark extension 1234 may vary without departing from the disclosure. For example, if the audio watermark 932 corresponds to two repetitions of a three segment wakeword sequence, the second sign sequence may correspond to any number of repetitions of the three segment wakeword sequence (e.g., 3, 6, 9, etc. additional segments) without departing from the disclosure. Additionally or alternatively, while the bilateral time extension 1220 illustrates an example in which the first portion of the watermark extension 1234 is the same length as the second portion of the watermark extension 1234, the disclosure is not limited thereto and the first portion may be shorter or longer than the second portion without departing from the disclosure.

As illustrated in FIG. 12B, the extended sign sequence 1230 comprises the first portion of the watermark extension 1234, followed by the first sign sequence associated with the audio watermark 1232, followed by the second portion of the watermark extension 1234. This allows the device 110 to perform watermark detection using the first sign sequence to detect the audio watermark 1232 while enabling the system 120 to perform enhanced watermark detection using the extended sign sequence 1230 to detect the extended audio watermark 1236.

Figure 13:
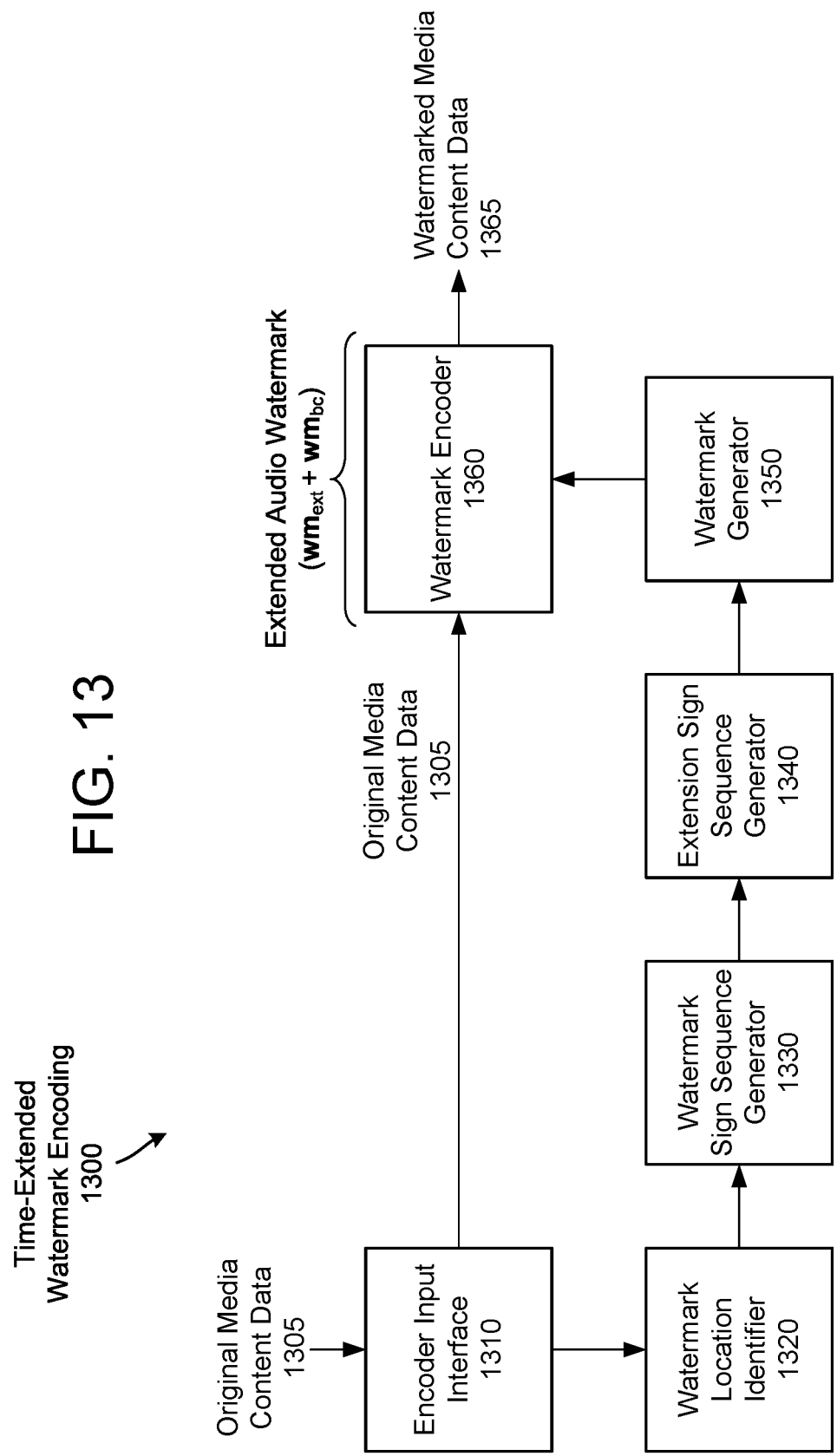
FIG. 13 illustrates an example of a component diagram for using time extension to encode an extended audio watermark in media content according to embodiments of the present disclosure.

FIG. 13 illustrates an example of a component diagram for using time extension to encode an extended audio watermark in media content according to embodiments of the present disclosure. As illustrated in FIG. 13, during time-extended watermark encoding 1300 an encoder input interface 1310 may receive original media content data 1305, which may include first audio data in which to embed an audio watermark. For example, the first audio data may correspond to media content, such as a television commercial, a movie, a radio broadcast, and/or the like, although the disclosure is not limited thereto.

The system 100 may process the first audio data using a watermark location identifier component 1320 to determine location(s) at which to embed the audio watermark. For example, the watermark location identifier component 1320 may determine to embed a first audio watermark associated with performing wakeword detection suppression within a wakeword represented in the first audio data, may determine to embed a second audio watermark associated with a local signal transmission within a particular word or phrase corresponding to the command, may determine to embed a third audio watermark associated with uniquely identifying media content at periodic intervals throughout the first audio data, and so on.

To illustrate an example of embedding the first audio watermark to enable wakeword detection suppression, the system 100 may process the first audio data using a wakeword detector component to determine an endpoint of wakeword(s) represented in the first audio data and may determine location(s) to insert audio watermark(s) in the first audio data. For example, the system 100 may determine a first endpoint of a first wakeword represented in the first audio data and may determine a first location based on the first endpoint (e.g., 640 ms prior to the first endpoint, although the disclosure is not limited thereto). Similarly, the system 100 may determine a second endpoint of a second wakeword represented in the first audio data and may determine a second location based on the second endpoint.

In some examples, the wakeword detector may be configured to detect a single wakeword and each of the endpoints detected in the first audio data correspond to the same wakeword represented at different times within the first audio data. However, the disclosure is not limited thereto, and in other examples the wakeword detector may be configured to detect multiple wakewords without departing from the disclosure. For example, the first wakeword may correspond to a first sound sequence while the second wakeword may correspond to a second sound sequence.

Additionally or alternatively, in some examples the system 100 may be configured to insert a single audio watermark and each of the audio watermarks represented in second audio data correspond to the same audio watermark. However, the disclosure is not limited thereto, and in other examples the system 100 may be configured to insert two or more audio watermarks without departing from the disclosure. For example, the system 100 may insert a first audio watermark corresponding to the first wakeword and insert a second audio watermark corresponding to the second wakeword. Thus, each of the audio watermarks represented in the second audio data may correspond to the particular wakeword in which the audio watermark is embedded, although the disclosure is not limited thereto.

As illustrated in FIG. 13, a watermark sign sequence generator component 1330 may determine a first sign sequence corresponding to the audio watermark to embed at the location(s). For example, the watermark sign sequence generator component 1330 may identify an existing sign sequence corresponding to the audio watermark, if applicable, may generate a new sign sequence with which to associate the audio watermark, and/or the like.

Using the first sign sequence, an extension sign sequence generator component 1340 may generate a second sign sequence corresponding to a watermark extension and/or an extended sign sequence (e.g., combination of the first sign sequence and the second sign sequence) corresponding to an extended audio watermark, as described in greater detail above with regard to FIGS. 9-12B. For example, the extension sign sequence generator component 1340 may determine a number of segments associated with the wakeword sequence, a number of repetitions of the wakeword sequence to add, whether to add the watermark extension before and/or after the audio watermark, values associated with each of the additional segments, and/or additional information required to generate the extended audio watermark.

Using the location(s), the first sign sequence, the second sign sequence, and/or other information associated with the audio watermark, a watermark generator component 1350 may generate watermark data corresponding to the extended audio watermark (e.g., $wm_{ext}+wm_{bc}$) and may send the watermark data and/or the location(s) to a watermark encoder 1360. The watermark encoder 1360 may receive the watermark data and/or the location(s) from the watermark generator component 1350 and may receive the original media content data 1305 from the encoder input interface 1310. However, the disclosure is not limited thereto, and in some examples the watermark encoder 1360 may receive the first audio data represented in the original media content data 1305 from the encoder input interface 1310 without departing from the disclosure.

Using the location(s), the watermark encoder component 1360 may embed the watermark data in the first audio data associated with the original media content data 1305 to generate second audio data and may output the second audio data. For example, the second audio data may include representation(s) of one or more extended audio watermarks embedded at the location(s) within the second audio data. The watermark encoder 1360 may generate watermarked media content data 1365, which replaces the first audio data associated with the original media content data 1305 with the second audio data generated by the watermark encoder 1360.

Figure 14:
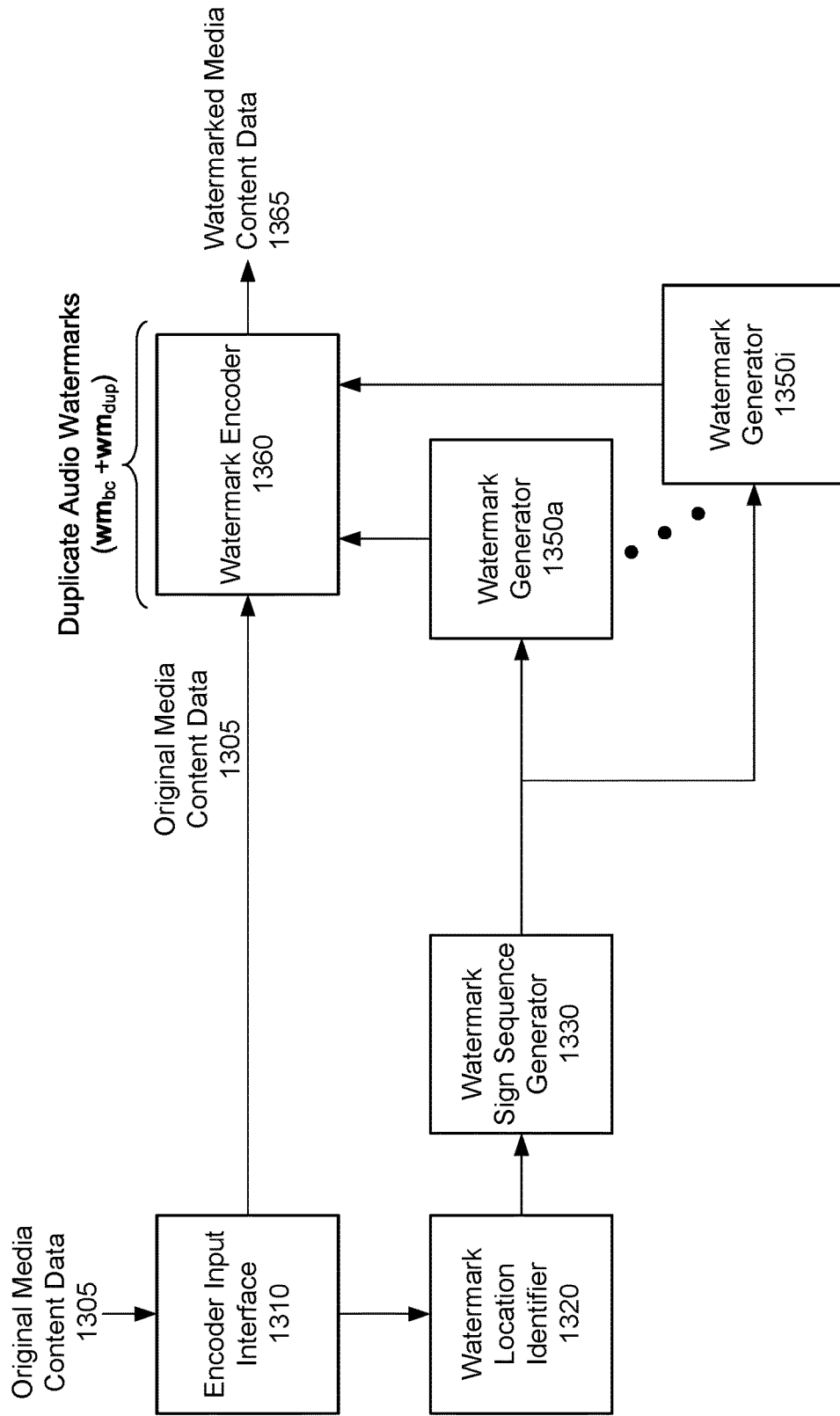
FIG. 14 illustrates an example of a component diagram for using frequency extension to encode duplicate audio watermarks in media content according to embodiments of the present disclosure.

FIG. 14 illustrates an example of a component diagram for using frequency extension to encode duplicate audio watermarks in media content according to embodiments of the present disclosure. As illustrated in FIG. 14, during frequency-extended watermark encoding 1400 the encoder input interface 1310 may receive the original media content data 1305, which may include first audio data in which to embed an audio watermark. For example, the first audio data may correspond to media content, such as a television commercial, a movie, a radio broadcast, and/or the like, although the disclosure is not limited thereto.

The system 100 may process the first audio data using the watermark location identifier component 1320 to determine location(s) at which to embed the audio watermark, as described in greater detail above with regard to FIG. 13. For example, the watermark location identifier component 1320 may determine to embed a first audio watermark associated with performing wakeword detection suppression within a wakeword represented in the first audio data, may determine to embed a second audio watermark associated with a local signal transmission within a particular word or phrase corresponding to the command, may determine to embed a third audio watermark associated with uniquely identifying media content at periodic intervals throughout the first audio data, and so on.

As illustrated in FIG. 14, the watermark sign sequence generator component 1330 may determine a sign sequence corresponding to the audio watermark to embed at the location(s). For example, the watermark sign sequence generator component 1330 may identify an existing sign sequence corresponding to the audio watermark, if applicable, may generate a new sign sequence with which to associate the audio watermark, and/or the like.

Using the location(s), the sign sequence, and/or other information associated with the audio watermark, multiple watermark generator components 1350 may generate watermark data corresponding to the audio watermark (e.g., $wm_{bc}$) and/or the duplicate audio watermark(s) (e.g., $wm_{dup}$) and may send the watermark data and/or the location(s) to a watermark encoder 1360. For example, a first watermark generator component 1350a may generate first watermark data corresponding to the audio watermark in a first frequency band, a second watermark generator component 1350b may generate second watermark data corresponding to a first duplicate audio watermark in a second frequency band, and so on until an i-th watermark generator component 1350i generates i-th watermark data in an i-th frequency band.

To illustrate that the frequency-extended watermark encoding 1400 includes embedding the audio watermark and/or the duplicate audio watermark(s) in two or more frequency bands, FIG. 14 illustrates each audio watermark and/or duplicate audio watermark as corresponding to an individual watermark generator component 1350. However, the disclosure is not limited thereto, and a single watermark generator component 1350 may generate the watermark data associated with the audio watermark and/or the duplicate audio watermark(s) without departing from the disclosure.

The watermark encoder 1360 may receive the watermark data and/or the location(s) from the watermark generator components 1350 and may receive the original media content data 1305 from the encoder input interface 1310. However, the disclosure is not limited thereto, and in some examples the watermark encoder 1360 may receive the first audio data represented in the original media content data 1305 from the encoder input interface 1310 without departing from the disclosure.

Using the location(s), the watermark encoder component 1360 may embed the watermark data in the first audio data associated with the original media content data 1305 to generate second audio data and may output the second audio data. For example, the second audio data may include representation(s) of the audio watermark along with one or more duplicate audio watermarks (e.g., $wm_{bc}+wm_{dup}$) embedded at the location(s) within the second audio data. The watermark encoder 1360 may generate watermarked media content data 1365, which replaces the first audio data associated with the original media content data 1305 with the second audio data generated by the watermark encoder 1360.

While FIG. 14 illustrates an example in which the frequency-extended watermark encoding 1400 embeds duplicate audio watermark(s) (e.g., $wm_{dup}$), the disclosure is not limited thereto. In some examples, the frequency-extended watermark encoding 1400 may correspond to embedding an extended audio watermark across a wider frequency range of the audio data without departing from the disclosure. For example, the system 100 may perform frequency-extended watermark encoding 1400 to spread the energy across multiple frequency bands, to utilize a wider bandwidth to send additional information, and/or the like without departing from the disclosure. To illustrate an example, the system 100 may embed different portions of the extended audio watermark in corresponding location(s) indicated by the watermark generator components 1350.

Additionally or alternatively, while FIG. 14 illustrates the watermark sign sequence generator component 1330 determining a single sign sequence corresponding to the audio watermark and sending the sign sequence to each of the watermark generator components 1350, the disclosure is not limited thereto. Instead, in some examples the watermark sign sequence generator component 1330 may determine multiple sign sequences and/or the system 100 may include multiple watermark sign sequence generator components 1330 without departing from the disclosure.

In a first example, the frequency-extended watermark encoding 1400 may generate a single sign sequence and send the sign sequence to each of the watermark generator components 1350. Thus, the extended audio watermark may comprise the baseline audio watermark in a first frequency band and duplicate audio watermarks in one or more additional frequency bands. In a second example, the frequency-extended watermark encoding 1400 may generate a sign sequence and may send the sign sequence to each of the watermark generator components 1350. However, in this example the watermark generator components 1350 may be configured to embed the sign sequence differently in each of the frequency bands. For example, a first watermark generator component 1350a may be configured to embed the sign sequence in a first frequency band, while a second watermark generator component 1350b may be configured to embed an inverse of the sign sequence in a second frequency band without departing from the disclosure. Additionally or alternatively, the first watermark generator component 1350a may be configured to embed the sign sequence in the first frequency band during a first time range, while the second watermark generator component 1350 may be configured to embed the sign sequence in the second frequency band during a second time range, such that the sign sequence is temporally offset between the first frequency band and the second frequency band. Thus, the system 100 may embed offsetting audio watermarks and/or sign sequences in different frequency bands without departing from the disclosure.

Figure 15:
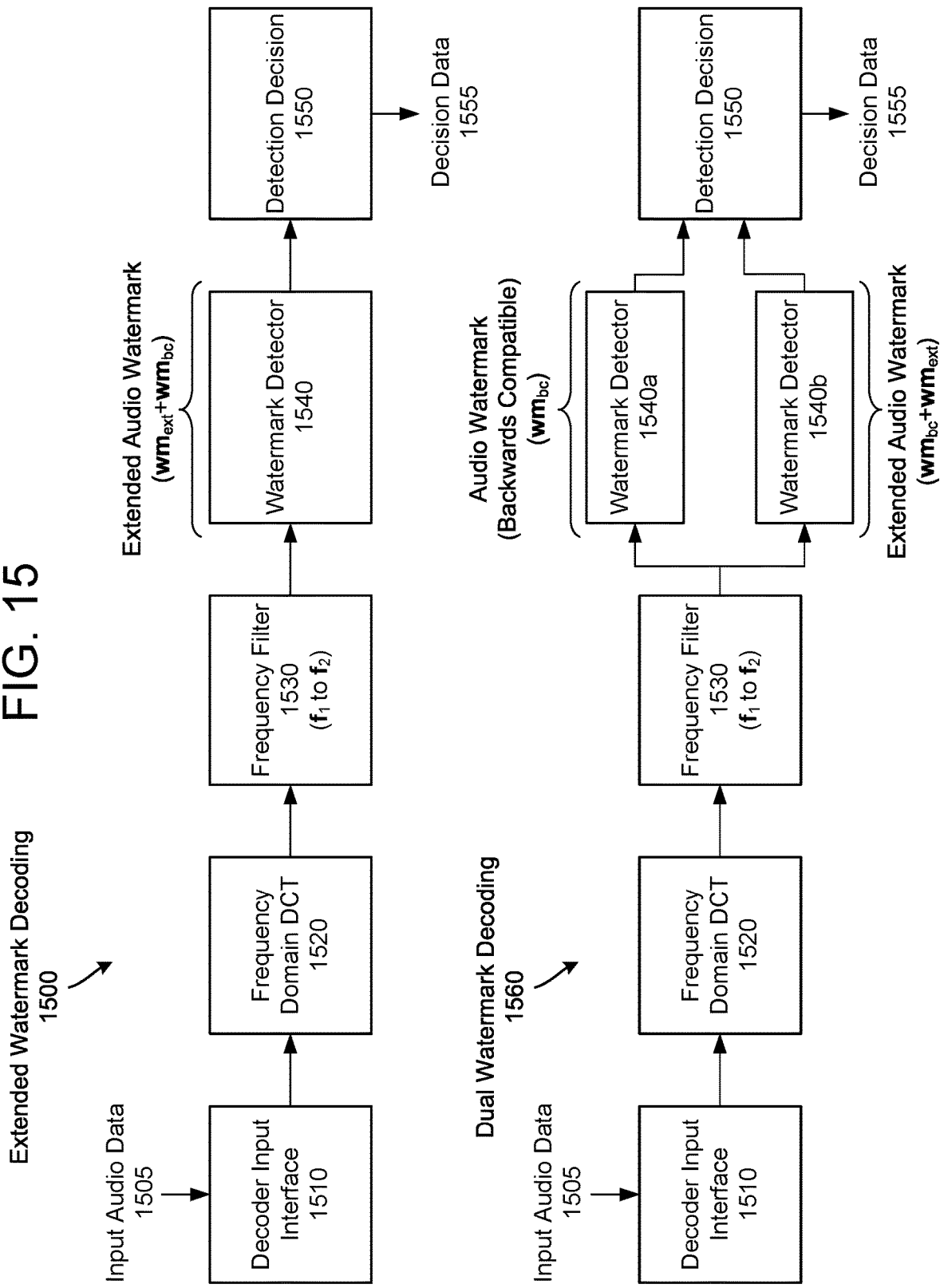
FIG. 15 illustrates examples of component diagrams for decoding media content using time extension according to embodiments of the present disclosure.

FIG. 15 illustrates examples of component diagrams for decoding media content using time extension according to embodiments of the present disclosure. In some examples, the system 120 may perform extended watermark decoding 1500 with a single watermark detector. As illustrated in FIG. 15, during the extended watermark decoding 1500 a decoder input interface 1510 may receive input audio data 1505 embedded with an audio watermark. For example, the input audio data 1505 may correspond to watermarked media content, such as a television commercial, a movie, a radio broadcast, and/or the like, although the disclosure is not limited thereto.

The system 120 may process the input audio data 1505 using a frequency domain discrete cosine transform (DCT) component 1520 to convert the input audio data 1505 from a time domain to a frequency domain, and then the system 120 may process the frequency domain signal using a frequency filter component 1530 to generate first audio data in a first frequency band (e.g., $f_1$ to $f_2$). However, the disclosure is not limited thereto and in some examples the system 120 may use a bandpass filter in the time domain to generate the first audio data in the first frequency band without departing from the disclosure.

As illustrated in FIG. 15, the system 120 may include a watermark detector component 1540 configured to detect the extended audio watermark (e.g., $wm_{bc}+wm_{ext}$), as described above with regard to FIGS. 1A-1C and 11-12B. For example, the watermark detector component 1540 may determine whether the extended audio watermark is represented in the first audio data and may generate watermark detection data indicating whether the extended audio watermark is detected. Using the watermark detection data, a detection decision component 1550 may generate decision data 1555 indicating whether the extended audio watermark is represented in the input audio data 1505.

In other examples, the system 120 may perform dual watermark decoding 1560 with two watermark detectors. As illustrated in FIG. 15, during the dual watermark decoding 1560 the decoder input interface 1510 may receive the input audio data 1505, the frequency domain DCT component 1520 may convert the input audio data 1505 from the time domain to the frequency domain, and then the frequency filter component 1530 may process the frequency domain signal to generate the first audio data in the first frequency band (e.g., $f_1$ to $f_2$), as described in greater detail above.

As illustrated in FIG. 15, the system 120 may include a first watermark detector component 1540a configured to detect the audio watermark (e.g., $wm_{bc}$) and a second watermark detector 1540b configured to detect the extended audio watermark (e.g., $wm_{bc}+wm_{ext}$), as described above with regard to FIGS. 1A-1C and 11-12B. However, the disclosure is not limited thereto, and in some examples the second watermark detector 1540b may be configured to detect the watermark extension (e.g., $wm_{ext}$) without departing from the disclosure.

As described above, the first watermark detector component 1540a may determine whether the audio watermark (e.g., $wm_{bc}$) is represented in the first audio data and may generate first watermark detection data indicating whether the audio watermark (e.g., $wm_{bc}$) is detected. Similarly, the second watermark detector 1540b may determine whether the extended audio watermark (e.g., $wm_{bc}+wm_{ext}$) is represented in the second audio data and may generate second watermark detection data indicating whether the extended audio watermark (e.g., $wm_{bc}+wm_{ext}$) is detected. Using the first watermark detection data and/or the second watermark detection data, the detection decision component 1550 may generate decision data 1555 indicating whether the audio watermark and/or the extended audio watermark is represented in the input audio data 1505.

Figure 16A:
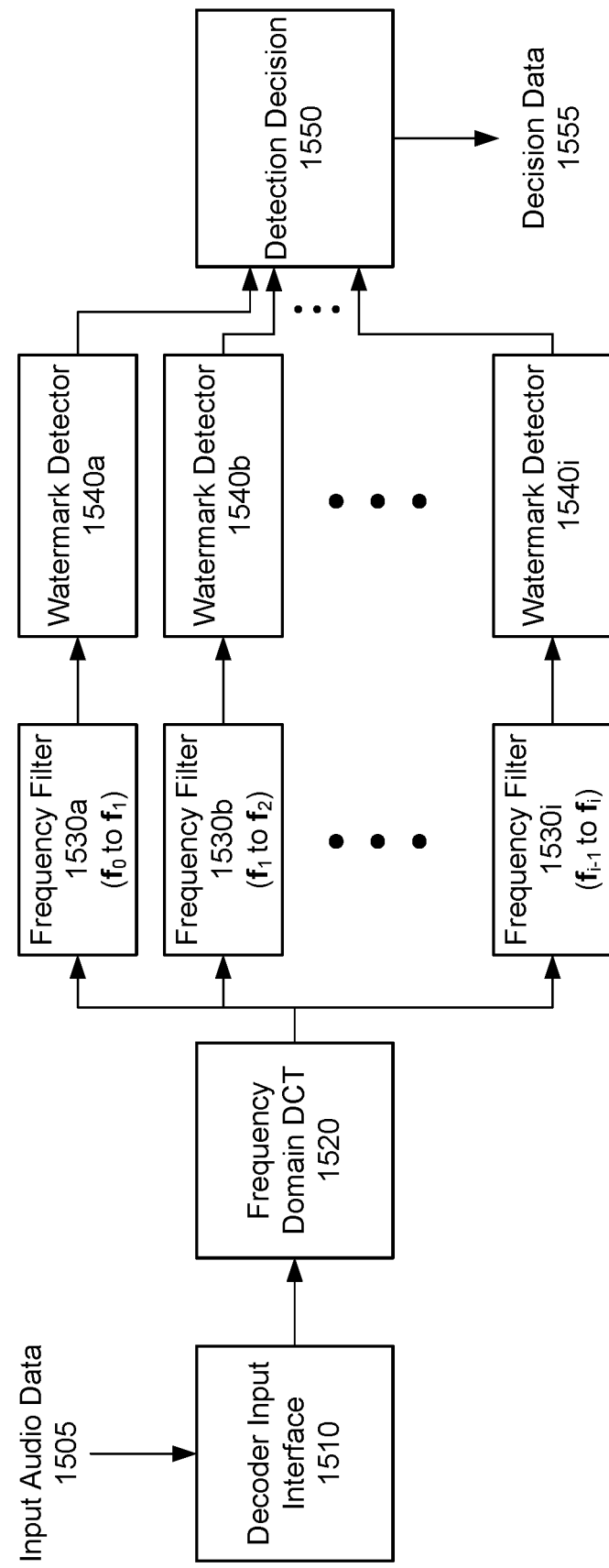
FIGS. 16A-16B illustrate example component diagrams for decoding media content using frequency extension according to embodiments of the present disclosure.
Figure 16B:
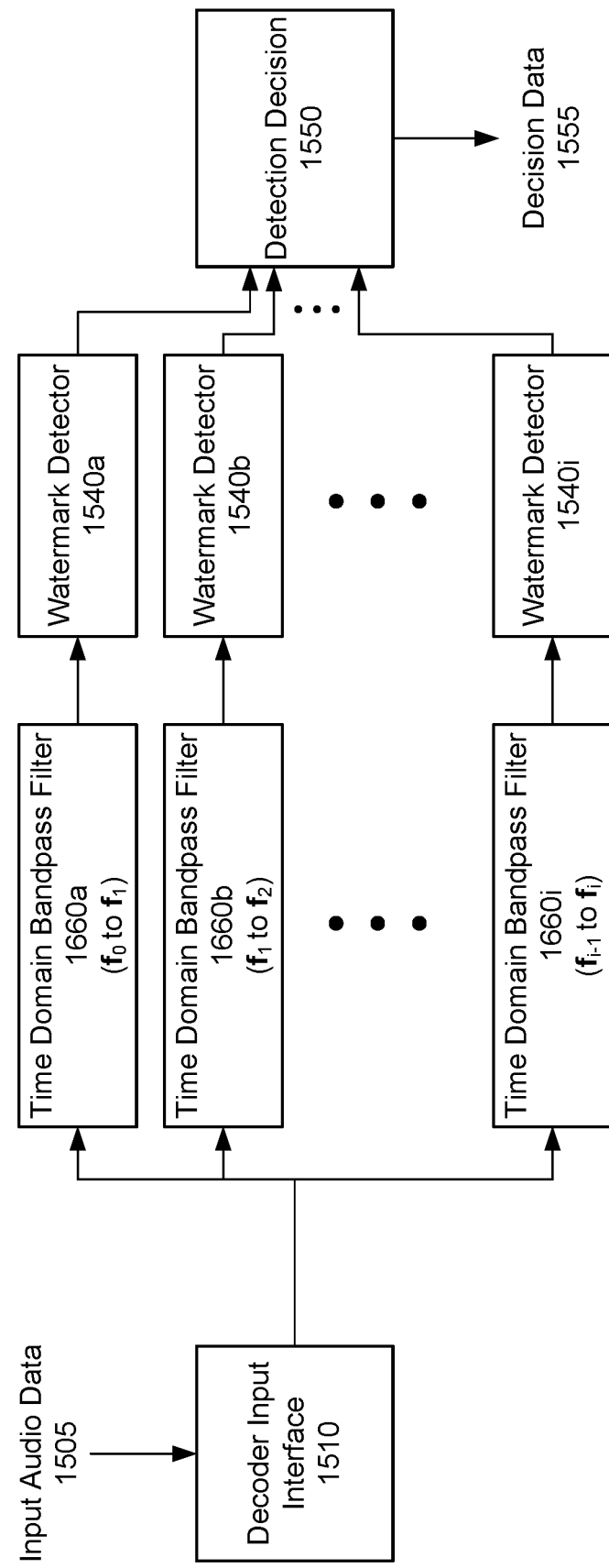

FIGS. 16A-16B illustrate example component diagrams for decoding media content using frequency extension according to embodiments of the present disclosure. In some examples, the system 120 may perform parallel frequency decoding 1600 (e.g., in a frequency domain), as described in greater detail above with regard to FIG. 1B. As illustrated in FIG. 16A, during the parallel frequency decoding 1600 the decoder input interface 1510 may receive the input audio data 1505 embedded with the audio watermark. For example, the input audio data 1505 may correspond to watermarked media content, such as a television commercial, a movie, a radio broadcast, and/or the like, although the disclosure is not limited thereto.

The system 120 may process the input audio data 1505 using the frequency domain DCT component 1520 to convert the input audio data 1505 from the time domain to the frequency domain. However, instead of including a single frequency filter component 1530, FIG. 16A illustrates an example in which the system 120 includes a plurality of frequency filter components. For example, a first frequency filter component 1530a may process the frequency domain signal to generate first audio data in the first frequency band (e.g., $f_0$ to $f_1$), a second frequency filter component 1530b may process the frequency domain signal to generate second audio data in a second frequency band (e.g., $f_1$ to $f_2$), and so on until an i-th frequency filter component 1530i processes the frequency domain signal to generate i-th audio data in an i-th frequency band (e.g., $f_{i-1}$ to $f_i$).

Each frequency filter component 1530 may output the corresponding frequency-specific audio data to a separate watermark detector component 1540 configured to detect the audio watermark and/or the duplicate audio watermark. For example, a first watermark detector component 1540a may be configured to detect the audio watermark and/or the duplicate audio watermark in the first audio data in the first frequency band, a second watermark detector component 1540b may be configured to detect the audio watermark and/or the duplicate audio watermark in the second audio data in the second frequency band, and so on for each frequency band in which the audio watermark and/or the duplicate audio watermark may be embedded. Thus, during parallel frequency decoding 1600 the system 120 may decode the input audio data 1505 using multiple decoders in parallel.

As illustrated in FIG. 16A, each of the watermark detector components 1540 may generate watermark detection data indicating whether the audio watermark and/or the duplicate audio watermark is detected in their particular frequency band and may send the watermark detection data to the detection decision component 1550. For example, the first watermark detector component 1540a may determine whether the audio watermark (e.g., $wm_{bc}$) and/or the duplicate audio watermark (e.g., $wm_{dup}$) is represented in the first audio data and may generate first watermark detection data. Similarly, the second watermark detector component 1540b may determine whether the audio watermark (e.g., $wm_{bc}$) and/or the duplicate audio watermark (e.g., $wm_{dup}$) is represented in the second audio data and may generate second watermark detection data, and so on for each of the frequency bands. Using the watermark detection data, the detection decision component 1550 may generate the decision data 1555 indicating whether the extended audio watermark (e.g., the audio watermark (e.g., $wm_{bc}$) and/or the duplicate audio watermark (e.g., $wm_{dup}$)) is represented in the input audio data 1505.

In some examples, the detection decision component 1550 may determine that the extended audio watermark is detected based on any of the watermark detector components 1540 detecting the baseline audio watermark and/or the duplicate audio watermark(s). For example, if any of the watermark detector components 1540 detect a single audio watermark, the detection decision component 1550 may generate the decision data 1555 to indicate that the extended audio watermark is detected, which corresponds to a logic OR gate. However, the disclosure is not limited thereto, and the detection decision component 1550 may determine that the extended audio watermark is detected using a variety of techniques without departing from the disclosure. For example, the detection decision component 1550 may determine that the extended audio watermark is detected when all of the watermark detector components 1540 detect an audio watermark (e.g., logic AND gate), when M out of the N watermark detector components 1540 detect an audio watermark, when a desired percentage of the watermark detector components 1540 detect an audio watermark, and/or the like, although the disclosure is not limited thereto.

In some examples, the detection decision component 1550 may include a cumulative detector configured to combine raw detection scores received from each of the watermark detector components 1540 to generate a cumulative score. For example, the detection decision component 1550 may perform joint detection across multiple frequency bands and may determine that the extended audio watermark is detected when the cumulative score satisfies a condition (e.g., exceeds a threshold value, although the disclosure is not limited thereto).

While FIG. 16A illustrates an example of the system 100 performing parallel frequency decoding 1600 in a frequency domain, the disclosure is not limited thereto. As illustrated in FIG. 16B, in some examples the system 100 may be configured to perform parallel frequency decoding 1650 in a time domain without departing from the disclosure. While the decoder input interface 1510, the watermark detector components 1540, and the detection decision component 1550 operate as described above, performing parallel frequency decoding 1650 in the time domain replaces the frequency domain DCT component 1520 and the plurality of frequency filter components 1530a-1530i with a plurality of time domain bandpass filter components 1660a-1660i, although the disclosure is not limited thereto.

While the extended audio watermark enables enhanced watermark detection with greater accuracy relative to detecting the baseline audio watermark, adding the time extension(s) and/or the frequency extension(s) requires that the extended audio watermark be embedded during the encoding process and are therefore not backwards compatible with existing watermarked media content. To improve an accuracy of the enhanced watermark detection for both existing audio watermarks and extended audio watermarks, in some examples the system 120 may perform the enhanced watermark detection by decoding audio data using multiple time shifts. For example, instead of performing watermark detection using a single watermark decoder that processes a series of watermark frames (e.g., 10 ms of audio data for each watermark frame) using a single time shift, the system 120 may perform enhanced watermark detection using multiple watermark decoders that process the series of watermark frames using multiple time shifts. Thus, each of the multiple watermark decoders processes watermark frames that are offset from the other watermark decoders by a variable amount.

To illustrate a first example, performing enhanced watermark detection using two time shifts corresponds to two watermark decoders processing the series of watermark frames with a single frame offset. For example, a first watermark decoder may process the watermark frames using a first time shift (e.g., 0 ms), while a second watermark decoder may process the watermark frames using a second time shift (e.g., 5 ms). This doubles the processing consumption associated with performing enhanced watermark detection, but increases a resolution of the enhanced watermark detection as one of the watermark decoders is more likely to be synchronized with the embedded audio watermark. To illustrate a second example, performing enhanced watermark detection using four time shifts corresponds to four watermark decoders processing the series of watermark frames with three frame offsets. For example, a first watermark decoder may process the watermark frames using a first time shift (e.g., 0 ms), a second watermark decoder may process the watermark frames using a second time shift (e.g., 2.5 ms), a third watermark decoder may process the watermark frames using a third time shift (e.g., 5 ms), and a fourth watermark decoder may process the watermark frames using a fourth time shift (e.g., 7.5 ms). This quadruples the processing consumption associated with performing enhanced watermark detection, but increases a resolution of the enhanced watermark detection even further. However, the disclosure is not limited thereto and the system 120 may perform enhanced watermark detection using any number of time shifts without departing from the disclosure.

Figure 17A:
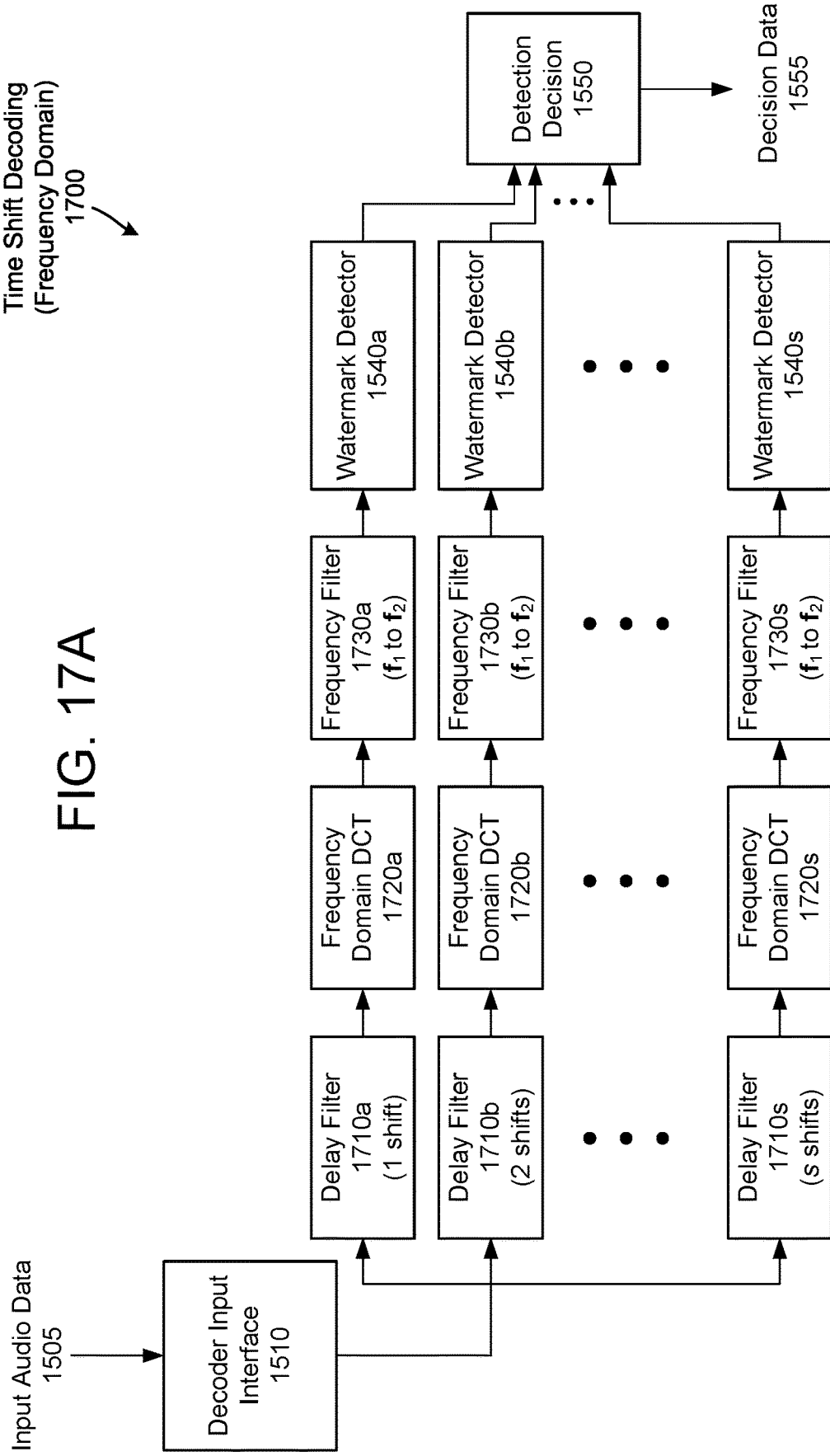
FIGS. 17A-17B illustrate example component diagram for decoding media content using multiple time shifts according to embodiments of the present disclosure.
Figure 17B:
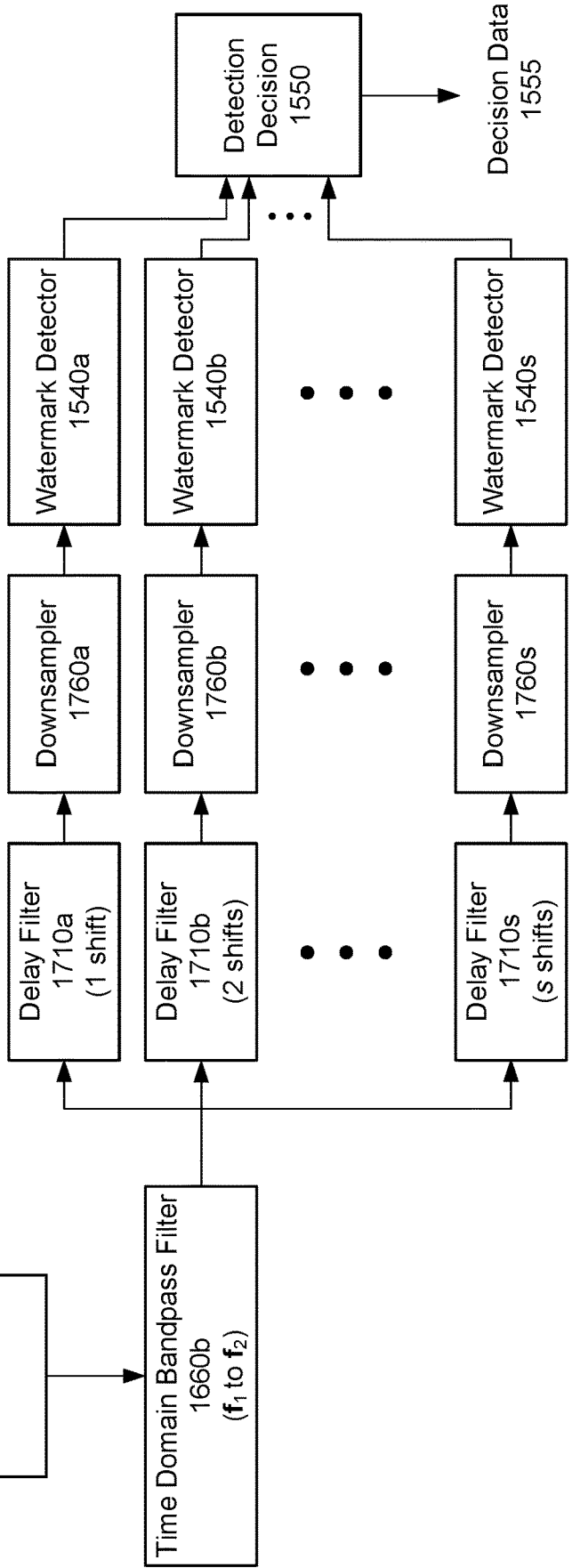

FIGS. 17A-17B illustrate example component diagrams for decoding media content using multiple time shifts according to embodiments of the present disclosure. As illustrated in FIG. 17A, during time shift decoding 1700 (e.g., in a frequency domain), the decoder input interface 1510 may receive the input audio data 1505 embedded with the audio watermark. For example, the input audio data 1505 may correspond to watermarked media content, such as a television commercial, a movie, a radio broadcast, and/or the like, although the disclosure is not limited thereto.

To perform time shift decoding 1700, the system 100 may process the input audio data 1505 using a plurality of parallel decoding paths. For example, a first delay filter component 1710a may process the input audio data 1505 using a first time shift (e.g., first frame offset) to generate first shifted audio data, a second delay filter component 1710b may process the input audio data 1505 using a second time shift (e.g., second frame offset) to generate second shifted audio data, and so on until an s-th delay filter component 1710s may process the input audio data 1505 using an s-th time shift (e.g., s-th frame offset) to generate s-th shifted audio data.

In the time shift decoding 1700 example, the first time shift corresponds to a first decoding path, the second time shift corresponds to a second decoding path, and so on until the s-th time shift corresponds to an s-th decoding path. As illustrated in FIG. 17A, the first decoding path may include the first delay filter component 1710a followed by a first frequency domain DCT component 1720a that is configured to convert the first shifted audio data from the time domain to the frequency domain, and the first frequency domain DCT component 1720a may be followed by a first frequency filter component 1730a that is configured to generate first audio data in a first frequency band (e.g., $f_1$ to $f_2$).

In the example illustrated in FIG. 17A, each of the decoding paths generate audio data in the first frequency band (e.g., $f_1$ to $f_2$). For example, each of the frequency filter components 1730a-1730s are configured to filter the audio data to remove frequency bands other than the first frequency band. However, the disclosure is not limited thereto and the frequency band(s) may vary without departing from the disclosure. In some examples, each of the decoding paths may include two or more frequency filter components 1730 without departing from the disclosure. For example, the first decoding path may include the first frequency filter component 1730*a*-1 that is configured to generate the first audio data in the first frequency band (e.g., $f_1$ to $f_2$) along with a second frequency filter component 1730*a*-2 that is configured to generate second audio data in a second frequency band (e.g., $f_2$ to $f_3$), although the disclosure is not limited thereto.

Each frequency filter component 1730 may output the audio data to a corresponding watermark detector component 1540 configured to detect the audio watermark and/or the extended audio watermark. For example, the first decoding path may include a first watermark detector component 1540*a* configured to detect the audio watermark and/or the extended audio watermark based on the first time shift, the second decoding path may include a second watermark detector component 1540*b* configured to detect the audio watermark and/or the extended audio watermark based on the second time shift, and so on for each of the multiple time shifts. Thus, during time shift decoding 1700 the system 120 may decode the input audio data 1505 using multiple decoders in parallel.

If the first decoding path includes multiple frequency filter components 1730, the first decoding path will include multiple watermark detector components 1540 as each of the frequency filter components 1730 generates audio data for an individual watermark detector component 1540. For example, the first frequency filter component 1730*a*-1 may send the first audio data in the first frequency band (e.g., $f_1$ to $f_2$) to a first primary watermark detector component 1540*a*-1, the second frequency filter component 1730*a*-2 may send the second audio data in the second frequency band (e.g., $f_2$ to $f_3$) to a first secondary watermark detector component 1540*a*-2, and so on. Thus, the system 100 may perform time shift decoding as part of performing enhanced watermark detection to detect the extended audio watermark in multiple frequency bands without departing from the disclosure.

As illustrated in FIG. 17A, each of the watermark detector components 1540 may generate watermark detection data indicating whether the audio watermark and/or the extended audio watermark is detected and may send the watermark detection data to the detection decision component 1550. For example, the first watermark detector component 1540*a* may determine whether the audio watermark (e.g., $wm_{bc}$) and/or the extended audio watermark (e.g., $wm_{bc}+wm_{ext}$) is represented in the first audio data and may generate first watermark detection data. Similarly, the second watermark detector component 1540*b* may determine whether the audio watermark (e.g., $wm_{bc}$) and/or the extended audio watermark (e.g., $wm_{bc}+wm_{ext}$) is represented in the second audio data and may generate second watermark detection data, and so on. Using the watermark detection data, the detection decision component 1550 may generate the decision data 1555 indicating whether the audio watermark (e.g., $wm_{bc}$) and/or the extended audio watermark (e.g., $wm_{bc}+wm_{ext}$) is represented in the input audio data 1505.

As described above, in some examples the detection decision component 1550 may determine that an audio watermark is detected based on any of the watermark detector components 1540 detecting an audio watermark. For example, if any of the watermark detector components 1540 detect a single audio watermark, the detection decision component 1550 may generate the decision data 1555 to indicate that the extended audio watermark is detected, which corresponds to a logic OR gate. However, the disclosure is not limited thereto, and the detection decision component 1550 may determine that an audio watermark is detected using a variety of techniques without departing from the disclosure. For example, the detection decision component 1550 may determine that an audio watermark is detected when all of the watermark detector components 1540 detect an audio watermark (e.g., logic AND gate), when M out of the N watermark detector components 1540 detect an audio watermark, when a desired percentage of the watermark detector components 1540 detect an audio watermark, and/or the like, although the disclosure is not limited thereto.

In some examples, the detection decision component 1550 may include a cumulative detector configured to combine raw detection scores received from each of the watermark detector components 1540 to generate a cumulative score. For example, the detection decision component 1550 may perform joint detection across multiple decoding paths (and/or multiple frequency bands) and may determine that an audio watermark is detected when the cumulative score satisfies a condition (e.g., exceeds a threshold value, although the disclosure is not limited thereto).

While FIG. 17A illustrates an example of performing time shift decoding in the frequency domain, the disclosure is not limited thereto and in some examples the system 100 may perform time shift decoding in the time domain. For example, the system 100 may use a bandpass filter in the time domain to generate audio data in the first frequency band without departing from the disclosure.

As illustrated in FIG. 17B, in some examples the system 100 may perform time shift decoding 1750 in a time domain using the second time domain bandpass filter component 1660*b* that is configured to generate time-domain audio data associated with the first frequency band (e.g., $f_1$ to $f_2$).

The system 100 may perform the time shift decoding 1750 using a plurality of parallel decoding paths. For example, the first delay filter component 1710*a* may process the time-domain audio data using a first time shift (e.g., first frame offset) to generate first shifted audio data, the second delay filter component 1710*b* may process the time-domain audio data using a second time shift (e.g., second frame offset) to generate second shifted audio data, and so on until an s-th delay filter component 1710*s* may process the time-domain audio data using an s-th time shift (e.g., s-th frame offset) to generate s-th shifted audio data.

In the time shift decoding 1750 example, the first time shift corresponds to a first decoding path, the second time shift corresponds to a second decoding path, and so on until the s-th time shift corresponds to an s-th decoding path. As illustrated in FIG. 17B, the first decoding path may include the first delay filter component 1710*a* followed by a first downsampler component 1760*a*, which is followed by the first watermark detector component 1540*a*. Similarly, the second decoding path may include the second delay filter component 1710*b* followed by a second downsampler component 1760*b*, which is followed by the second watermark detector component 1540*b*.

While the example of time shift decoding 1750 illustrated in FIG. 17B performs parallel watermark decoding in a single frequency band, the disclosure is not limited thereto. In some examples, the system 100 may perform time shift decoding while performing enhanced watermark detection by detecting audio watermarks represented in multiple frequency bands without departing from the disclosure. For example, the system 100 may perform time shift decoding in a second frequency band using an additional time domain bandpass filter component 1660, which also branches out to multiple decoding paths as illustrated in FIG. 17B. Thus, the multiple decoding paths would include a corresponding number of delay filter components 1710, downsampler components 1760, and watermark detector components 1540 associated with the additional time domain bandpass filter component 1660.

In some examples, the system 100 may implement time shift decoding in the time domain differently without departing from the disclosure. For example, instead of including a delay filter component 1710 and an individual downsampler component 1760 for each decoding path, the system 100 may include a single downsampler component 1760 following the second time domain bandpass filter component 1660b and the downsampler component 1760 may include a polyphase filter bank that is configured to generate the multiple time shifts (e.g., frame offsets). Thus, the downsampler component 1760 may branch out to generate multiple decoding paths without departing from the disclosure.

While the examples illustrated in FIGS. 17A-17B illustrate multiple watermark decoders performing watermark detection in parallel (e.g., parallel decoding paths), the disclosure is not limited thereto. In some examples, the enhanced watermark detection illustrated in FIGS. 17A-17B may be performed by a single component without departing from the disclosure. Thus, instead of multiple separate watermark decoders individually processing each series of watermark frames, a single watermark decoder may process multiple series of watermark frames without departing from the disclosure.

Figure 18:
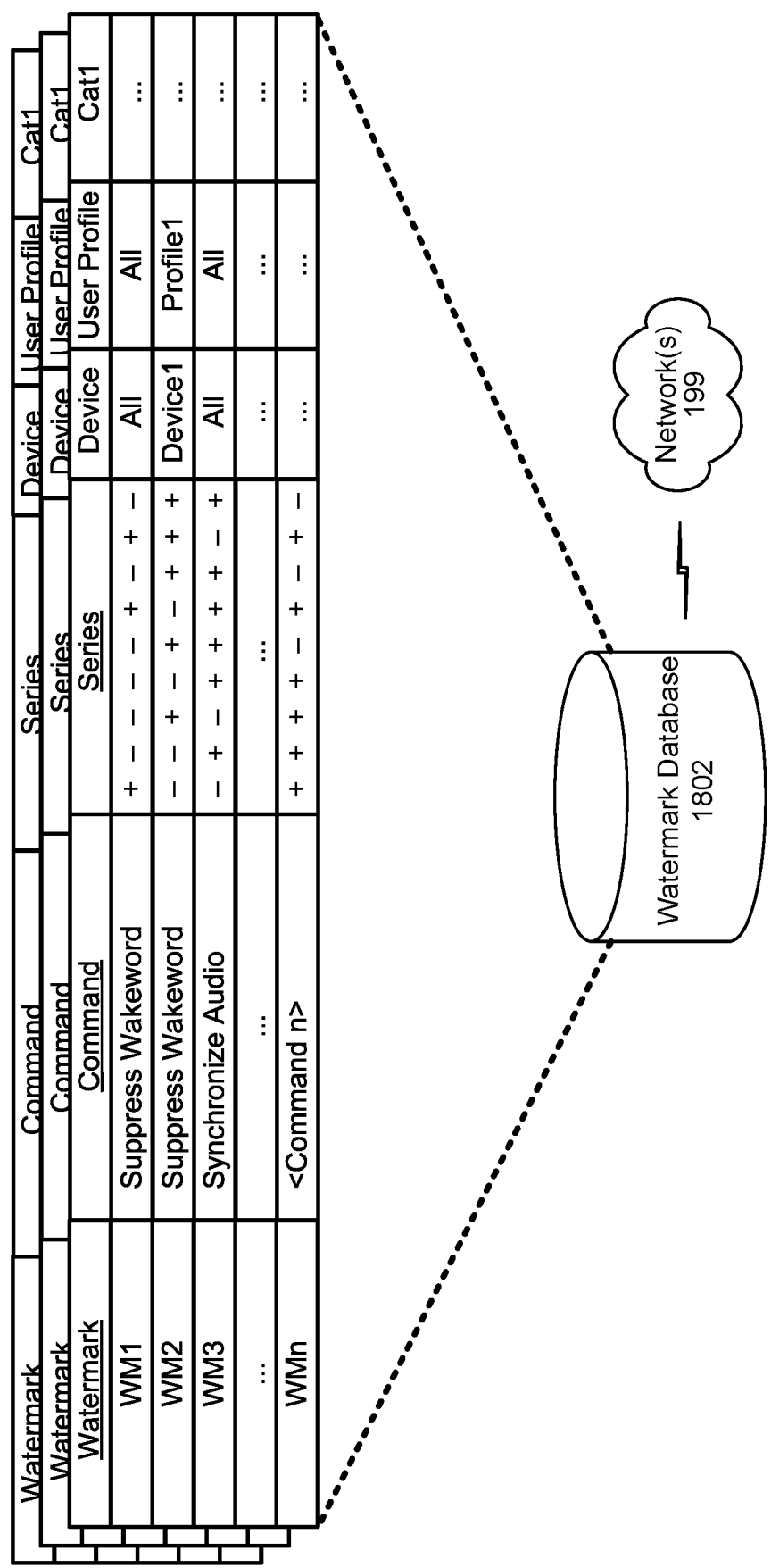
FIG. 18 illustrates data stored and associated with a watermark database according to embodiments of the present disclosure.

FIG. 18 illustrates data stored and associated with a watermark database according to embodiments of the present disclosure. The device 110 and/or the system 120 may include or refer to data regarding watermarks, shown by the watermark database 1802 illustrated in FIG. 18. The watermark database 1802 may be located on the device 110 and/or proximate to the system 120, although the disclosure is not limited thereto, and/or may otherwise be in communication with various components, for example over the network(s) 199.

The watermark database 1802 may include a variety of information related to audio watermarks that are used by the system 100. For illustration, as shown in FIG. 18, the watermark database 1802 may include data regarding audio watermarks, such as a name associated with an audio watermark (e.g., WM1-WMn, although the name can vary without departing from the disclosure), a command associated with the audio watermark (e.g., "Suppress wakeword," "Synchronize audio," etc.), a sign sequence used as a shared key to encode/decode the audio watermark (e.g., a sequence of positive or negative values, such as "+−−−−+−+−"), a device associated with the audio watermark (e.g., some audio watermarks may be generic to all devices, whereas other audio watermarks may be associated with individual device(s), enabling specific control over a single device), a user profile associated with the audio watermark (e.g., some audio watermarks may be generic to all user profiles, whereas other audio watermarks may be associated with individual user profile(s), enabling specific functionality for a single user profile), and/or the like.

While FIG. 18 illustrates examples of different types of information included within the watermark database 1802, the disclosure is not limited thereto. Instead, the watermark database 1802 may include additional information not illustrated and/or may not include information illustrated in FIG. 18 without departing from the disclosure. For example, the watermark database 1802 may include device identifier (ID) and internet protocol (IP) address information for different devices as well as names by which the devices may be referred to by a user. Further qualifiers describing the devices, a location of the device, commands associated with the device, input capabilities of the device, output capabilities of the device, and/or the like may also be listed in the watermark database 1802.

Figure 19:
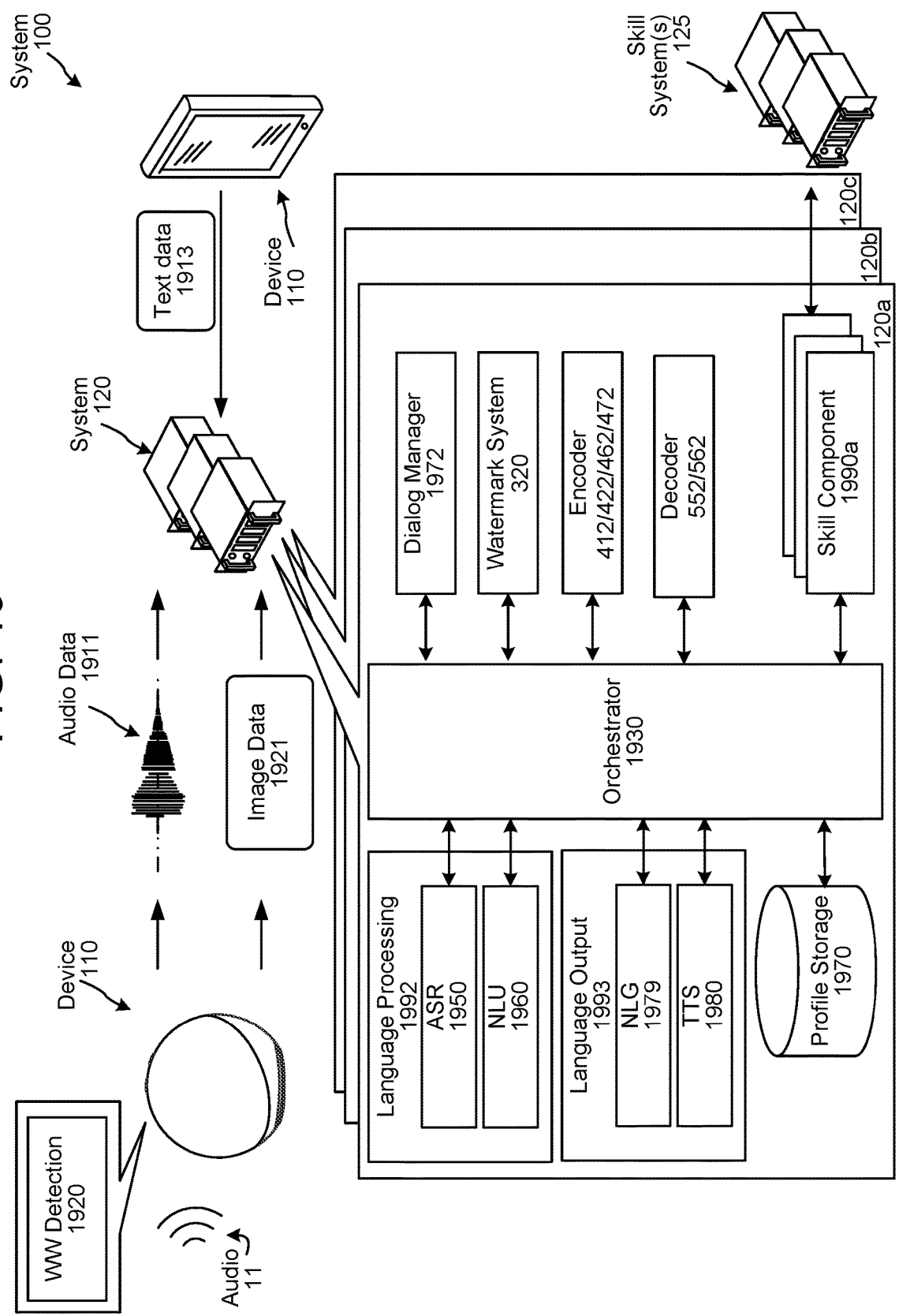
FIG. 19 is a conceptual diagram of components of the system, according to embodiments of the present disclosure.

The system 100 may operate using various components as described in FIGS. 19 and 20. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1920. The wakeword detection component 1920 may be configured to detect various wakewords. In at least some examples, each wakeword may correspond to a name of a different digital assistant. An example wakeword/digital assistant name is "Alexa." In another example, input to the system may be in form of text data 1913, for example as a result of a user typing an input into a user interface of device 110. Other input forms may include indication that the user has pressed a physical or virtual button on device 110, the user has made a gesture, etc. The device 110 may also capture images using camera(s) 2118 of the device 110 and may send image data 1921 representing those image(s) to the system 120. The image data 1921 may include raw image data or image data processed by the device 110 before sending to the system 120. The image data 1921 may be used in various manners by different components of the system to perform operations such as determining whether a user is directing an utterance to the system, interpreting a user command, responding to a user command, etc.

The wakeword detector 1920 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1920 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1920 and/or input is detected by an input detector, the device 110 may "wake" and begin transmitting audio data 1911, representing the audio 11, to the system 120. The audio data 1911 may include data corresponding to the wakeword; in other embodiments, the portion of the audio corresponding to the wakeword is removed by the device 110 prior to sending the audio data 1911 to the system 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 1920 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 1990 of one or more systems 120.

Upon receipt by the system 120, the audio data 1911 may be sent to an orchestrator component 1930. The orchestrator component 1930 may include memory and logic that enables the orchestrator component 1930 to transmit various pieces and forms of data to various components of the system, as well as perform other operations as described herein.

The orchestrator component 1930 may send the audio data 1911 to a language processing component 1992. The language processing component 1992 (sometimes also referred to as a spoken language understanding (SLU) component) may include an automatic speech recognition (ASR) component 1950 and a natural language understanding (NLU) component 1960, although the disclosure is not limited thereto. The ASR component 1950 may transcribe the audio data 1911 into text data. The text data output by the ASR component 1950 represents one or more than one (e.g., in the form of an N-best list) ASR hypotheses representing speech represented in the audio data 1911. The ASR component 1950 interprets the speech in the audio data 1911 based on a similarity between the audio data 1911 and pre-established language models. For example, the ASR component 1950 may compare the audio data 1911 with models for sounds (e.g., acoustic units such as phonemes, senons, phones, etc.) and sequences of sounds to identify words that match the sequence of sounds of the speech represented in the audio data 1911. The ASR component 1950 sends the text data generated thereby to an NLU component 1960, via, in some embodiments, the orchestrator component 1930. The text data sent from the ASR component 1950 to the NLU component 1960 may include a single top-scoring ASR hypothesis or may include an N-best list including multiple top-scoring ASR hypotheses. An N-best list may additionally include a respective score associated with each ASR hypothesis represented therein.

The language processing component 1992 may further include a NLU component 1960. The NLU component 1960 may receive the text data from the ASR component. The NLU component 1960 may attempt to make a semantic interpretation of the phrase(s) or statement(s) represented in the text data input therein by determining one or more meanings associated with the phrase(s) or statement(s) represented in the text data. The NLU component 1960 may determine an intent representing an action that a user desires be performed and may determine information that allows a device (e.g., the device 110, the system 120, a skill component 1990, a skill system(s) 125, etc.) to execute the intent. For example, if the text data corresponds to "play the $5^{th}$ Symphony by Beethoven," the NLU component 1960 may determine an intent that the system output music and may identify "Beethoven" as an artist/composer and "5th Symphony" as the piece of music to be played. For further example, if the text data corresponds to "what is the weather," the NLU component 1960 may determine an intent that the system output weather information associated with a geographic location of the device 110. In another example, if the text data corresponds to "turn off the lights," the NLU component 1960 may determine an intent that the system turn off lights associated with the device 110 or the user 5. However, if the NLU component 1960 is unable to resolve the entity—for example, because the entity is referred to by anaphora such as "this song" or "my next appointment"—the language processing component 1992 can send a decode request to another language processing component 1992 for information regarding the entity mention and/or other context related to the utterance. The language processing component 1992 may augment, correct, or base results data upon the audio data 1911 as well as any data received from the other language processing component 1992.

The NLU component 1960 may return NLU results data (which may include tagged text data, indicators of intent, etc.) back to the orchestrator 1930. The orchestrator 1930 may forward the NLU results data to a skill component(s) 1990. If the NLU results data includes a single NLU hypothesis, the NLU component 1960 and the orchestrator component 1930 may direct the NLU results data to the skill component(s) 1990 associated with the NLU hypothesis. If the NLU results data includes an N-best list of NLU hypotheses, the NLU component 1960 and the orchestrator component 1930 may direct the top scoring NLU hypothesis to a skill component(s) 1990 associated with the top scoring NLU hypothesis. The system may also include a post-NLU ranker which may incorporate other information to rank potential interpretations determined by the NLU component 1960. The local device 110 may also include its own post-NLU ranker, which may operate similarly to the post-NLU ranker of the system 120.

While the above example illustrates the language processing component 1992 as including the ASR component 1950 and the NLU component 1960, the disclosure is not limited thereto. In some examples, the language processing component 1992 may be configured to generate the NLU results data (e.g., SLU results data) without performing automatic speech recognition and/or natural language understanding without departing from the disclosure. For example, in some examples the language processing component 1992 may be configured to process the audio data 1911 and generate the SLU results data without generating text data, although the disclosure is not limited thereto.

A skill component may be software running on the system 120 that is akin to a software application. That is, a skill component 1990 may enable the system 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system 120 may be configured with more than one skill component 1990. For example, a weather service skill component may enable the system 120 to provide weather information, a car service skill component may enable the system 120 to book a trip with respect to a taxi or ride sharing service, a restaurant skill component may enable the system 120 to order a pizza with respect to the restaurant's online ordering system, etc. A skill component 1990 may operate in conjunction between the system 120 and other devices, such as the device 110, in order to complete certain functions. Inputs to a skill component 1990 may come from speech processing interactions or through other interactions or input sources. A skill component 1990 may include hardware, software, firmware, or the like that may be dedicated to a particular skill component 1990 or shared among different skill components 1990.

A skill support system(s) 125 may communicate with a skill component(s) 1990 within the system 120 and/or directly with the orchestrator component 1930 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system 120 may be configured with a skill component 1990 dedicated to interacting with the skill support system(s) 125. Unless expressly stated otherwise, reference to a skill, skill device, or skill component may include a skill component 1990 operated by the system 120 and/or skill operated by the skill support system(s) 125. Moreover, the functionality described herein as a skill or skill may be referred to using many different terms, such as an action, bot, app, or the like. The skill 1990 and or skill support system(s) 125 may return output data to the orchestrator 1930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 1972 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 1972 may associate a dialog session identifier with the dialog upon identifying that the user is engaging in a dialog with the user. The dialog manager component 1972 may track a user input and the corresponding system generated response to the user input as a turn. The dialog session identifier may correspond to multiple turns of user input and corresponding system generated response. The dialog manager component 1972 may transmit data identified by the dialog session identifier directly to the orchestrator component 1930 or other component. Depending on system configuration the dialog manager component 1972 may determine the appropriate system generated response to give to a particular utterance or user input of a turn. Or creation of the system generated response may be managed by another component of the system (e.g., the language output component 1993, NLG 1979, orchestrator 1930, etc.) while the dialog manager component 1972 selects the appropriate responses. Alternatively, another component of the system 120 may select responses using techniques discussed herein. The text of a system generated response may be sent to a TTS component 1980 for creation of audio data corresponding to the response. The audio data may then be sent to a user device (e.g., device 110) for ultimate output to the user. Alternatively (or in addition) a dialog response may be returned in text or some other form.

The dialog manager component 1972 may receive the ASR hypothesis/hypotheses (i.e., text data) and make a semantic interpretation of the phrase(s) or statement(s) represented therein. That is, the dialog manager component 1972 determines one or more meanings associated with the phrase(s) or statement(s) represented in the text data based on words represented in the text data. The dialog manager component 1972 determines a goal corresponding to an action that a user desires be performed as well as pieces of the text data that allow a device (e.g., the device 110, the system 120, a skill 1990, a skill system(s) 125, etc.) to execute the intent. If, for example, the text data corresponds to "what is the weather," the dialog manager component 1972 may determine that that the system 120 is to output weather information associated with a geographic location of the device 110. In another example, if the text data corresponds to "turn off the lights," the dialog manager component 1972 may determine that the system 120 is to turn off lights associated with the device(s) 110 or the user(s) 5.

The dialog manager component 1972 may send the results data to one or more skill(s) 1990. If the results data includes a single hypothesis, the orchestrator component 1930 may send the results data to the skill(s) 1990 associated with the hypothesis. If the results data includes an N-best list of hypotheses, the orchestrator component 1930 may send the top scoring hypothesis to a skill(s) 1990 associated with the top scoring hypothesis.

The system 120 includes a language output component 1993. The language output component 1993 includes a natural language generation (NLG) component 1979 and a text-to-speech (TTS) component 1980. The NLG component 1979 can generate text for purposes of TTS output to a user. For example the NLG component 1979 may generate text corresponding to instructions corresponding to a particular action for the user to perform. The NLG component 1979 may generate appropriate text for various outputs as described herein. The NLG component 1979 may include one or more trained models configured to output text appropriate for a particular input. The text output by the NLG component 1979 may become input for the TTS component 1980. Alternatively or in addition, the TTS component 1980 may receive text data from a skill 1990 or other system component for output.

The NLG component 1979 may include a trained model. The NLG component 1979 generates text data from dialog data received by the dialog manager component 1972 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1980.

The TTS component 1980 may generate audio data (e.g., synthesized speech) from text data using one or more different methods. Text data input to the TTS component 1980 may come from a skill component 1990, the orchestrator component 1930, or another component of the system. In one method of synthesis called unit selection, the TTS component 1980 matches text data against a database of recorded speech. The TTS component 1980 selects matching units of recorded speech and concatenates the units together to form audio data. In another method of synthesis called parametric synthesis, the TTS component 1980 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system 120 as image data. The device 110 may further include circuitry for voice command-based control of the camera, allowing a user 5 to request capture of image or video data. The device 110 may process the commands locally or send audio data 1911 representing the commands to the system 120 for processing, after which the system 120 may return output data that can cause the device 110 to engage its camera.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 20A:
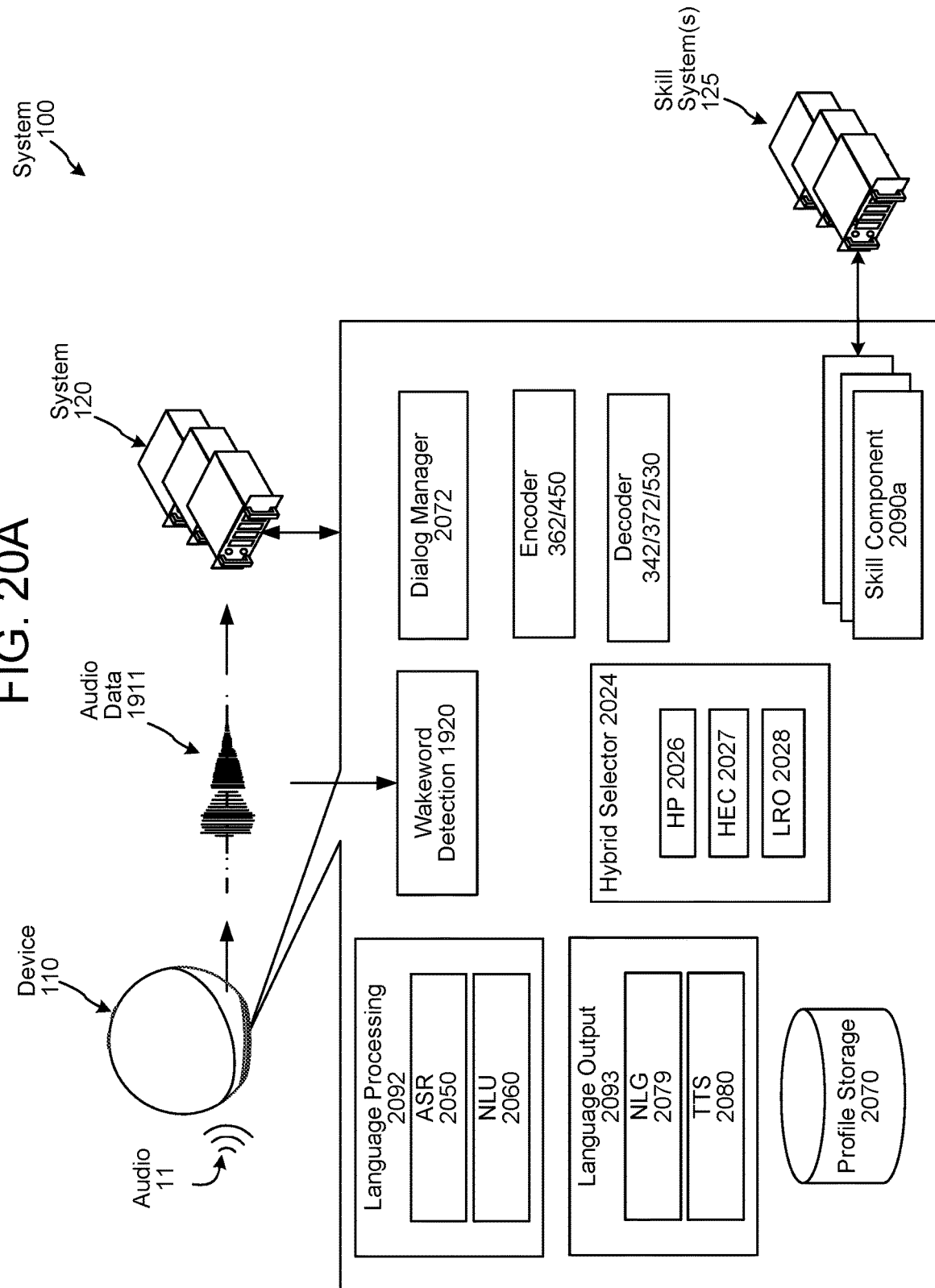

Although the components of FIG. 19 may be illustrated as part of system 120, device 110, or otherwise, the components may be arranged in other device(s) (such as in device 110 if illustrated in system 120 or vice-versa, or in other device(s) altogether) without departing from the disclosure. FIGS. 20A-20B illustrate examples of such a configured device 110. Although not necessarily repeated in FIGS. 19, 20A, and 20B, the device 110 and system 120 may also include the components and functionality described above, for example with reference to FIGS. 3A-5D.

While the disclosure is not limited thereto, FIG. 19 illustrates an example in which the system 120 may include encoder component(s) 412/422/462/472 and/or decoder component(s) 552/562. For example, the system 120 may include the encoder component 322 illustrated in FIG. 3A, the encoder component(s) 412/422 illustrated in FIG. 4A, the encoder component(s) 462/472 illustrated in FIG. 4C, the decoder component(s) 552/562 illustrated in FIG. 5C, a combination thereof, and/or the like without departing from the disclosure. Similarly, FIGS. 20A-20B illustrate examples in which the device 110 may include encoder component(s) 362/450 and/or decoder component(s) 342/372/530/552/562 without departing from the disclosure. For example, the device 110 may include the encoder component 362 illustrated in FIG. 3B, the encoder component 450 illustrated in FIG. 4B, the decoder component 342 illustrated in FIG. 3A, the decoder component 372 illustrated in FIG. 3B, the decoder component 530 illustrated in FIGS. 5A-5B, the decoder component(s) 552/562 illustrated in FIG. 5C, a combination thereof, and/or the like without departing from the disclosure.

In at least some embodiments, the system 120 may receive the audio data 1911 from the device 110, to recognize speech corresponding to a spoken input in the received audio data 1911, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 2080) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 19, the device 110 may include a wakeword detection component 1920 configured to compare the audio data 1911 to stored models used to detect a wakeword (e.g., "Alexa") that indicates to the device 110 that the audio data 1911 is to be processed for determining NLU output data (e.g., slot data that corresponds to a named entity, label data, and/or intent data, etc.). In at least some embodiments, a hybrid selector 2024, of the device 110, may send the audio data 1911 to the wakeword detection component 1920. If the wakeword detection component 1920 detects a wakeword in the audio data 1911, the wakeword detection component 1920 may send an indication of such detection to the hybrid selector 2024. In response to receiving the indication, the hybrid selector 2024 may send the audio data 1911 to the system 120 and/or the ASR component 2050. The wakeword detection component 1920 may also send an indication, to the hybrid selector 2024, representing a wakeword was not detected. In response to receiving such an indication, the hybrid selector 2024 may refrain from sending the audio data 1911 to the system 120, and may prevent the ASR component 2050 from further processing the audio data 1911. In this situation, the audio data 1911 can be discarded.

The device 110 may conduct its own speech processing using on-device language processing components, such as an SLU/language processing component 2092 (which may include an ASR component 2050 and an NLU 2060), similar to the manner discussed herein with respect to the SLU component 1992 (or ASR component 1950 and the NLU component 1960) of the system 120. Language processing component 2092 may operate similarly to language processing component 1992, ASR component 2050 may operate similarly to ASR component 1950 and NLU component 2060 may operate similarly to NLU component 1960. The device 110 may also internally include, or otherwise have access to, other components such as one or more skill components 2090 capable of executing commands based on NLU output data or other results determined by the device 110/system 120 (which may operate similarly to skill components 1990), profile storage 2070 (configured to store similar profile data to that discussed herein with respect to the profile storage 1970 of the system 120), or other components. In at least some embodiments, the profile storage 2070 may only store profile data for a user or group of users specifically associated with the device 110. Similar to as described above with respect to skill component 1990, a skill component 2090 may communicate with a skill system(s) 125. The device 110 may also have its own language output component 2093 which may include NLG component 2079 and TTS component 2080. Language output component 2093 may operate similarly to language output component 1993, NLG component 2079 may operate similarly to NLG component 1979 and TTS component 2080 may operate similarly to TTS component 1980. Finally, the device 110 may also have its own dialog manager component 2072, which may operate similarly to dialog manager component 1972.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 2024, of the device 110, may include a hybrid proxy (HP) 2026 configured to proxy traffic to/from the system 120. For example, the HP 2026 may be configured to send messages to/from a hybrid execution controller (HEC) 2027 of the hybrid selector 2024. For example, command/directive data received from the system 120 can be sent to the HEC 2027 using the HP 2026. The HP 2026 may also be configured to allow the audio data 1911 to pass to the system 120 while also receiving (e.g., intercepting) this audio data 1911 and sending the audio data 1911 to the HEC 2027.

In at least some embodiments, the hybrid selector 2024 may further include a local request orchestrator (LRO) 2028 configured to notify the ASR component 2050 about the availability of new audio data 1911 that represents user speech, and to otherwise initiate the operations of local language processing when new audio data 1911 becomes available. In general, the hybrid selector 2024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1911 is received, the HP 2026 may allow the audio data 1911 to pass through to the system 120 and the HP 2026 may also input the audio data 1911 to the on-device ASR component 2050 by routing the audio data 1911 through the HEC 2027 of the hybrid selector 2024, whereby the LRO 2028 notifies the ASR component 2050 of the audio data 1911. At this point, the hybrid selector 2024 may wait for response data from either or both of the system 120 or the local language processing components. However, the disclosure is not limited thereto, and in some examples the hybrid selector 2024 may send the audio data 1911 only to the local ASR component 2050 without departing from the disclosure. For example, the device 110 may process the audio data 1911 locally without sending the audio data 1911 to the system 120.

The local ASR component 2050 is configured to receive the audio data 1911 from the hybrid selector 2024, and to recognize speech in the audio data 1911, and the local NLU component 2060 is configured to determine a user intent from the recognized speech, and to determine how to act on the user intent by generating NLU output data which may include directive data (e.g., instructing a component to perform an action). Such NLU output data may take a form similar to that as determined by the NLU component 1960 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 2060) may be selected as usable to respond to a natural language user input, and local response data may be sent (e.g., local NLU output data, local knowledge base information, internet search results, and/or local directive data) to the hybrid selector 2024, such as a "ReadyToExecute" response. The hybrid selector 2024 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 1911 to the system 120, and the response data from the system 120 may include the unique identifier to identify which natural language user input the response data corresponds.

In at least some embodiments, the device 110 may include, or be configured to use, one or more skill components 2090 that may work similarly to the skill component(s) 1990 implemented by the system 120. The skill component(s) 2090 may correspond to one or more domains that are used in order to determine how to act on a spoken input in a particular way, such as by outputting a directive that corresponds to the determined intent, and which can be processed to implement the desired operation. The skill component(s) 2090 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 2090, a skill system 125, or a combination of a skill component 2090 and a corresponding skill system 125.

Similar to the manner discussed with regard to FIG. 19, the local device 110 may be configured to recognize multiple different wakewords and/or perform different categories of tasks depending on the wakeword. Such different wakewords may invoke different processing components of local device 110 (not illustrated in FIGS. 20A-20B). For example, detection of the wakeword "Alexa" by the wakeword detector 1920 may result in sending audio data to certain language processing components 2092/skills 2090 for processing while detection of the wakeword "Computer" by the wakeword detector may result in sending audio data different language processing components 2092/skills 2090 for processing.

As described in greater detail above with regard to FIGS. 3A-5D, the device 110 and/or the system 120 may include an encoder component configured to embed an audio watermark and/or a decoder component configured to detect the audio watermark. For example, the encoder component may be included in the TTS component in the system 120, in a separate component associated with the system 120, in a separate component associated with the skill system(s) 125, in a separate component associated with the device 110, and/or the like without departing from the disclosure. Thus, the device 110, the system 120, and/or the skill system(s) 125 may be configured to generate watermarked audio data by embedding the audio watermark using the encoder component.

Similarly, the decoder component may be included within the wakeword detection component 1920 in the device 110, in a separate component associated with the device 110, in a separate component associated with the system 120, in a separate component associated with the skill system(s) 125, and/or the like without departing from the disclosure. Thus, the device 110, the system 120, and/or the skill system(s) 125 may be configured to detect an audio watermark embedded in watermarked audio data using the decoder component.

While the device 110 may operate locally to the user 5 (e.g., within a same environment so the device 110 may receive inputs and playback outputs for the user 5), in some examples the system 120 may be located remotely from the device 110 as its operations may not require proximity to the user 5. Thus, the system 120 may be located in an entirely different location from the device 110 (for example, as part of a cloud computing system or the like) or may be located in the same environment as the device 110 but physically separated therefrom (for example a home server or similar device that resides in a user's home or business but perhaps in a closet, basement, attic, or the like).

In the example illustrated in FIG. 19, the system 120 is depicted as one or more servers or other computing devices configured to perform language processing. In some examples, these servers may be located in an entirely different location from the device 110, such that the system 120 is only accessible via the network(s) 199 (e.g., extended networks) and the system 120 may be configured to perform language processing for hundreds of users and/or devices 110. However, the disclosure is not limited thereto, and in other examples, these servers may be located in the same environment as the device 110 and may be associated with users and/or devices 110 corresponding to the environment (e.g., building, home, business, etc.). For example, the servers may be connected to a local network (e.g., local area network (LAN), wireless local area network (WLAN), and/or the like) to which the device 110 is connected.

While FIG. 19 illustrates an example in which the system 120 corresponds to one or more servers, the disclosure is not limited thereto. In some examples, the system 120 may correspond to one or more devices that are connected to the local network and configured to perform additional functionality, such as language processing, without departing from the disclosure. For example, a first device 110a may send the audio data 1911 to a second device 110b via the local network and the second device 110b may process the audio data 1911 as described above with regard to FIG. 19 and/or FIG. 20A.

FIG. 20B illustrates an example of the system 120 corresponding to a second device 110b that is local to the first device 110a (e.g., in proximity to the first device 110a, connected to the same LAN or WLAN as the first device 110a, and/or the like). For example, the second device 110b may be an improved device that has more resources and/or processing capabilities and is capable of performing advanced functionality, such as language processing. Thus, the first device 110a may send the audio data 1911 to the second device 110b to perform language processing and/or determine action(s) to perform in response to a voice command represented in the audio data 1911.

To illustrate an example, the first device 110*a* may be located in a building (e.g., business, residence, and/or the like) and the second device 110*b* may be located elsewhere in the same building as the first device 110*a* without departing from the disclosure. Thus, in some examples the system 120 may correspond to one or more servers accessible via the network(s) 199 (e.g., examples described above with regard to FIGS. 9A-9C and 19), but the disclosure is not limited thereto and in other examples the system 120 may correspond to one or more servers that are connected to the local network without departing from the disclosure. Additionally or alternatively, the system 120 may correspond to one or more improved devices 110 that are connected to the local network (e.g., examples described above with regard to FIGS. 10A and 20B) without departing from the disclosure.

As described above with regard to FIGS. 9A-10D, the system 100 may perform watermark detection, enhanced watermark detection, and/or watermark verification using the device 110 that generates the microphone audio data (e.g., first device 110*a*), an improved device (e.g., the second device 110*b*) connected to the local network, the system 120, and/or a combination thereof without departing from the disclosure. Thus, the first device 110*a*, the second device 110*b*, the system 120, one or more first servers connected to the local network, one or more second servers only accessible via the network(s) 199, and/or a combination thereof may be configured to perform extended audio watermark detection without departing from the disclosure.

Figure 21:
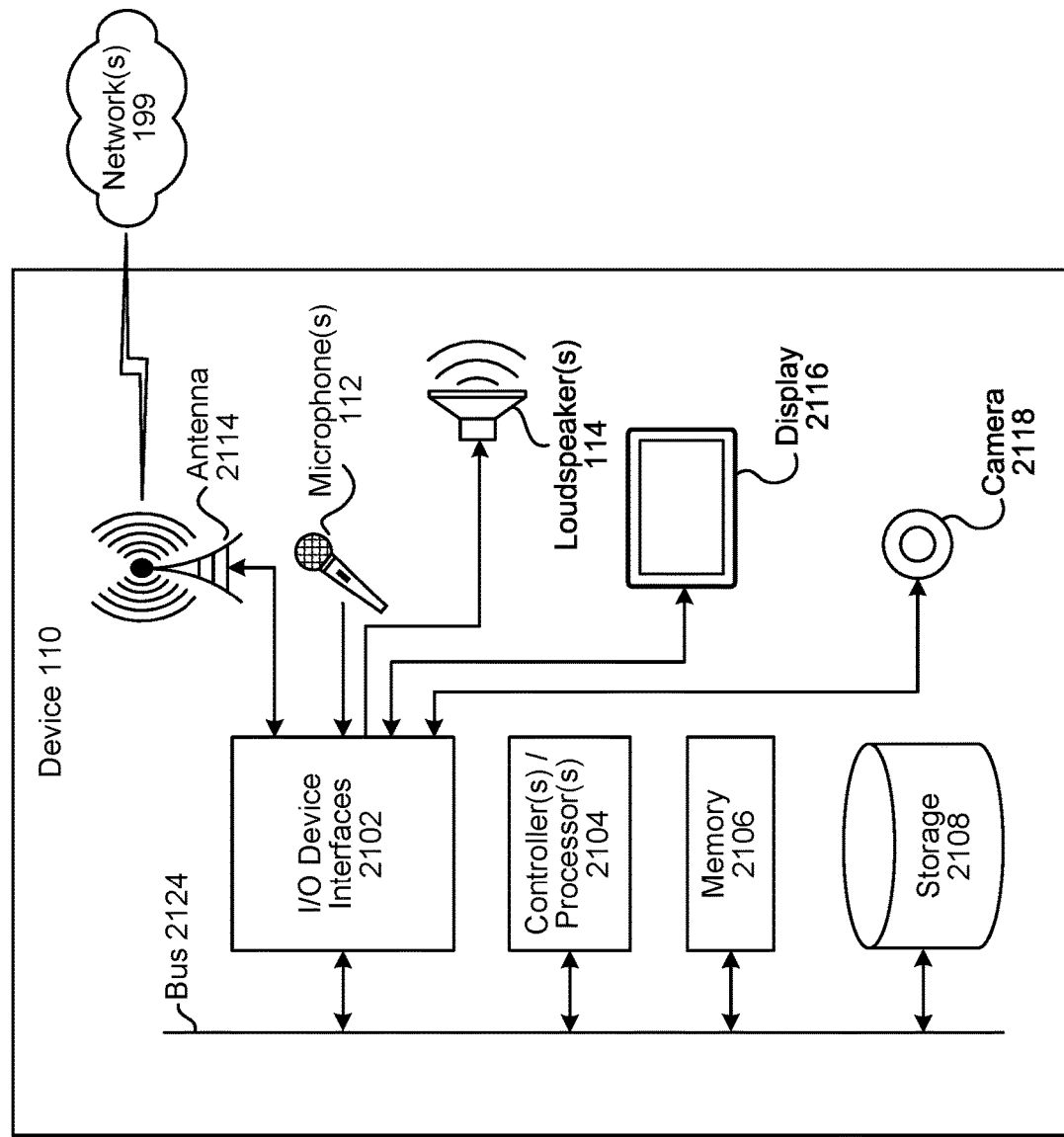
FIG. 21 is a block diagram conceptually illustrating example components of a device, according to embodiments of the present disclosure.

FIG. 21 is a block diagram conceptually illustrating a device 110 that may be used with the system. FIG. 22 is a block diagram conceptually illustrating example components of additional device(s), such as the system 120 (e.g., natural language command processing system), which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (2104/2204), which may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive memory (MRAM), and/or other types of memory. Each device (110/120/125) may also include a data storage component (2108/2208) for storing data and controller/processor-executable instructions. Each data storage component (2108/2208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2102/2202).

Computer instructions for operating each device (110/120/125) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120/125) includes input/output device interfaces (2102/2202). A variety of components may be connected through the input/output device interfaces (2102/2202), as will be discussed further below. Additionally, each device (110/120/125) may include an address/data bus (2124/2224) for conveying data among components of the respective device. Each component within a device (110/120/125) may also be directly connected to other components in addition to (or instead of) being connected to other components across the bus (2124/2224).

Referring to FIG. 21, the device 110 may include input/output device interfaces 2102 that connect to a variety of components such as an audio output component such as one or more loudspeaker(s) 114, a wired headset or a wireless headset (not illustrated), or other component capable of outputting audio. The device 110 may also include an audio capture component. The audio capture component may be, for example, one or more microphone(s) 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2116 for displaying content. The device 110 may further include a camera 2118.

Via antenna(s) 2122, the input/output device interfaces 2102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2102/2202) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (2102/2202), processor(s) (2104/2204), memory (2106/2206), and/or storage (2108/2208) of the device(s) 110, natural language command processing system 120, or the skill system 125, respectively. Thus, the ASR component 1950 may have its own I/O interface(s), processor(s), memory, and/or storage; the NLU component 1960 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing components 1992/2092 (which may include ASR 1950/2050), language output components 1993/2093 (which may include NLG 1979/2079 and TTS 1980/2080), etc., for example as illustrated in FIGS. 19 and 20. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 23, multiple devices (110a-110e, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, and/or a motile device 110e may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1950, the NLU component 1960, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
generating, by a first device, output audio using first audio data, the first audio data including first data representing a first audio watermark;
generating, by a second device, second audio data including a representation of the output audio;
detecting a first representation of a wakeword in the second audio data;
performing first watermark detection using the second audio data to detect the first data within a first frequency range of the second audio data;
in response to the first audio watermark being undetected, sending the second audio data for further audio processing;
performing second watermark detection using the second audio data to detect the first data within a second frequency range of the second audio data;
determining that the first audio watermark is represented in the second audio data; and
in response to detecting the first audio watermark, performing an action corresponding to the first audio watermark.

2. The computer-implemented method of claim 1, further comprising, prior to generating the output audio:
receiving a directive to embed the first audio watermark in third audio data;
determining, using the first audio watermark, the first data representing the first audio watermark;
detecting a second representation of the wakeword in the third audio data;
determining a portion of the third audio data corresponding to the second representation of the wakeword;
generating the first audio data by (i) embedding the first data within the first frequency range of the portion of the third audio data and (ii) embedding the first data within the second frequency range of the portion of the third audio data.

3. The computer-implemented method of claim 1, wherein performing the second watermark detection further comprises:
generating third audio data using the second audio data, the third audio data corresponding to the second frequency range;
generating cross-correlation data by performing a cross-correlation between a first portion of the third audio data and a second portion of the third audio data;
detecting, based on the cross-correlation data, a shared key, the shared key corresponding to a sequence of positive values and negative values; and
in response to detecting the shared key, determining the first audio watermark.

4. A computer-implemented method, the method comprising:
determining first audio data representing audio;
performing first watermark detection to detect first data representing a first audio watermark within a first frequency range of the first audio data;
sending the first audio data to a first component configured to perform language processing;
performing second watermark detection to detect the first data representing the first audio watermark within a second frequency range of the first audio data, the second frequency range being different than the first frequency range;
determining that the first audio watermark is represented in the first audio data; and
in response to determining that the first audio watermark is represented in the first audio data, causing the first component to terminate the language processing.

5. The computer-implemented method of claim 4, wherein performing the first watermark detection further comprises:
generating cross-correlation data by performing a cross-correlation between a first portion of the first audio data and a second portion of the first audio data;
detecting, based on the cross-correlation data, a shared key, the shared key corresponding to a sequence of positive values and negative values; and
determining, based on the shared key, the first audio watermark.

6. The computer-implemented method of claim 4, further comprising:
generating second audio data by converting the first audio data from a time domain to a frequency domain;
generating third audio data by applying a first filter to the second audio data, the third audio data corresponding to the first frequency range;
generating fourth audio data by applying a second filter to the second audio data, the fourth audio data corresponding to the second frequency range;
sending the third audio data to a first watermark decoder configured to perform the first watermark detection; and
sending the fourth audio data to a second watermark decoder configured to perform the second watermark detection.

7. The computer-implemented method of claim 4, further comprising:
generating second audio data by applying a first bandpass filter to the first audio data, the second audio data being in a time domain and corresponding to the first frequency range;
generating third audio data by applying a second bandpass filter to the first audio data, the third audio data being in the time domain and corresponding to the second frequency range;
sending the second audio data to a first watermark decoder configured to perform the first watermark detection; and
sending the third audio data to a second watermark decoder configured to perform the second watermark detection.

8. The computer-implemented method of claim 4, further comprising:
determining, using the first watermark detection, a first value corresponding to a first likelihood that the first audio watermark is represented within the first frequency range of the first audio data;

determining, using the second watermark detection, a second value corresponding to a second likelihood that the first audio watermark is represented within the second frequency range of the first audio data;

determining a third value based on the first value and the second value;

determining that the third value satisfies a condition; and in response to determining that the third value satisfies the condition, determining that the first audio watermark is represented in the first audio data.

9. The computer-implemented method of claim 4, further comprising:

prior to performing the first watermark detection, detecting a representation of a wakeword in the first audio data, wherein the first audio data is sent to the first component in response to the first audio watermark being undetected by the first watermark detection.

10. The computer-implemented method of claim 4, wherein causing the first component to terminate the language processing further comprises:

determining to end further processing of the first audio data; and sending, to the first component, a notification to ignore the audio.

11. The computer-implemented method of claim 4, wherein the method further comprises:

receiving second audio data;

performing the first watermark detection to detect the first data within the first frequency range of the second audio data;

performing the second watermark detection to detect the first data within the second frequency range of the second audio data; and in response to the first audio watermark being undetected by the second watermark detection, sending the second audio data to a second component configured to perform wakeword verification.

12. The computer-implemented method of claim 4, further comprising:

determining context data associated with the first audio watermark;

performing language processing using the first audio data to determine language processing data; and determining, using the language processing data and the context data, entity data.

13. The computer-implemented method of claim 4, wherein performing the second watermark detection further comprises:

generating, using the first audio data, second audio data having a first audio frame that includes a first portion of the first audio data associated with a first time period and a second portion of the first audio data associated with a second time period;

generating, using the first audio data, third audio data having a second audio frame that has a time delay relative to the first audio frame, the second audio frame including the second portion of the first audio data and a third portion of the first audio data;

performing the second watermark detection using the second audio data to detect the first data; and performing the second watermark detection using the third audio data to detect the first data.

14. A system comprising:

at least one processor; and memory including instructions operable to be executed by the at least one processor to cause the system to:

receive first audio data;

receive a first directive to embed a first audio watermark in the first audio data;

determine first data associated with the first audio watermark, the first data corresponding to a first duration of time;

determine, using the first data, second data corresponding to the first audio watermark, wherein the second data includes the first data and corresponds to a second duration of time that is longer than the first duration of time; and generate second audio data by embedding the second data within the first audio data.

15. The system of claim 14, wherein the memory further comprises instructions that, when executed by the at least one processor, further cause the system to:

determine a sign sequence associated with the first audio watermark, the sign sequence corresponding to a sequence of positive values and negative values that includes a first series of values and a second series of values, the first series of values corresponding to a first repetition of a repeating pattern and the second series of values corresponding to a second repetition of the repeating pattern.

16. The system of claim 14, wherein the memory further comprises instructions that, when executed by the at least one processor, further cause the system to:

detect a representation of a wakeword in the first audio data;

determine a portion of the first audio data corresponding to the representation of the wakeword; and determine to embed the second data in the portion of the first audio data.

17. The system of claim 14, wherein the memory further comprises instructions that, when executed by the at least one processor, further cause the system to:

receive a second directive to send a first command, via one or more loudspeakers of a first device, to one or more second devices in proximity to the first device; and select, based on the first command, the first audio watermark, wherein the first audio watermark corresponds to a third directive that instructs the one or more second devices to perform an action corresponding to the first command.

18. The system of claim 14, wherein the memory further comprises instructions that, when executed by the at least one processor, further cause the system to:

determine, based on the first directive, a type of watermark associated with the first audio watermark;

determine a first shared key to associate with the first audio watermark;

determine, using the first shared key, a second shared key to associate with a second audio watermark, the second shared key including the first shared key;

store a first association between the first shared key, the first audio watermark, and identification data corresponding to media content that includes the first audio data; and store a second association between the second shared key, the second audio watermark, and the identification data.

19. The system of claim 14, wherein the memory further comprises instructions that, when executed by the at least one processor, further cause the system to:

generate the second audio data by (i) embedding the second data within a first frequency range of the first audio data and (ii) embedding the second data within a second frequency range of the first audio data, the second frequency range being different than the first frequency range.

20. A computer-implemented method, the method comprising:

determining first audio data representing audio;

performing first watermark detection to detect first data representing a first audio watermark within a first frequency range of the first audio data;

performing second watermark detection to detect the first data representing the first audio watermark within a second frequency range of the first audio data, the second frequency range being different than the first frequency range;

determining that the first audio watermark is represented in the first audio data;

determining context data corresponding to the first audio watermark;

receiving second audio data representing an utterance;

performing language processing using the second audio data to determine language processing data;

determining, using the language processing data and the context data, entity data; and performing an action corresponding to the entity data.

* * * * *